United States Patent [19]

Sano et al.

[11] Patent Number: 5,400,086
[45] Date of Patent: Mar. 21, 1995

[54] COLOR CRT DRIVE APPARATUS AND CRT DISPLAY INCLUDING A BRIGHTNESS ADJUSTMENT

[75] Inventors: Yuji Sano, Zushi; Kouji Kitou; Ikuya Arai, both of Yokohama; Michitaka Ohsawa, Fujisawa; Yoshio Amemiya, Yokosuka, all of Japan

[73] Assignee: Hitachi, Ltd., Tokyo, Japan

[21] Appl. No.: 124,089

[22] Filed: Sep. 21, 1993

[51] Int. Cl.⁶ .................................................. H04N 9/73
[52] U.S. Cl. .................................. 348/678; 348/655
[58] Field of Search ............... 348/223, 678, 649, 687, 348/744, 807, 776, 655, 656; H04N 5/59, 9/73; 315/383

[56] References Cited

U.S. PATENT DOCUMENTS

| | | |
|---|---|---|
| 4,599,642 | 7/1986 | Willis . |
| 4,633,145 | 12/1986 | Osawa et al. . |
| 4,679,065 | 7/1987 | Umezawa . |
| 4,706,108 | 11/1987 | Kumagai et al. . |
| 5,134,490 | 7/1992 | Neal .................... 348/678 |
| 5,191,421 | 3/1993 | Hwang .................. 348/649 |

Primary Examiner—Edward L. Coles, Sr.
Assistant Examiner—Kim Yen Vu
Attorney, Agent, or Firm—Antonelli, Terry, Stout & Kraus

[57] ABSTRACT

A picture tube drive apparatus for driving a color picture tube. The picture tube drive apparatus comprises a video output circuit which receives video signals, amplifies them and outputs the amplified video signals, a picture tube drive circuit which receives the video signals amplified by the video output circuit for driving said color picture tube based on video signals, said picture tube drive circuit having means for detecting a beam current corresponding to the brightness of each color flowing through said picture tube, a picture tube connected with said picture tube drive circuit for displaying the video signals, a white balance control circuit into which a detection value of a beam current detected by said picture tube drive circuit is inputted and for outputting video signal level compensation signals for adjusting the white balance of the video image displayed on said picture tube to said picture tube drive circuit. A color picture tube in which an electron shield frame having at most a width which will not prevent electron beam from flying onto said shadow mask from an electron gun and having a function to suppress the reflection of the electron beam on a fluorescent screen is disposed on the inner peripheral surface of said electron on the side of the electron gun with respect to a shadow mask mounting position in the color tube.

2 Claims, 42 Drawing Sheets

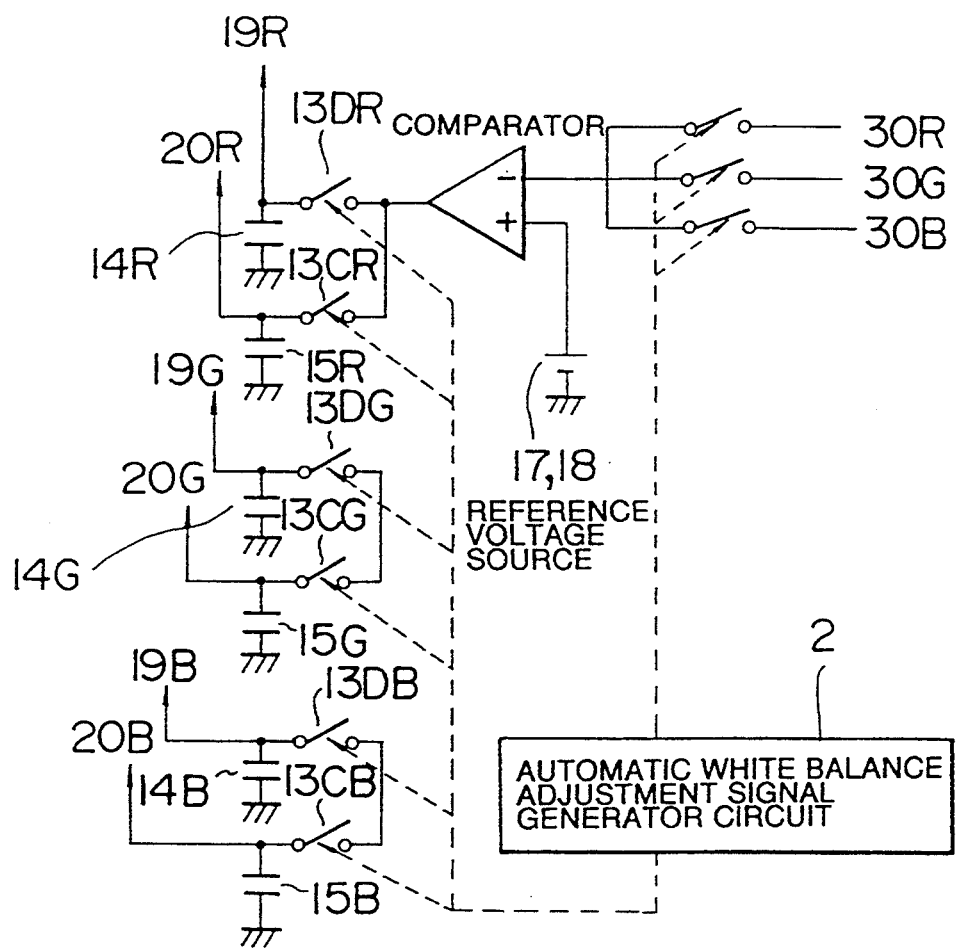

FIG. 17B

| NUM-BER | DESIRED VALUE | A REGISTER | OUTPUT OF COMPARA-TOR | LARGER OR SMALLER | B REGISTER | OPERATION RESULT → NEXT A |
|---|---|---|---|---|---|---|
| 1 | 010100101 | 10000000 | L ⊖ | SMALLER | 01000000 | A ⊖ B = 01000000 |
| 2 | ″ | 01000000 | H ⊕ | LARGER | 00100000 | A ⊕ B = 01100000 |
| 3 | ″ | 01100000 | L ⊖ | SMALLER | 00010000 | A ⊖ B = 01010000 |
| 4 | ″ | 01010000 | H ⊕ | SMALLER | 00001000 | A ⊕ B = 01011000 |
| 5 | ″ | 01011000 | L ⊖ | SMALLER | 00000100 | A ⊖ B = 01010100 |
| 6 | ″ | 01010100 | L ⊖ | SMALLER | 00000010 | A ⊖ B = 01010010 |
| 7 | ″ | 01010010 | L ⊖ | LARGER | 00000001 | A ⊖ B = 01010011 |

COLOR CRT DRIVE APPARATUS AND CRT DISPLAY INCLUDING A BRIGHTNESS ADJUSTMENT

This is a continuation of U.S. application Ser. No. 07/611,963, filed Nov. 13, 1990, now U.S. Pat. No. 5,258,828, on Nov. 2, 1993.

BACKGROUND OF THE INVENTION

The present invention relates to a drive apparatus for a color cathode ray tube, and in particular to a drive apparatus having an automatic white balance adjustment circuit and a color picture tube which is effective to prevent a reference signal for white balance adjustment as a raster from being displayed thereon.

In a display such as character graphic display, TV receiver or monitor TV receiver which uses a multicolor picture tube a white balance adjustment is performed by an automatic white balance adjustment circuit as follows. A cut-off adjustment is performed by inputting a white signal representative of a relatively dark white to the automatic white balance adjustment circuit as a reference signal for white balance adjustment for adjusting a direct current level of the inputted signal so that the ratio of cathode currents corresponding to current red, green and blue become predetermined ratios. A drive adjustment is performed by inputting a white signal representative of relatively light white to the white balance adjustment circuit to adjust the gains of respective amplifiers so that the ratios of cathode currents corresponding to current red, green and blue colors become predetermined ratios. The white balance adjustment is thus performed by the automatic white balance adjustment circuit so that no color is displayed at various areas having various brightness on the screen of the color picture tube when white and black video image is reproduced. The present invention is concerned with a drive apparatus for a color cathode ray tube having a white balance adjustment capability which is obtained by performing at least the above mentioned cut-off adjustment.

There has heretofore been a problem that a white balance of color picture tube which has been adjusted on shipping from a factory is readily changed after a long term use. This is caused by change with time due to decrease in electron emission from cathodes and by drift of circuits. An automatic white balance adjustment circuit in which change in white balance is recovered is described in, for example, Japanese Unexamined Patent Publication No. Sho. 60-18087 specification entitled "Color television receiving system".

FIG. 1 is a block diagram showing such a prior art automatic white balance adjustment circuit.

In FIG. 1, R (red), G (green) and B (blue) primary color signals which are inputted to input terminals 1R, 1G and 1B, respectively pass through signal synthesizing circuits 8R, 8G and 8B, respectively and are amplified by drive adjustment variable gain amplifier circuits 10R, 10G and 10B, and then are level-shifted level compensation circuits 11R, 11G, and 11B for cut-off adjustment. The signals are amplified to an amplitude which can drive a picture tube 6 by video output circuits 12R, 12G and 12B and are supplied to the picture tube 6 through cathode currents detection circuits 9R, 9G and 9B.

An automatic white balance control adjustment performed at this time will be described hereafter with reference to signal waveform at various parts shown in FIG. 2.

Signals represented at (b) and (c) in FIG. 2 which are extracted from a composite video signal to be displayed as a video image are applied to vertical and horizontal blanking pulse input terminals 3V and 3H of a signal generation circuit 2 for automatically adjusting white balance, respectively. Two signals 4B for cut-off adjustment and 4W for drive adjustment represented at (d) in FIG. 2 which are generated from these signals (b) and (c) are inputted as reference signals for white adjustment to the signal synthesizing circuits 8R, 8G and 8B via a signal line 4.

If one (composite video signal) of the inputted three R, G and B primary color signals is assumed as (a) in FIG. 2, the output from corresponding signal synthesizing circuit (8R if 8R) will have a signal wave form as (e) in FIG. 2. If the signal (e) in FIG. 2 corresponds to the primary color B signal, a detected voltage which is proportional to a cathode current from a cathode 7B flowing into the emitter of a transistor 28 in a cathode current detection circuit 9B is inputted to a sampling circuit 13 via a cathode current detection signal line 30B. Since circuits 9R and 9G are identical with the circuit 9B in structure, the circuits 9R and 9G are simply designated as blocks for simplicity of illustration. This is same as the circuits 12R, 12G and 12B.

Gate pulses which are in synchronization with the reference signals 4B and 4W are supplied to the sampling circuits 13R, 13G and 13B via a gate signal line 5. A negative feedback action by a cut-off adjustment comparator (or operational amplifier) 16B and a drive adjustment comparator (or operational amplifier) 17B determines an optimum adjustment level in a level compensation circuit 11B for a cut-off adjustment level and an optimum adjustment level in a variable gain amplifier circuit 10B. Control voltages in the sampling circuit 13B at this time which correspond to the optimum adjustment level of the level compensation circuit 11B for cut-off adjustment and the optimum adjustment gain of the gain variable amplifier circuit 10B are held in a hold capacitor 15B for cut-off adjustment and a hold capacitor 14B for drive adjustment, respectively, and are then supplied as control voltages to comparators 17B and 16B, respectively until next sampling time.

Reference voltage sources 17 and 18 are used for controlling the cathode currents on cut-off and drive adjustment to prescribed values, respectively. The above mentioned operation is same in the R and G primary color signal circuits.

The reference voltage source 17 is commonly used for comparators 16R, 16G and 16B corresponding to three primary colors. The reference voltage source 18 is commonly used for comparators 17R, 17G and 17B. The detected voltage values representative of the cathode currents which are inputted to the inverting terminals (−) of respective comparators via sampling circuits 13R, 13G and 13B are preset at predetermined ratios necessary for three primary color signals so that cathode currents for respective colors can be controlled at ratios necessary to keep the white balance. In other words, white balance can be stabilized by controlling cathode currents of respective primary colors for the picture tube on insertion of the reference signals.

SUMMARY OF THE INVENTION

Since level compensation circuits 11R, 11G and 11B are disposed at the prestige of video output circuits 12R, 12G and 12B in the prior art shown in FIG. 1, the signal dynamic ranges after these video output circuits should be set at a wide range also in consideration of level compensation amount. For example, it is necessary to increase the voltage of the power source which is to be applied to the terminal 27. Further, in order to assure a resolution which is required for the TV receiver, lowering in the cut-off frequency of the output circuit determined by an output capacitance including stray capacitance of wiring and a collector resistor 26 should be suppressed. Accordingly, it is not necessary to provide the collector resistor 26 having a high resistance.

Interposing of the cathode current detection circuits 9R, 9G and 9B between the video output circuits and the picture tube increases the output capacitance under the influence of parasitic capacitance and the like. Accordingly, it is necessary to lower the value of the collector resistor 26 for assuring a desired frequency band range.

Therefore, if a voltage applied to the terminal 27 of the power source is made constant, power consumption of the video output circuits increases since the current flowing through the collector resistor 26 increases. In particular, it has been difficult to achieve an automatic white balance adjustment for high definition displays which require a broad band range characteristics.

It is an object of the present invention to suppress increase in power consumption of video output circuits and to achieve an automatic white balance adjustment for display.

In order to achieve the above mentioned object, the present invention provides a color picture tube drive apparatus comprising as main components, a video output circuit for amplifying RGB primary color signals inputted thereto, a picture tube drive circuit provided on the output side of the video output circuit for driving the color picture, said drive circuit having beam current detecting means, and a white balance control circuit which receives a beam current detection signal outputted from the picture tube drive circuit and outputs a video signal level compensation signal to said picture tube drive circuit so that the current level of the video signal is controlled for adjusting for white balance of displayed video image.

Now, the color display which is a TV receiving system or monitor TV adopts an overscan system. That is, one scanning period comprises a blanking interval and a video display interval, and the video display interval is made longer so that horizontal video display width slightly exceeds the width of the screen of the display. As a result, a part of video image is scanned outside of the display screen so that it cannot be viewed (disappears). Irrespective of this, the white balance adjustment reference signal is never displayed on the display screen. Such a system is an overscan system.

In contrast to this, a character graphic display which is used as, for example a computer terminal adopts an underscan system.

That is, the video display interval of one scanning period comprising one blanking interval and one video display interval is preset so that the horizontal display width is slightly shorter than that of the screen of the display. The video information to be displayed is prevented from being lost as less as possible. On the contrary to this advantage, a part of the white balance adjustment reference signal will be leaked and displayed. If the display including the automatic white balance adjustment circuit described as a prior art adopts the underscan system of the above mentioned two scan system, there would occur problems as follows:

(1) If the above mentioned prior art automatic white balance adjustment circuit is used in a display adopting the overscan system, the reference signal for white balance adjustment will not be displayed on the picture tube screen. However, the reference signal is displayed as a raster in the display adopting the underscan system, resulting in an uncomfortability to users.

(2) The display adopting the underscan system is often used as an interface for particular computers and the contents to be displayed are always similar and limited. Accordingly, lowering in luminance efficiency of fluorescent material on the screen in particular display positions is large, resulting in prominent irregular brightness on the screen.

If the above mentioned prior art white balance adjustment circuit is used for the display adopting the overscan system, there would occur problems as follows:

(3) The deviation of white balance due to change in respective primary color fluorescent materials with time cannot be compensated for even if the ratios of the cathode currents for respective primary colors are controlled to predetermined ratios.

It is an object of the present invention to provide a display including an automatic white balance adjustment circuit which can solve the above mentioned problems.

(1) In order to solve the problems, an additional deflection signal is applied from an additional deflection signal generating circuit to a signal path in a deflection circuit of a picture tube via an adding circuit.

(2) In order to solve the second and third problems, an optical sensor or a video camera is connected with a white balance control circuit having a white balance compensation data storing circuit incorporated therein.

(3) In order to solve the third problem(s), a count circuit for counting the operation continuation period of a color TV receiving set to detect change with time is provided and is connected with a white balance control circuit having a white balance compensation data storing circuit incorporated therein, (1) The additional deflection signal generating circuit generates a signal representative of a deflection amount to be added to a deflection signal of the underscan system. An adding circuit inserted into the signal path in the deflection circuit adds a signal obtained from the additional deflection signal to provide a desired deflection signal wave form (waveform which enables the reference signal for white balance adjustment to be displayed as a raster).

(2) The optical sensor or the video camera serves to measure the deviation of white balance and provide a data by quantification thereof. The white balance control circuit is capable of drive and cut-off controlling so that the brightness irregularity and deviation of the white balance are overcome by using the measured data. The white balance compensation data storing circuit in the white balance control circuit stores a control amount in the above mentioned control and uses the stored control amount to achieve control.

(3) The white balance compensation data storing circuit stores preliminarily given drive and cut-off control amounts of change with time used for compensation for change in white balance with time. The count circuit outputs an address corresponding to the operation continuation period (passage time) of the TV system. Based on the address, the white balance control circuit reads out the control amount of change with time stored in the white balance compensation data storing circuit for achieving white balance control.

BRIEF DESCRIPTION OF THE DRAWINGS

FIGS. 12, 13A and 13B are views showing variations of the embodiment of FIG. 11;

FIGS. 14A, 14B, 14C 15, 16, 17A and 17B are views showing variations of the white balance circuit of FIG. 11 and the operation thereof;

DESCRIPTION OF THE PREFERRED EMBODIMENT

Figure 3:
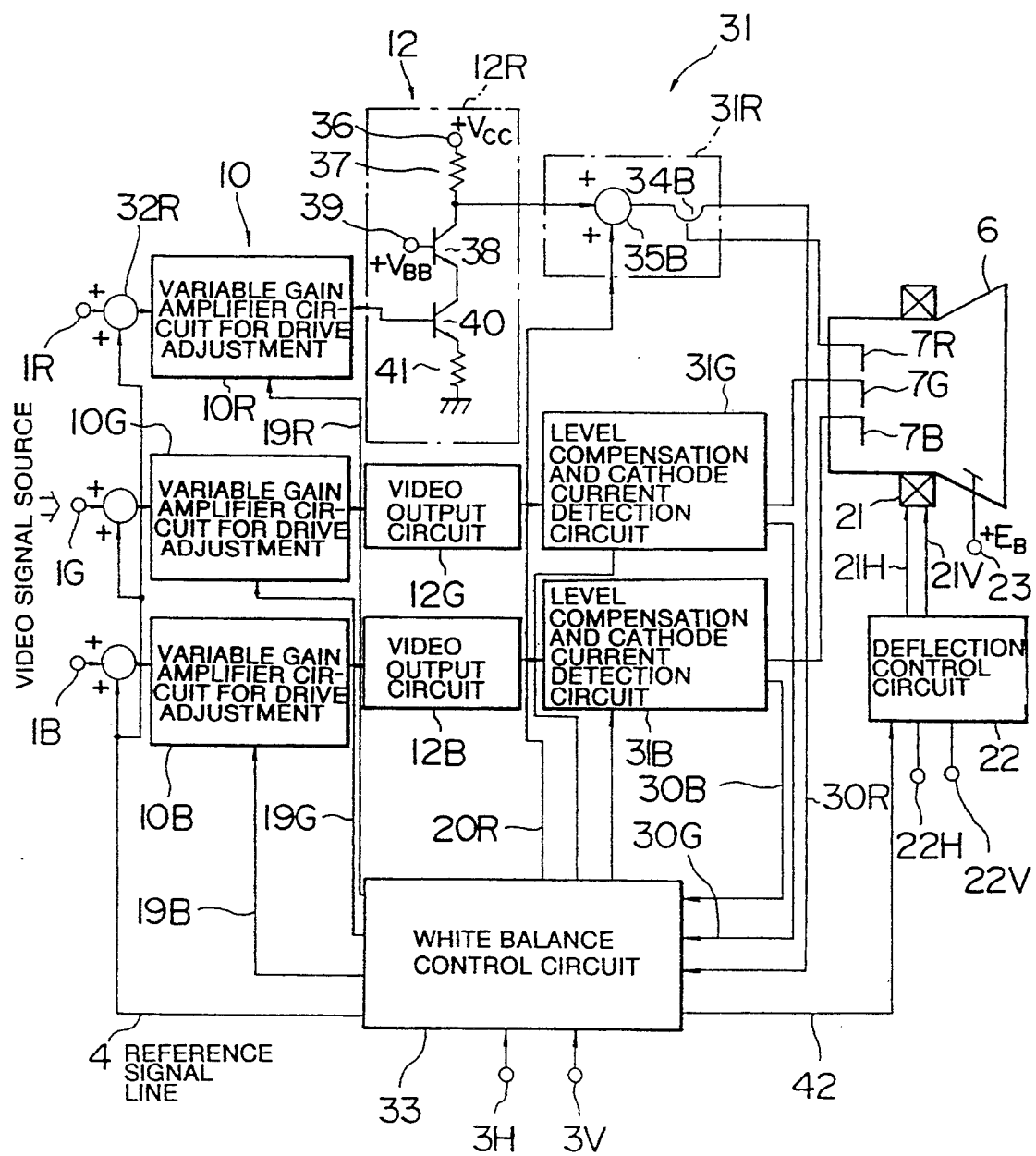
FIG. 3 is a block diagram showing a picture tube drive circuit including an white balance adjustment circuit which is an embodiment of the present invention.

An embodiment of the present invention is shown in FIG. 3.

In FIG. 3, reference numeral 22 denotes a deflection control circuit; 31R, 31G and 31B denote level compensation and cathode current detection circuits which serve as picture tube drive circuits for driving a picture tube 6. Reference numerals 12R, 12G and 12B denote video output circuits; 10R, 10G and 10B denote drive compensation variable gain amplifier circuits; 32R, 32G and 32B denote adding circuits for inserting a reference signal; 33 denotes a white balance control circuit.

Respective primary color signals which are inputted to input terminals 1R, 1G and 1B from a video signal source such as computer are amplified by drive adjustment variable gain amplifier circuits 10R, 10G and 10B and video output circuits 12R, 12G and 12B, respectively and then applied to cathodes 7R, 7G and 7B of a picture tube 6 via level compensation and cathode current detection circuits 31R, 31G and 31B.

Also in FIG. 3, automatic white balance adjustment is performed by adding reference signals represent as 4B and 4W in 2D which are fed from the white balance control circuit 33 via a reference signal line 4 for a blanking period of respective primary color signals so that the ratios of the cathode current of respective primary colors or cathode current values are constant.

If reference signals are added for a blanking period of primary color signals (or only reference signals are inserted independently of primary color signals, display of the reference signals is readily avoided as mentioned above in the TV receiver which adopts the overscan system. However, if the TV receiver adopts the underscan system as is similar to character graphic display system or peripheral area of an effective displayable screen of the picture tube is used for maintaining the picture quality such as focus or convergence characteristics, a raster existing in a period other than video display period appears in the effective screen area so that a reference signal for white balance adjustment may be displayed on the screen.

Figure 6:
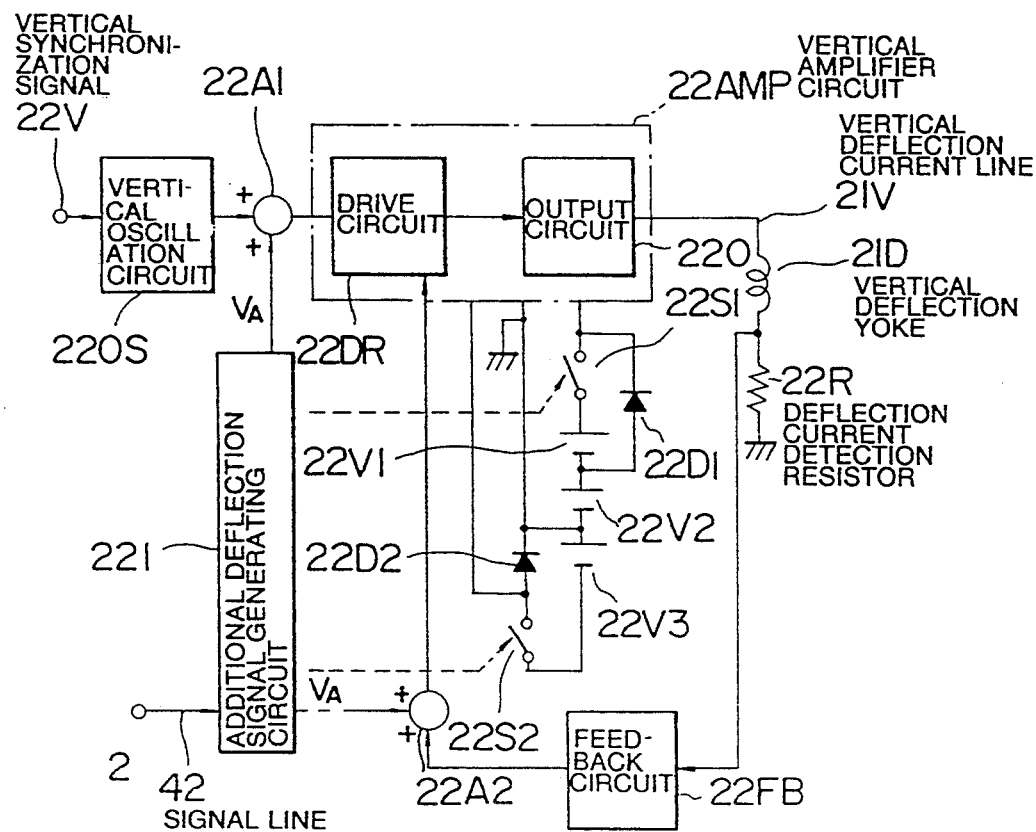
FIG. 6 is a view showing the details of a deflection circuit in the embodiment in FIG. 3.

Hence, in accordance with the present invention, by generating an additional deflection signal by the deflection control circuit 22 as shown in, for example, FIG. 6, and by supplying it to a deflection coil of a deflection yoke 21, the raster existing for a period other than video display period is shifted from the effective screen area so that the reference signal for the white balance adjustment will not be displayed.

Figure 4:
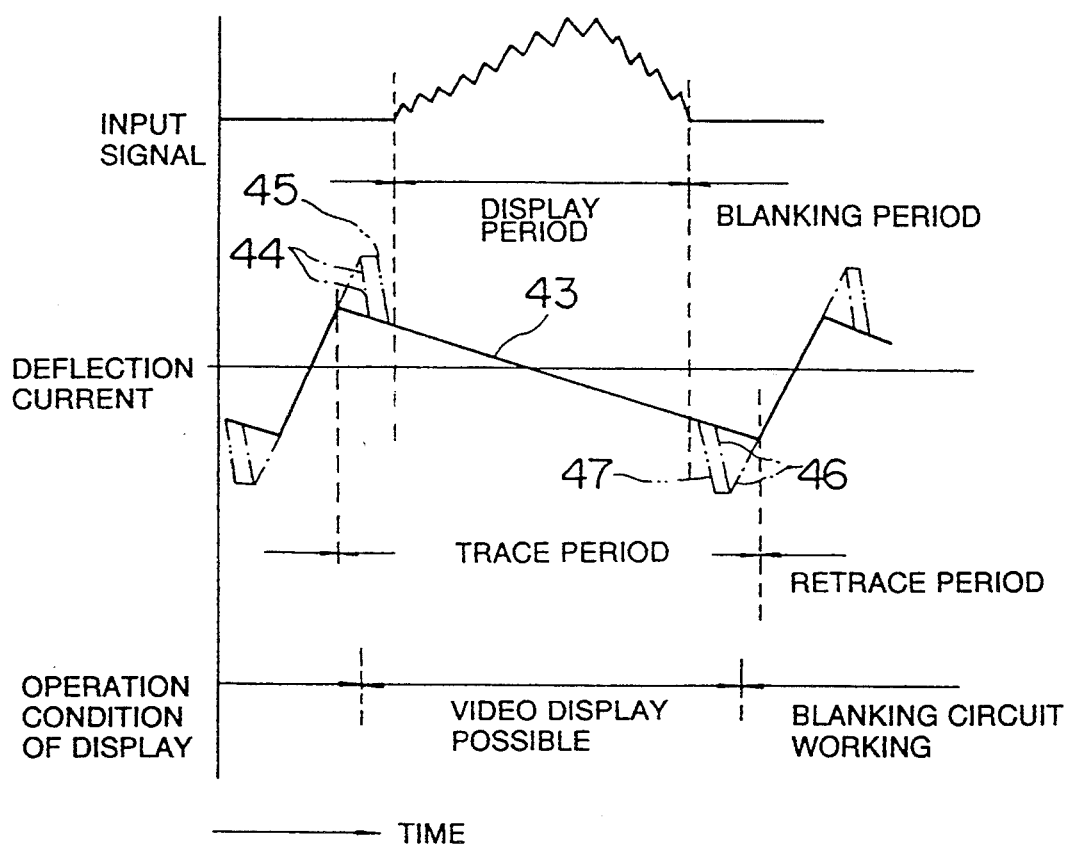
FIG. 4 is a waveform view showing the relation between deflection signals of FIG. 3 and the display period.

An example of waveform of the deflection signal which is added with the additional deflection signal is shown in FIG. 4. In FIG. 4, a solid line 43 shows a conventional inherent deflection signal waveform. The laster for an initial period of the display period is departed from the effective screen area by deforming (modulating) the inherent deflection signal waveform into that represented by a dot and chain line 44 for the initial period of the display period. If the TV receiver is of a multiscan type in which many kinds of signals having different deflection frequencies are inputted thereto, it is better to limit the departing range of the raster by changing of the deflection signal waveform represented by a dotted line 44 into that represented by a dotted line 45.

This aims at suppressing a luminescence phenomenon (halation) of a fluorescent material which is otherwise caused reflection, scattering of the electrons and secondary electron emission induced by impingement of electrons of excessively deflected electron beams on the inner surface of a glass bulb, an electrically conductive layer applied thereon and other metal part in the bulb of the picture tube. This phenomenon causes to lower the picture quality that an inherently dark video image can be viewed as a bright image.

If the inherent deflection signal waveform is modulated as represented by dotted lines 44 and 45, a ringing would occur immediately after bent portions in the deflecting signal waveform so that geometrical distortion will be readily generated in the video image on the screen. In such a case, the ringing in the display period can be eliminated by changing the time of modulation of the deflection signal waveform to the end of trace period as represented by dotted line 46 or 47 in FIG. 4.

Although an electromagnetic deflecting system using the deflection yoke 21 in the deflection device of the picture tube 6 is shown in FIG. 3, the system can overcome the ringing problem by considering the deflection signal waveform as a deflection voltage waveform rather than the deflection current waveform even if the system is an electrostatic deflection system.

Figure 5A:
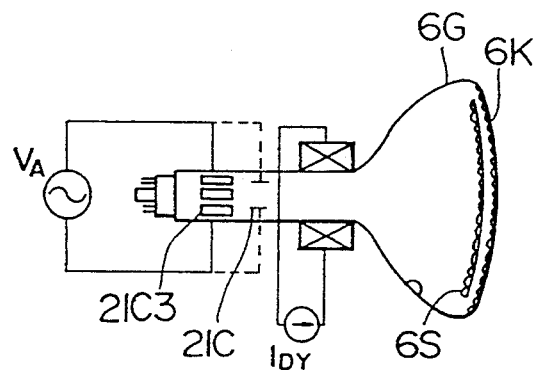
FIGS. 5A and 5B are views showing the variations of deflection system in the embodiment in FIG. 3.
Figure 5B:
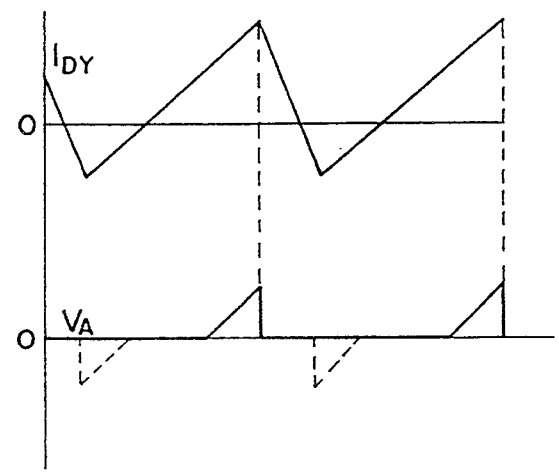

Furthermore, the above description is applied to both horizontal and vertical deflection. It is possible to distribute the deflection signal waveform shown in FIG. 4 to a plurality of deflection devices (combination of electromagnetic and electrostatic systems in possible) in consideration of performances such as loss in deflection device and signal dynamic range. This can be achieved by applying values $V_A$ and $I_{DY}$ shown in FIG. 5B to an electrostatic deflection electrode 21C3 or 21C shown in FIG. 5A and a deflection yoke 21, respectively. At least either one of three primary color common electrode 21C and primary color exclusive electrode 21C may be used as the electrostatic electrode. Accordingly, conventional deflection-signal may by inputted to the prior art deflection device and a deflection signal to be added may be added to an additional deflection device.

An example of a circuit for obtaining a deflection signal waveform in accordance with the present invention, which has been described with reference to FIG. 4 is illustrated in FIG. 6.

That is, FIG. 6 is a circuit diagram showing in detail as a whole a part comprising the deflection control circuit 22, the deflection yoke 21, and the deflection circuit in the picture tube 6 with reference to a case of electromagnetic type vertical deflection.

With reference to FIG. 6, conclusion will be firstly described. A deflection current having a waveform shown in FIG. 4 flows through a vertical deflection yoke 21D by a vertical synchronization signal inputted to a terminal 22V and a deflection signal tube to be added which is inputted from a white balance control circuit 33 (FIG. 3) via a signal line 42 or a control signal for additional timing (these signals will be referred to as deflection control signal).

Now, operation will be described in detail. A sawtooth wave which has been generated by a vertical oscillation circuit 220S passes through an adding circuit 22A1 and thereafter is amplified by a drive circuit 22DR and an output circuit 220 in a vertical amplifier circuit 22AMP and is applied to a vertical deflection yoke 21D. A deflection current is controlled by adjusting the gain of the drive circuit 2DR by a negative feedback system using a deflection current detection resistor and a feedback circuit 22FB.

That is, the deflection current flowing through the vertical deflection yoke 21D is detected as a voltage value by a deflection current detecting resistor 22R and is fed back to the drive circuit 22DR via a feedback circuit 22FB to lower the amplification gain thereof when the value is high. The deflection current is fed back to the drive circuit 22DR via the feedback circuit 22FB to increase the amplification gain thereof when the voltage value is low. In such a manner, negative feedback control is performed so that a given deflection current constantly flows through the vertical deflection yoke 21D.

A feature of the circuit shown in FIG. 6 resides in that the deflection signal to be added for the above mentioned end is added to the original deflection signal by being inserted into a sawtooth wave input line in the deflection circuit by the adding circuit 22A1 or substantially added to the original deflection signal by being inserted into the feedback line by the adding circuit 22A2. This can be accomplished by either approach.

Figure 2:
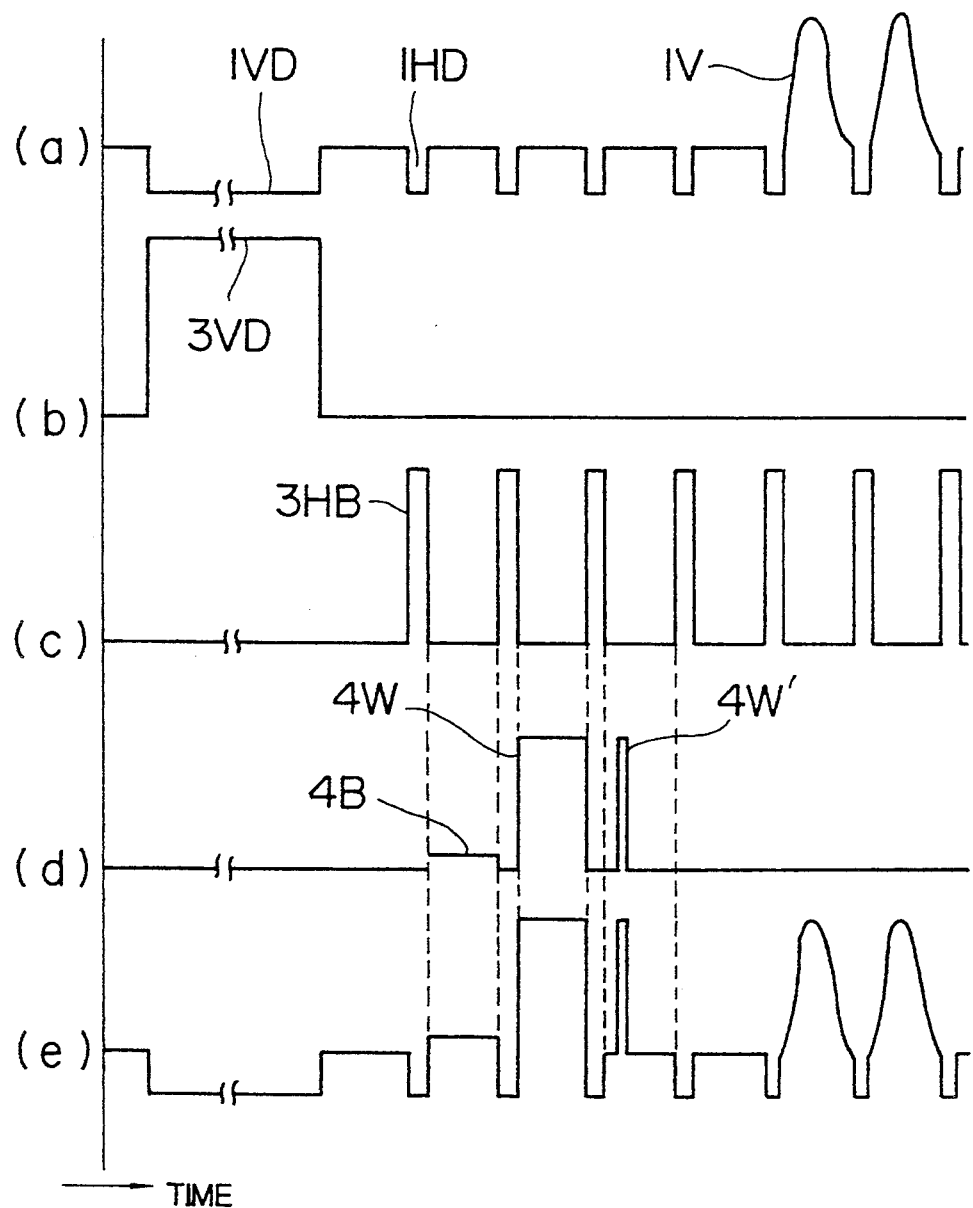
FIG. 2 is a view showing signal waveforms in various positions in the prior art.

The deflection signal to be added corresponds to, for example, dot and chain lines 44 and 45 and a pair of dot and chain lines 46 and 47 in FIG. 2 can be readily generated by inputting a blanking pulse as a trigger pulse to a circuit similar to the vertical oscillation circuit 220S. The resultant deflection signal to be added may be added without being reversed if the adding circuit 22A1 is used and may be added after being reversed if the adding circuit 22A2 is used.

In order to suppress increase in loss at vertical amplifier circuit 22 by application of the present invention, the power voltage source 22V2 is added with both or either one of 22V1 and 22V3, which are switched by switching circuits 22S1 and 22S2, respectively.

Figure 7:
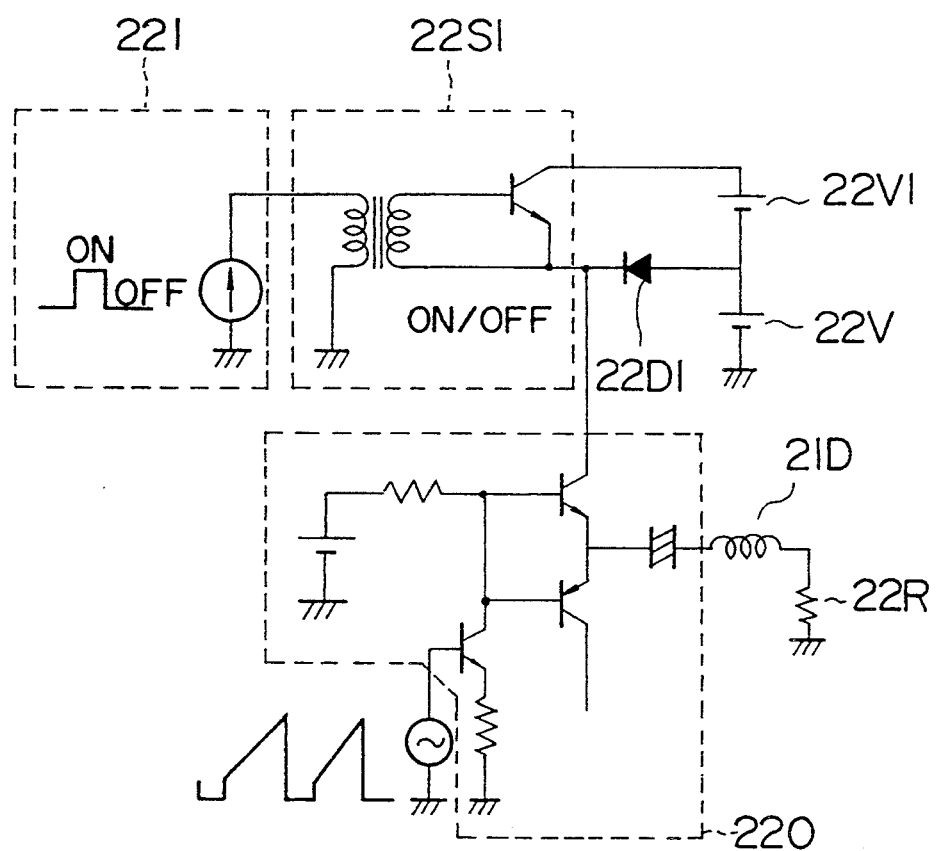
FIG. 7 is a structural view showing a switch circuit of FIG. 6.

This system suppresses power consumption by increasing the power source voltage to be applied only for a period in which the rate of change in the deflection current is high and by decreasing an average value of the power source voltage. The switch circuits 22S1 and 22S2 are controlled by an additional deflection circuit 22F or automatically controlled so that the former 22S1 is turned on only for a retrace or flyback period or an additional deflection period in which the deflection current abruptly increases and the latter 22S2 is turned on only for an additional deflection period in which the deflection current abruptly decreases. Diodes 22D1 and 22D2 serve as automatic switches which are turned on only when the switch circuits 22S1 and 22S2 are turned off. These functions are realized by a circuit shown in, for example, FIG. 7.

In order to decrease the loss as is similar to the above mentioned power source switching system, the voltage sources 22V1 and 22V3 of FIG. 6 may be replaced with high capacity capacitors which are charged to a voltage, same as the voltage source 22V2 and are switched at a timing similar to the above mentioned system (this system can be referred to as pumping up and down system).

Figure 8:
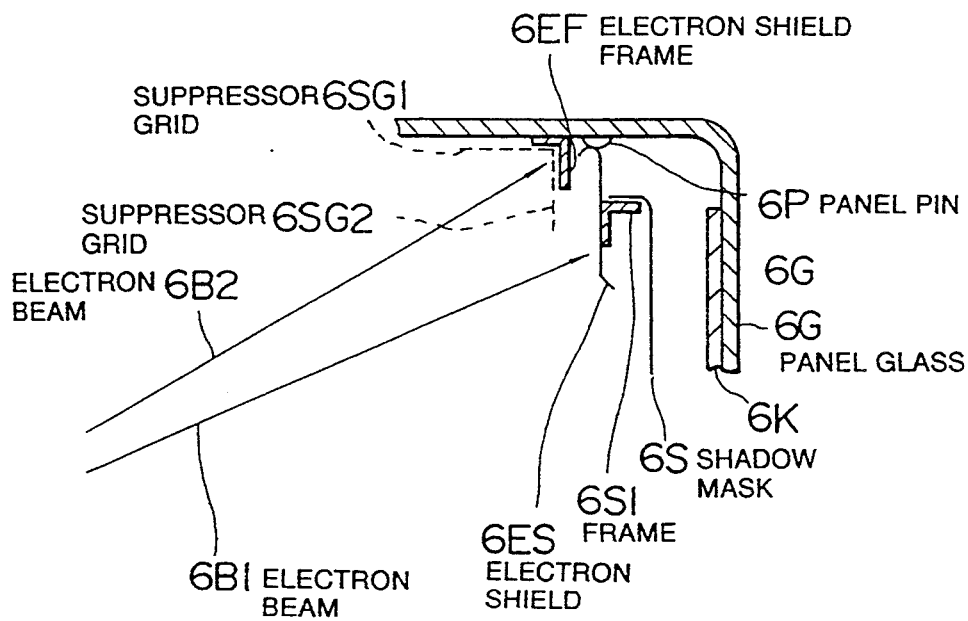
FIG. 8 is a partial sectional view showing a main part of a color television receiver.

An exemplary way for a color picture tube effective to prevent the reference signals from being displayed as a raster on the picture tube screen for some reason even in an overscan system as well as an underscan system is shown in FIG. 8.

FIG. 8 is a partial sectional view showing a color picture tube. In the drawing, reference numeral 6G denotes a panel glass; 6K a fluorescent layer applied on the panel glass; 6S1 a shadow mask frame; 6ES an electron shield; 6P panel pins used at only upper and lower portions of the picture panel. The above structure has heretofore been used.

However, a gap will be formed between the panel glass 6G and the electron shield 6ES due to a fabrication precision of the panel glass 6G and the electron shield 6ES and since the electron shield is formed of a thin alminium sheet so that it is readily deformed. The gap will be readily formed at the corners which are complicated shape. This is more or less same as the upper and lower portions where panel pins 6P are provided.

Now, an electron beam 6B1 which is deflected to a position just departing from the display period will be considered. Since the electron beam 6B1 is shielded by the electron shield 6ES, it will not be incident upon the fluorescent layer 6K which is an effective screen, and no halation will occur which is a fluorescent material luminescence by scattered beam. However, the electron beam 6B2 which is incident upon the corners of the color picture tube will collide with the inner face of the panel glass 6E to be scattered. The scattered beam 6B2 is passed through a gap between the electron shield 6ES and the panel glass 6G or the panel pins 6P and then incident upon the fluorescent layer 6K of the effective screen to cause halation. The impingement of the electron beam 6B2 is prevented so that halation due to the electron beam 6B2 will not occur by providing an electron shield frame having a structure shown in FIG. 8 in such a manner that a shadow mask 6S is omitted from the picture tube 6 which is shown in longitudinal sectional view of FIG. 9A and in the front view of FIG. 9B. The electron shield frames 6EF are separately provided, for example, on the opposite two or four sides of inner face of the picture tube 6 or integrally formed and disposed. Even if there is a gap between the electron shield frame 6EF and the panel glass 6G, the electron beam will disappear after repeating multiple-reflections.

Mounting of the electron shield frame 6EF on the picture tube 6 is achieved by adapting the panel pins 6P provided in the panel glass 6G into adapting recess (not shown) of the electron shield frame 6EF or bonding them, or other suitable means as is similar to mounting of the shadow mask.

Figure 9A:
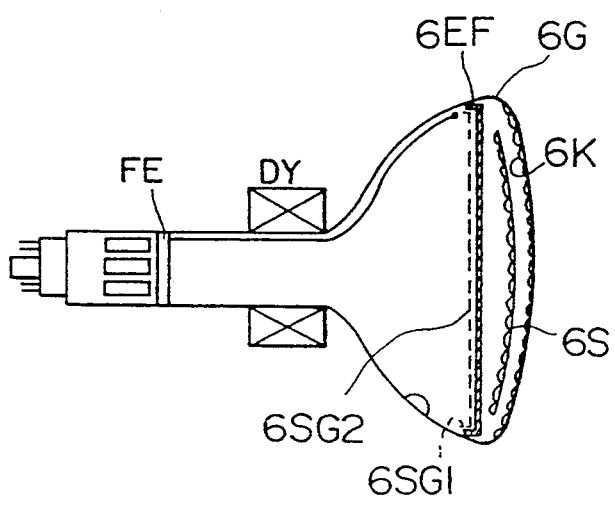
FIGS. 9A and 9B are a longitudinal sectional view and a front view of a picture showing the structure in FIG. 8, respectively.
Figure 9B:
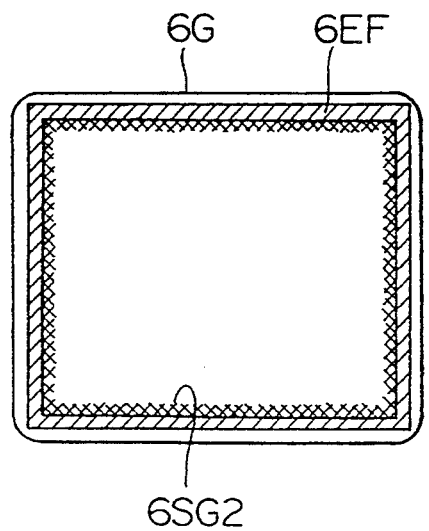
Figure 10A:
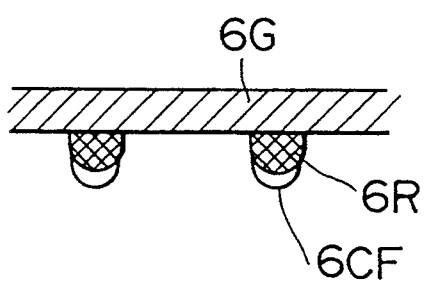
FIGS. 10A and 10B are detailed views showing the structure of a grid mount surface in FIG. 8.
Figure 10B:
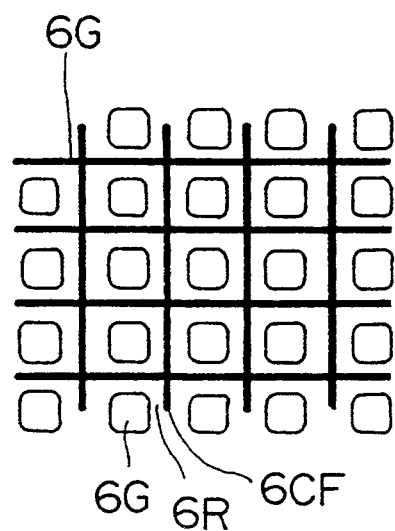

In the present invention, emission suppression portions may be covered with suppressor grids 6SG1 and 6SG2 in FIGS. 8, 9A and 9B in order to suppress the secondary electron emission due to impingement of electron beams on various portions.

The secondary electron emission which will readily occur when the electron beam impinges on the inside of the color picture tube, in particular, metal part such as electron shield 6ES and the metallic electron shield frame 6EF can be suppressed by lowering the spatial potential in the vicinity of the surface thereof relative to the impinged surface potential. Therefore, voltage lower than the anode voltage should be applied to the used suppressor grids 6SG1 and 6SG2. Following two ways are possible to obtain this voltage, for example, (1) Each of voltage for the focus electrode FE applied to an electron gun or a suppressor grid exclusive voltage is applied to the suppressor grid 6SG1 or 6SG2 via a pattern formed of the inner electrically conductive layer of the picture tube as is shown in FIG. 9A.

(2) The suppressor grids 6SG1 and 6SG2 are secured via a material having a low conductivity, (material which is difficult to cause the secondary electron emission) so that a necessary voltage is obtained by self-electrostatic charging due to impingement of the electron beam upon the grids.

However, heat resistive resin and the like containing fine particles of carbon is suitable since there is the possibility that use of securing materials having a very low conductivity such as glass cause an inner electric discharge. Developing this idea, it is possible to apply grid patterned film of the heat resistive resin upon portions requiring suppression of secondary electron emission and then reapply the electrically conductive layer 6CF upon the patterned layer.

If the above-mentioned suppressor grids 6SG1 and 6SG2 are formed of mesh of an elastic material, it would be possible to position or mount the grids in the picture tube 6 by adaption using an elastic force of the grids.

Figure 11:
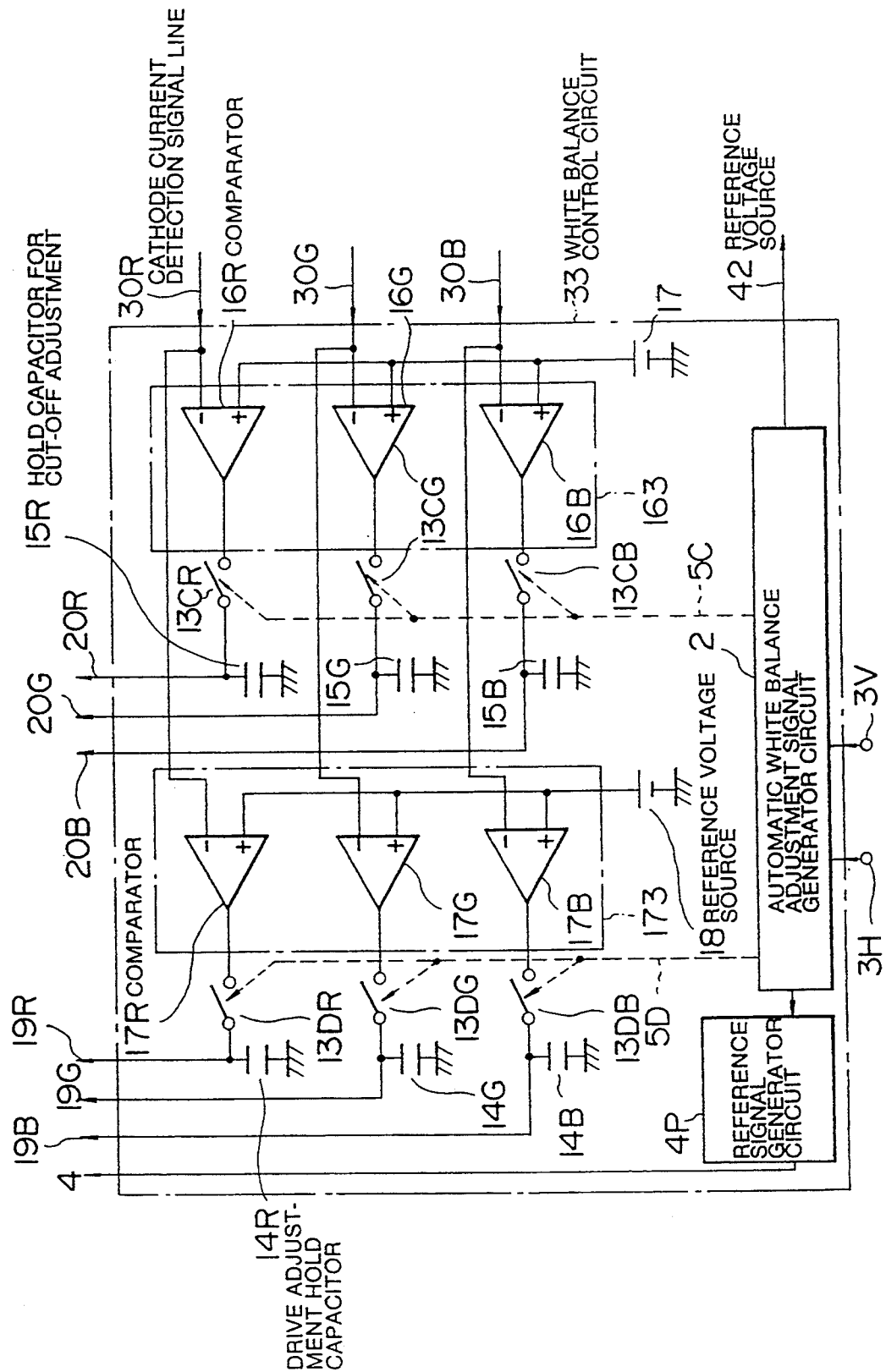
FIG. 11 is a structural view showing the details of a white balance circuit of FIG. 3.

A structure example of the white balance control circuit 33 as shown in FIG. 3 is shown in FIG. 11. Like components in FIG. 11 are represented by like reference numerals in FIG. 1 showing a prior art.

The structure of the present invention shown in FIG. 11 is largely different from the prior art in that hold capacitors 14R, 14G and 14B for drive adjustment and hold capacitors 15R, 15G and 15B for cut-off adjustment are directly connected with control lines 19R, 19G, 19B of a variable gain amplifier circuit and control lines 20R, 20G and 20B of a level compensation circuit, respectively to provide a high precision and stable circuitry.

Figure 1:
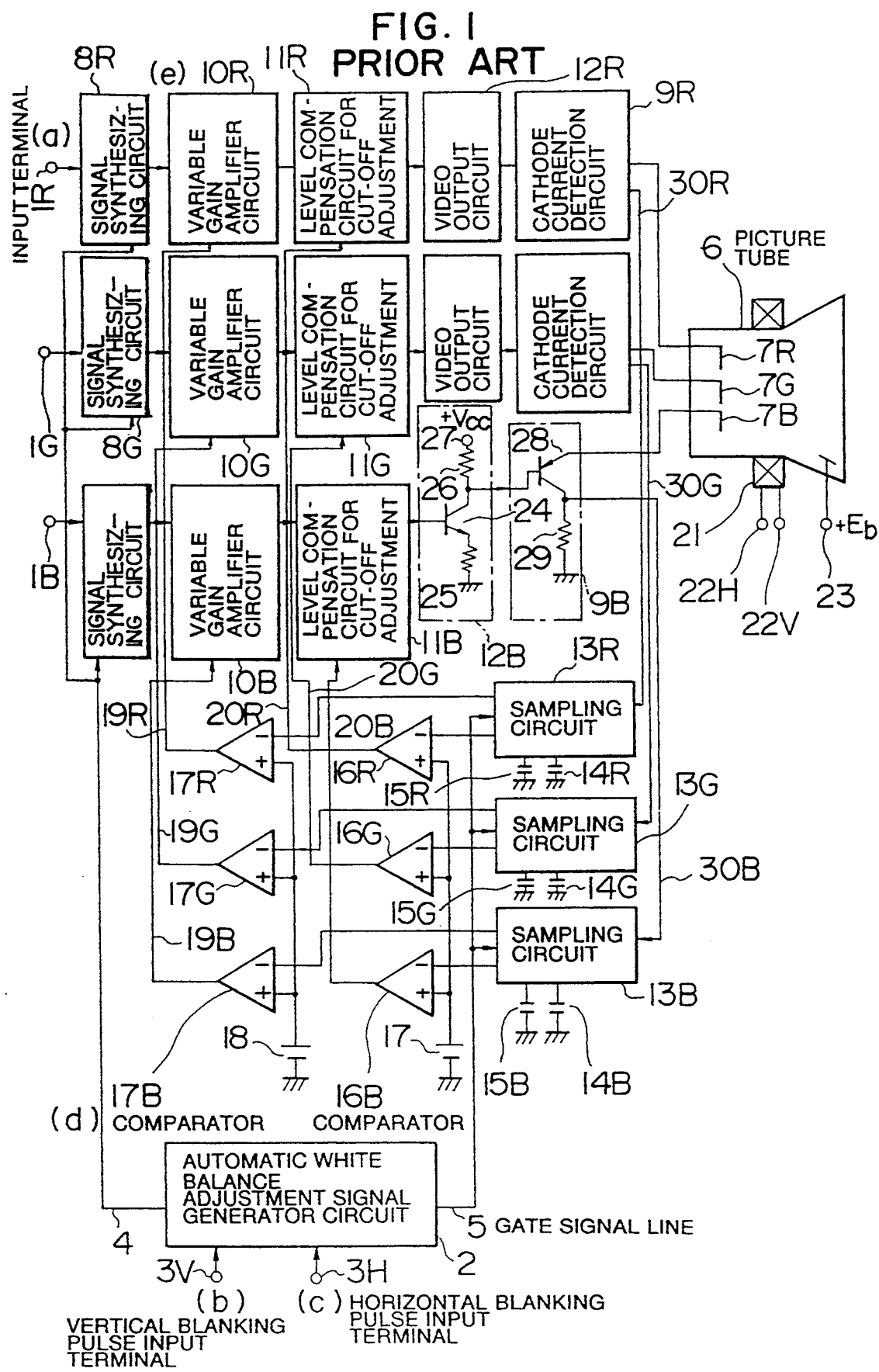
FIG. 1 is a block diagram showing a prior art.

For comparison, prior art structure of FIG. 1 will be considered. Since the hold capacitors 14R, 14G, 14B, 15R, 15G and 15B are connected with the inverting inputs of the comparators (or operational amplifiers) 16R, 16G, 16B, 17R, 17G and 17B, respectively, sag due to discharge of the hold capacitors is amplified so that this influence is remarkably increased to invite instability. Alternatively, necessity to suppress the gain of an open loop of a negative feedback for avoiding the instability results in deterioration of precision of the white balance control.

In contrast to this, since increase in amplification degree determined by a stage from the amplifier circuit to the cathode current detection circuit after the stage of each hold capacitor is suppressed in the structure of the present invention as shown in FIG. 11 so that the sensitivity of each comparator (or operational amplifier) can be sufficiently increased, the detection voltage of each cathode current detection signal lines 39R, 30G and 30B can be precisely matched to each voltage of the reference voltage sources 17 and 18.

The reference signal generation circuit 4P only receives timing pulses from the automatic white balance adjustment signal generation circuit 2. The waveform of the reference signal can be preset or controlled independently according to respective necessity of the embodiments which will be described hereafter.

Figure 12:
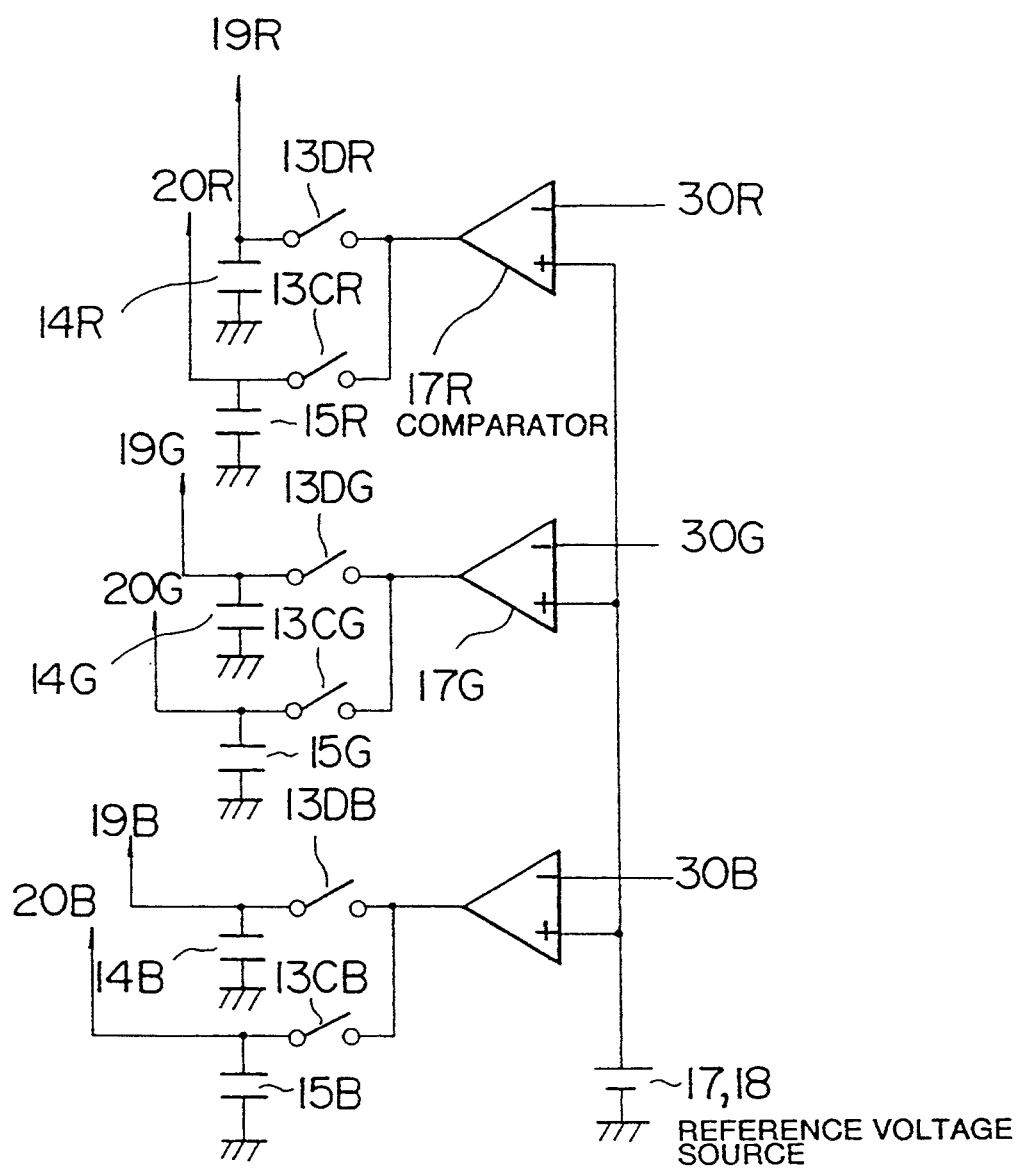

In FIG. 11, comparators (or operational amplifiers) encircled by dot and chain lines 163 and 173 can be commonly used by ways as follows:

(1) As shown in FIG. 12, the switch circuits 13CR, 13CG and 13CB are short-circuited with the output terminals of the comparators 13DR, 13DG and 13DB, respectively in the same primary color circuit to form a comparator for each primary color which is commonly used on drive and cut-off adjustments. At this time, the reference voltage sources 17 and 28 are switched or alternatively connected with non-inverting input of the comparator (or operational amplifier) to supply the same voltage.

(2) In a system in which the automatic white balance adjustment is sequentially performed in order of each primary color signal circuit, the circuit may comprise one comparator (or operational amplifier) for three primary colors by connecting the terminal of each switch circuit to one comparator (or operational amplifier) in each primary color circuit. The structure of the reference voltage sources 17 and 18 are same as that set forth in paragraph (1).

The circuit structure and the timing chart of the pulse signals used for switching each switch circuit set forth in paragraph (2) is shown in FIGS. 13A and 13B.

Since the output of each comparator (or operational amplifier) is short-circuited to each hold capacitor when the switch circuit is turned on, the switch circuits can be omitted by forming the comparators (or operational amplifiers) of current output type and making the output current zero when the switch is turned off.

However, current output circuits are necessary in lieu of the switch circuits when the comparators (or operational amplifiers) are commonly used as mentioned above. Input-output characteristics of the operational amplifier may be considered same as that of the comparator, both devices will be hereafter referred to as comparator.

Figure 14A:
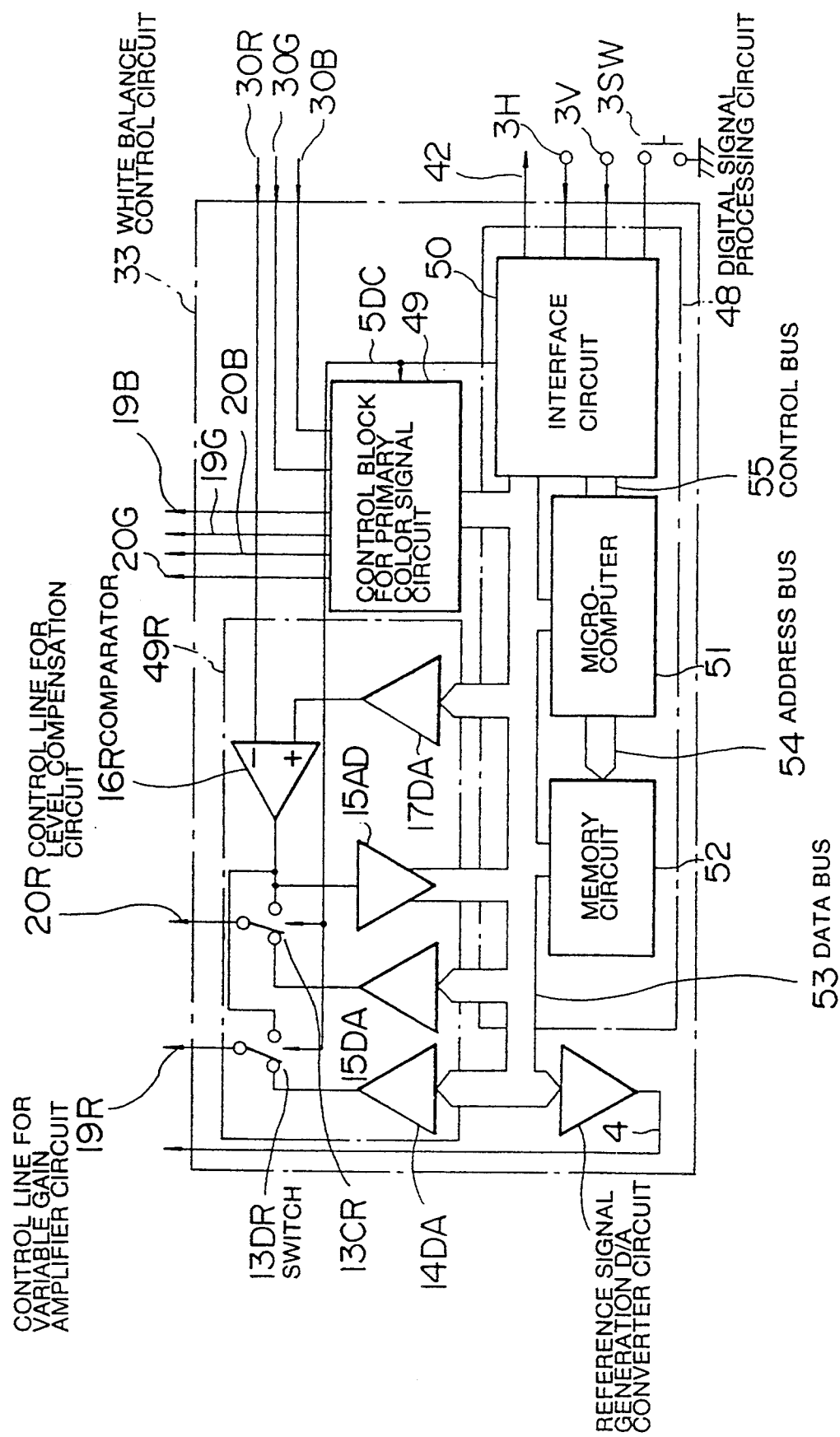

FIG. 14A is a block diagram showing a further embodiment of the white balance control circuit 33 shown in FIG. 3. That is, it shows the embodiment of the white balance control circuit which is stabilized by storing the control signals of the control lines 19R, 19G and 19B of the variable gain amplifier circuit and the control lines 20R, 20G and 20B by using storing circuits in lieu of the hold capacitors.

The digital signal processing circuit 48 shown in FIG. 14A comprises a microcomputor circuit 51, a memory circuit 52, an interface circuit 50 and data busses, an address busses and control busses (among which only representative data bus 53, address bus 54, and control bus 55 through which signals flow are shown in the drawing).

In FIG. 14A, a reference numeral 4DA denotes a D/A converter circuit (digital to analog converter circuit) for generating a reference signals. A control block of an R primary color signal circuit in a frame represented by a dot and chain line 49R. Similar control blocks of the G and B primary color signal circuits are commonly represented at 49.

The comparator 16R and A/D converter circuit (analog to digital convertor circuit) 15AD are commonly used on both drive and cut-off adjustments in the frame represented by a dot and chain line. Only the switch circuit 13DR is reversed on drive adjustment so that the output of the comparator 16R is fed to the digital signal processing circuit 48 via an A/D converter circuit 15AD. After it is stored in the memory circuit 52 according to needs, it is held at the output of the D/A converter circuit 14DA and is outputted to a control line 19R by reinverting the switch circuit 13DR which completes the adjustment.

Since use of the circuit configuration shown in FIG. 14A eliminates the necessity of automatic white balance adjustment in the deflection period, the present invention includes various embodiments as will be described hereafter. The change of the picture tube 6 with time can be compensated for if the output of the D/A converter circuit 17DA is updated by a cathode current time integrated value, for example, in order of flow of FIG. 15. A reference voltage value $V_D$ (for example, a voltage value of the output of the D/A converter circuit 17DA in the control circuit shown in FIG. 14) is increased by one volt each time when a value $Y_{30}$ corresponding to the cathode current time integrated value exceeds a reference value N.

A manual switch 3SW in FIG. 14A will be described in an embodiment described herebelow.

Since negative feedback on white balance adjustment if performed in a fast analog circuit (for example, the comparator 16R) and only receiving and holding of each control signals is accomplished by a digital signal system in the circuit structure shown in FIG. 14A, speed-up of white balance adjustment becomes possible. Since only accepting and holding of each control signal is performed in a digital signal system, speed-up of the white balance adjustment becomes possible.

Figure 14B:
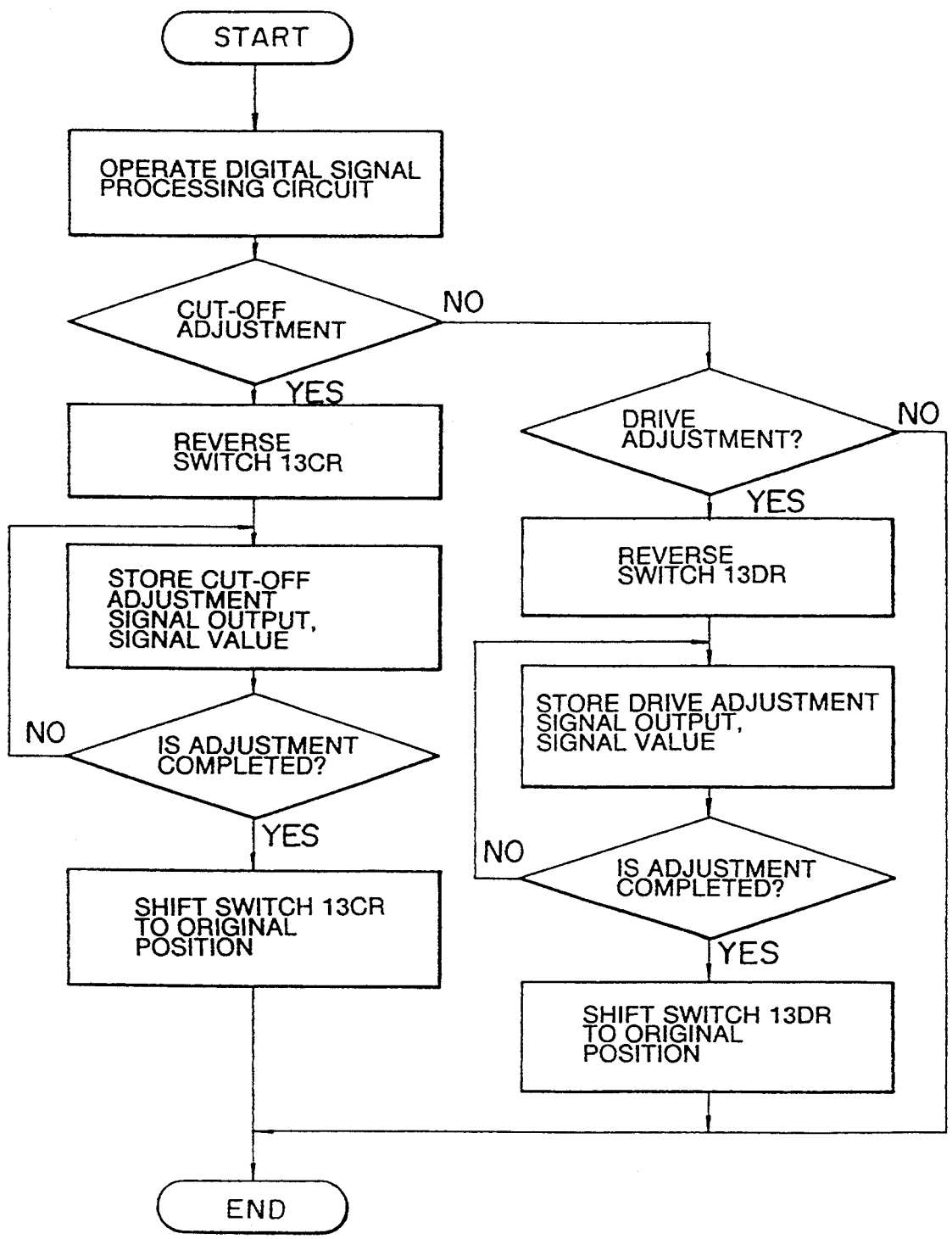
Figure 14C:
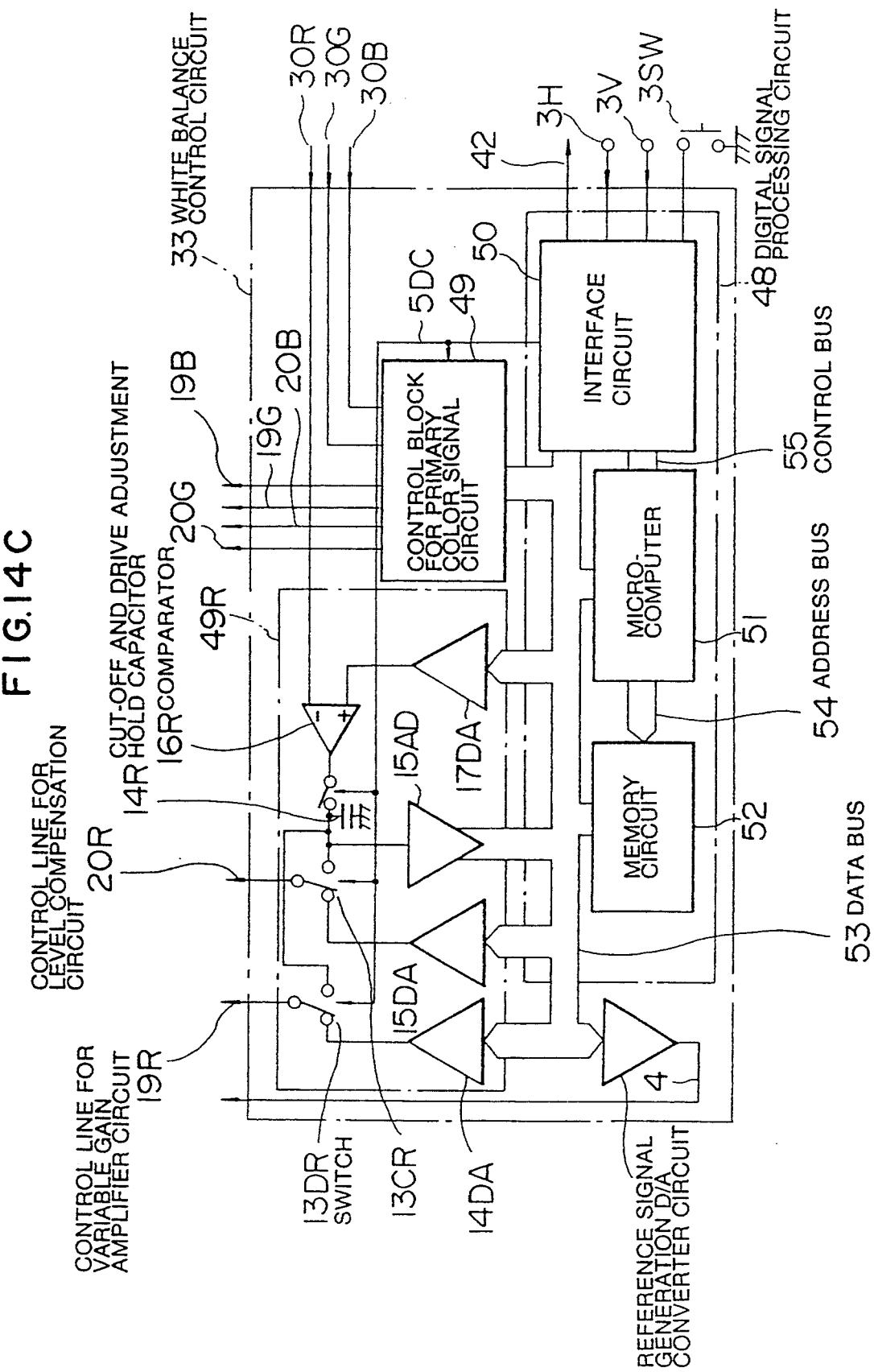

However, an output signal from the comparator 16R can be received by disposing a sample and hold circuit (for example a circuit comprising the switch circuit 13R shown in FIG. 14C and a cut-off and drive adjustment hold capacitor 14R) so that data acceptance is stably performed by the A/D converter circuit 15AD in the blanking period in which the cathode current is not detected and negative feedback operation of the analog circuit cannot be performed.

Figure 16:
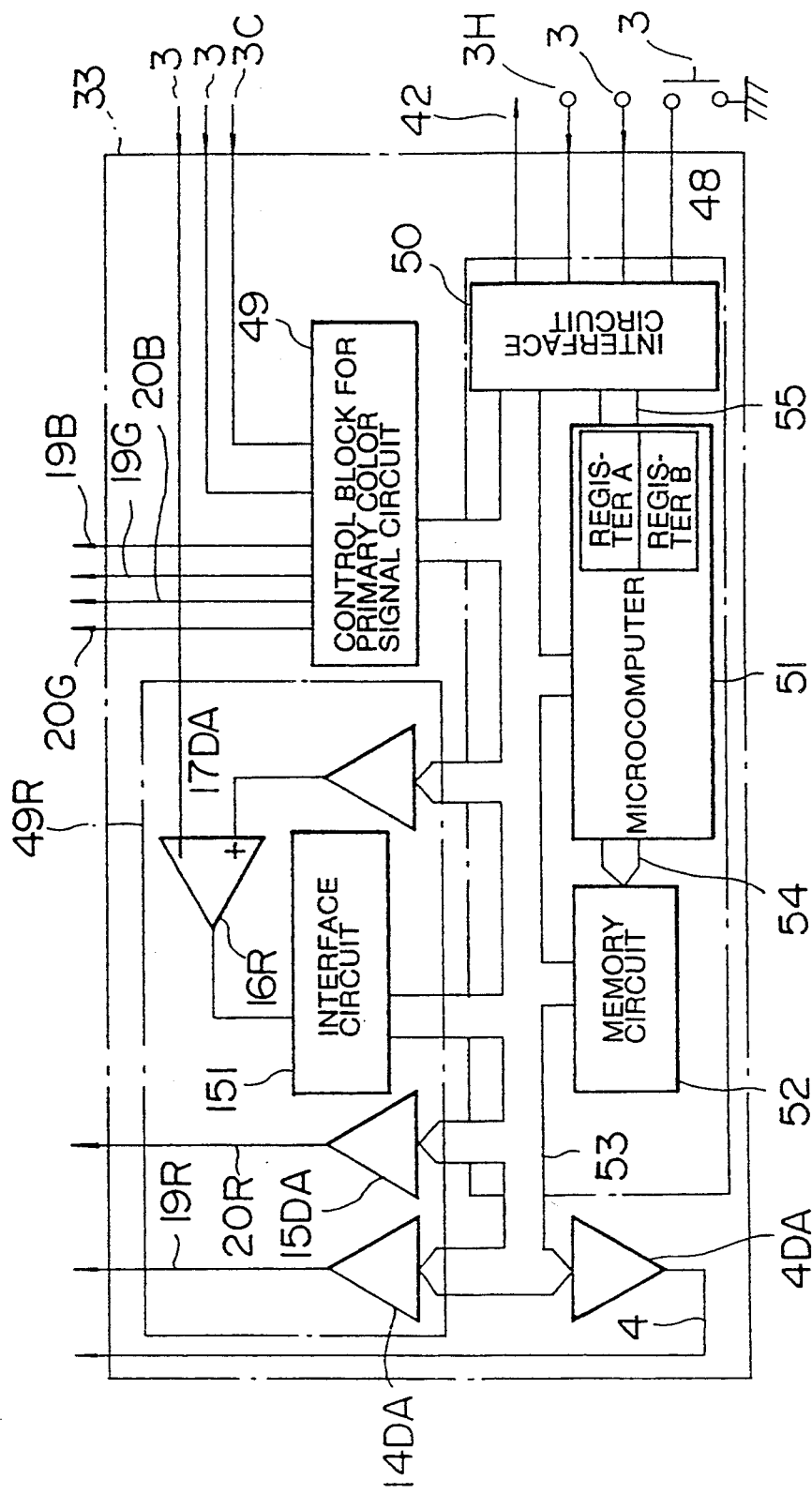

FIG. 16 is a block diagram showing a further embodiment of the white balance control circuit 33 which can reduce the number of parts and the cost.

The difference between the circuit structure of FIG. 16 and that of FIG. 14 resides in that the A/D converter circuit 15AD and switch circuits 13DR and 13CR are omitted and instead of this, an interface circuit 15I detects the output of the comparator 16R and accepts it as a control data. Since the output of the comparator 16 is an analog value, it cannot be processed in the digital signal processing circuit 48 without converting it into a digital value. This circuits aims at performing of the analog to digital conversion operation without using the exclusive converter 15AD of FIG. 14.

If it is assumed that the control data which is an output of the comparator 16 be an 8 bit digital value, a proper control data can be accepted by checking the output of the comparator 16R responsive to all control signals at 256 steps ($=2^8$ steps) obtained from the D/A converter circuit 14DA or 15DA and by accepting the control signal from the D/A converter circuit 14D or 15DA when the checked output assumes zero.

Figure 17A:
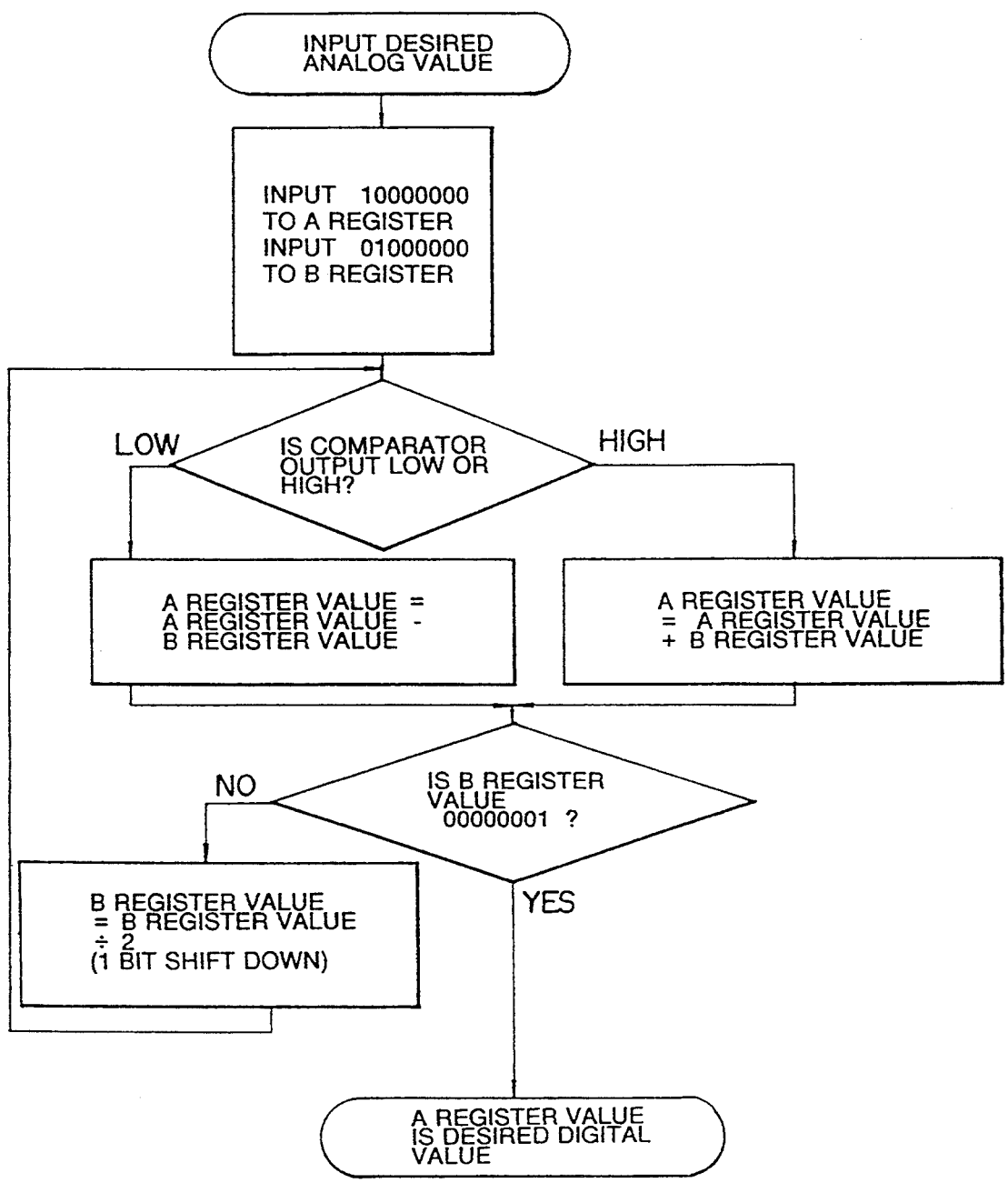

However, this method takes a maximum 256 step trial period of time, there is the possibility that the adjustment period of time is extended. If an adjustment method which will be described hereafter with reference to FIGS. 17A and 17B, a proper control data can be accepted by repeating the number (the number of bits forming a control data −1) of trials. While the dynamic range for data is divided into half data in this method, the range including a desired value is narrowed fast. Detailed method will be described with reference to FIGS. 16, 17A and 17B.

The desired value of the control data to be accepted is assumed as 01010010.1 by considering a quantization error and increasing the effective digit number and two registers such as A and B registers are provided for storing area of the computer 51.

Firstly, an intermediate value 10000000 of the dynamic range for data is inputted to the A register which is an input data of the D/A converter circuits 14DA and 15DA. The half value 0100000000 is inputted into the B register which is an inner operational register. It is determined whether the desired value is larger than the A register value depending on whether the output of the comparator 16R is negative or positive when the output of the D/A converter 14DA or 15DA is updated by an A register value. If the result is negative, it is determined that the desired value is smaller than the A register value. The B register value is subtracted from the A register value. Result is made next A register. If positive, it is determined that the desired value is larger than the A register value. A register value is added with the B register value. The result is made next A register value. At this time, the B register value is also updated into a half value (practically, it will suffice to shift the counter value to lower significant bit side once.)

As is apparent from FIG. 17, a control data is accepted to the A register by repeating this process (the number of bits forming the control data minus one) times (seven times in the above mentioned case).

In order to perform the white balance adjustment again, the above mentioned accepting process may be repeated by using the current value as the A register value and a value determined from a maximum drift amount as the B register value.

Details of the level compensation and cathode current detection circuits 31R, 31G and 31B in FIG. 3 will be described.

In the prior art shown in FIG. 1, the level compensation circuits 11R, 11G and 11B are provided at the prestige of respective video output circuits 12R, 12G and 12B. Accordingly, the signal dynamic range after these video output circuit should be preset at a wide range in consideration of the level shift amount. For example, it is necessary to increase the power source voltage to be applied to the terminal 27 in the video output circuit. In order to assure a resolution required for the TV receiver system, lowering of the cut-off frequency of the output circuit determined by the output capacitance including stray capacitance of the wiring and the collector resistor 26 in the video output circuit, should be suppressed so that the resistance of the collector resistor 26 cannot be higher.

Therefore, increase in the power consumption of the video output circuit is inevitable. In particular, realization of the automatic white balance adjustment for high definition display and the like which requires a wide band range characteristics has been difficult.

In order to solve this problem, the level compensation circuit is disposed at the postage of the video output circuit and is shown as the level compensation and cathode current detection circuit which may be disposed either before or after the cathode current detection circuit in FIG. 3.

Figure 18A:
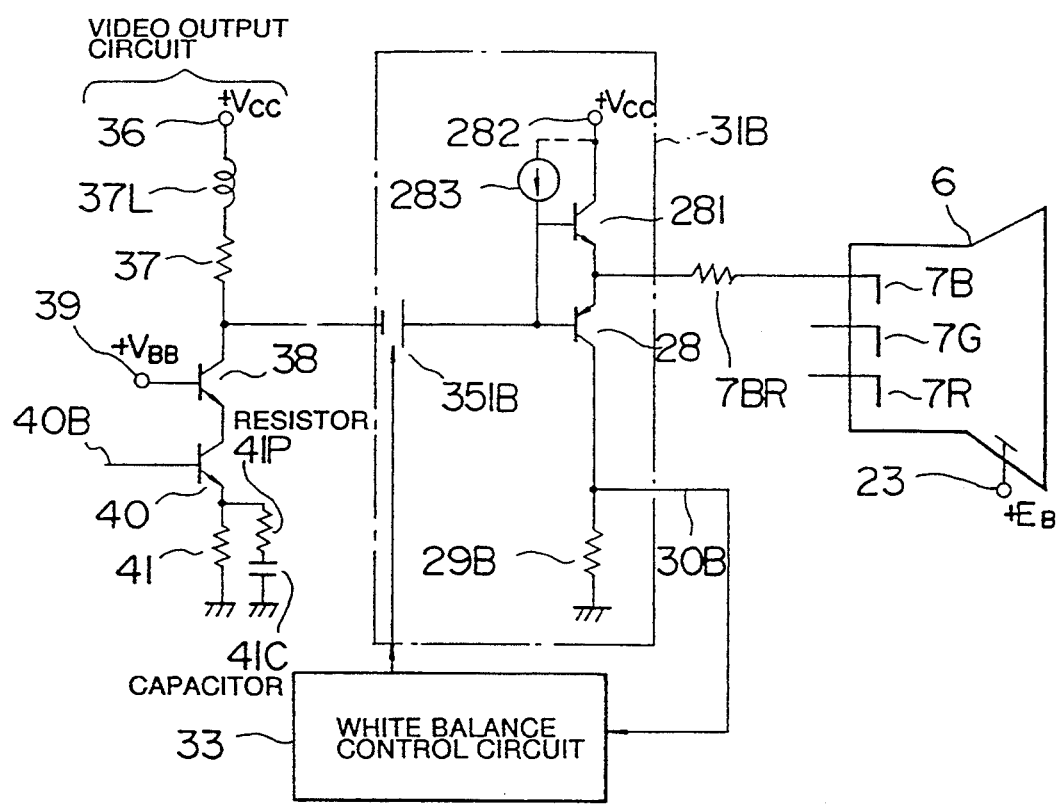
FIGS. 18A, 18B, 19A and 19B are views showing the details of a level compensation and cathode current detection circuit in FIG. 3.

An example of the structure (the structure of the level compensation and cathode current detection circuits 31R, 31G and 31B) is shown in FIG. 18A. In FIG. 18A, an electronically controlled voltage source 351B serving as a level compensation circuit is connected after a video output circuit, the band range of which is widened by a parallel peaking of a coil 37L and an emitter peaking of a resistor 41P and a capacitor 41C and a cascade connection. The cathode 7B is driven via a cathode current detection and SEPP circuit and a protection resistor 7BR.

Disposing the electronically controlled voltage source 7BR at the poststage can eliminate a cut-off adjustment margin from the signal dynamic range of the circuit at the stage before the video output circuit so that a loss over a wide band range of the video circuit can be decreased.

Figure 18B:
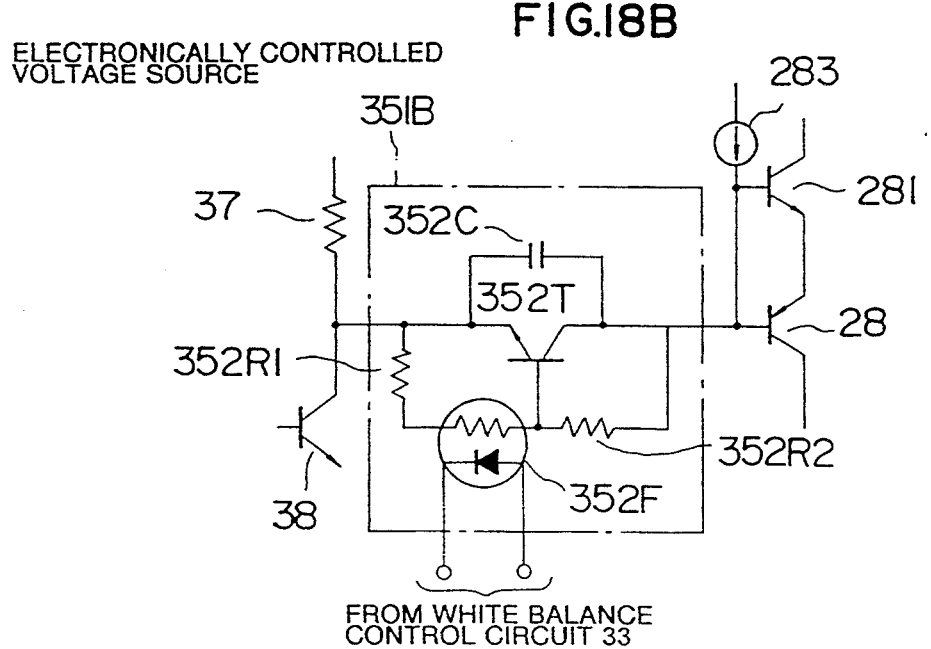

An example of the electronically controlled voltage source 351B is shown in FIG. 18B. The voltage level of a constant voltage circuit using a transistor 352T is controlled by using a photo coupler 352C compensates for an increase in impedance of the electronically controlled voltage source 351B at a radio frequency. In order to provide a low impedance electronically controlled voltage source 351B, it is necessary to cause a sufficient bias current to flow by using a current source 283.

Figure 19A:
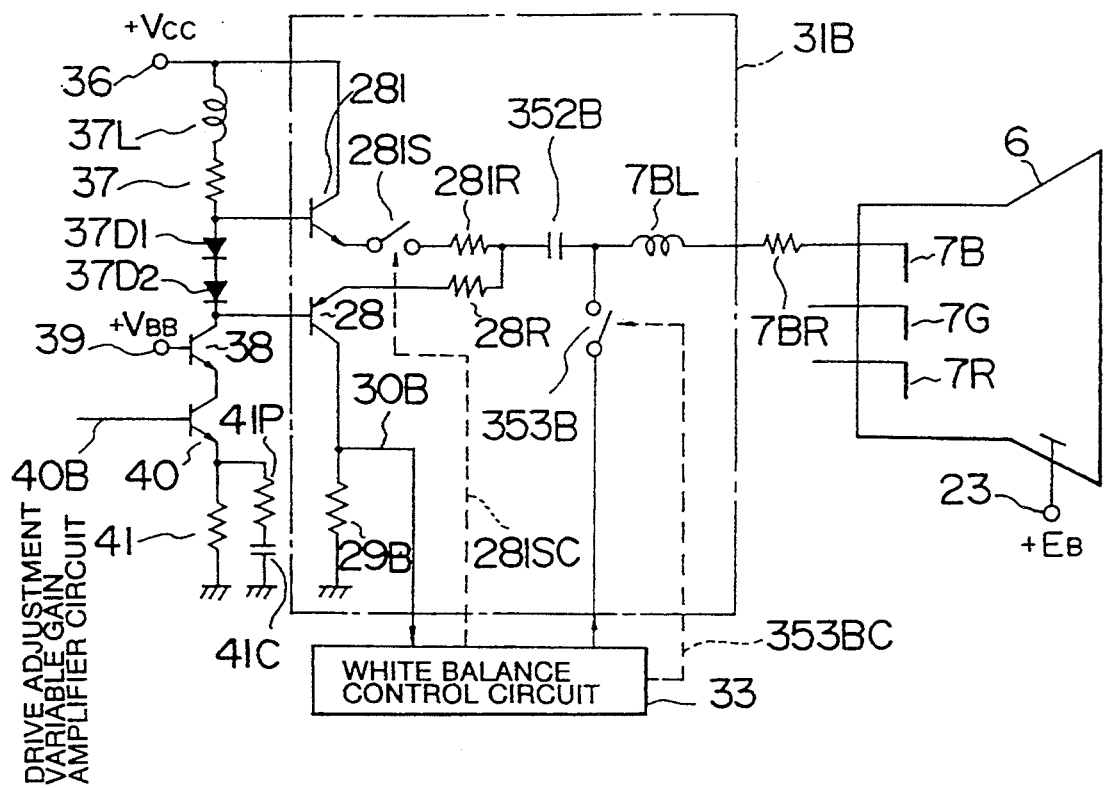

A level compensation and cathode current detection circuit which can widen the band range is shown in FIG. 19A. In other words, FIG. 19A is a circuit wiring diagram showing another embodiment of the level compensation and cathode current detection circuit in FIG. 3.

In the circuit shown in FIG. 19A, a cathode current detection circuit is disposed at the prestige of the level shift circuit so that a high frequency element having a low voltage resistance can be used as a transistor for an SEPP circuit. Application of bias voltage between two bases of two transistors forming the SEPP circuit improves the high frequency characteristics.

In the circuit shown in FIG. 19A, the cathode current is detected by the SEPP circuit to perform a level compensation by a clamp circuit comprising a coupling capacitor 352B and a switch circuit 353B and the cathode 7B of the picture tube 6 is driven via a serial peaking coil 7BL.

Specifically, when the switch circuit 353 is turned on to be closed, the output of the coupling capacitor 352B is clamped by a voltage applied from a white balance control circuit 33 to achieve a level compensation. When the switch circuit 35 is turned off to be opened, a small cathode current of the picture tube 6 gradually flows into the coupling capacitor 352B to cause a change in level during opening of the switch circuit. The switch circuit 358B is turned on at least once every period in which the change in level falls within the change in level which can be deemed as constant (for example, horizontal scanning period). Practically, the switch circuit 353B comprises a diode, which is rendered conductive for blanking period by using the increase in the cathode voltage of the picture tube for blanking and is rendered inconductive by using decrease in cathode voltage in a video display period. Alternatively, the switch circuit 353B comprising an active element such as transistor is rendered conductive for a period in which a cut-off searching signal is inputted to the input 40B of the video output circuit. However, in this case, blanking is performed by applying a blanking signal to electrodes (for example a first grid) other than the cathode of the picture tube 6.

Figure 19B:
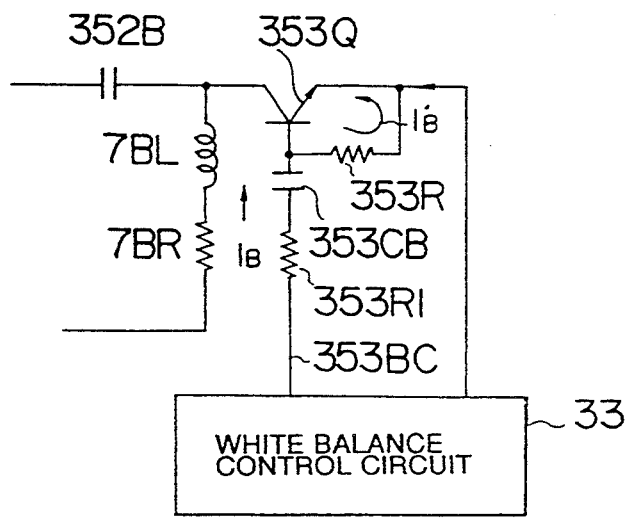

The switch circuit 353B in FIG. 19A can be realized, for example, in a manner shown in FIG. 19A. The switch circuit 353B is realized by turning on or off the transistor 353Q in FIG. 19B. At this time, a forward base current $I_B$ which flows through a base resistor 353R1 when the transistor 353Q is turned on is restricted and the switching speed is controlled by presetting a base by-pass current $I_B$ flowing through a resistor 353R2 when the transistor 353Q is turned on. The influence of the cut-off control voltage (emitter voltage of the transistor 353Q) to the switching characteristics of the transistor 353Q is eliminated by the action of the coupling capacitor 353CB.

It is needless to say that a clamp voltage applied to the switch circuit 353B from the white balance control circuit 33 is a voltage which is generated by a negative feedback circuit so that the detected cathode currents 20B, 20G and 20R in the picture tube 6 is a constant. It is also apparent that the coupling capacitor 352B is inserted in a signal path leading to the cathode of the picture tube 6 to couple the signal to cathode.

Since the above mentioned SEPP circuit is provided at a prestige of the level compensation circuit, the transistor 28 forming the SEPP circuit may include an element which is excellent in frequency characteristics rather than voltage resistance. The above mentioned transfer insensitive band of the SEPP circuit can be eliminated and the deterioration of frequency characteristics can be compensated for by inserting the switch circuit 281S which is controlled so that it is turned on only on detection of the cathode current.

Figure 20:
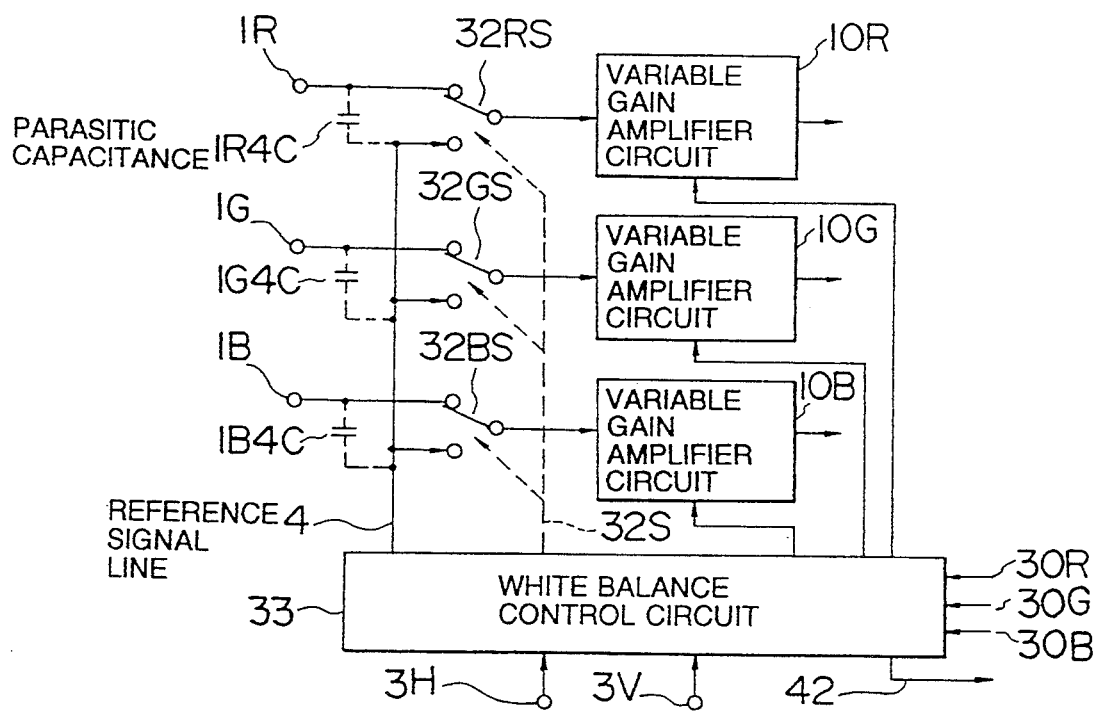
FIG. 20 is a view showing a variation of a reference signal insertion adding circuit in FIG. 3.

A main part of the display including an automatic white balance adjustment circuit which is a further embodiment of the present invention is shown in FIG. 20.

If the automatic white balance adjustment is performed in a TV receiver such as high definition display using a wide band range signals, radio frequency crosstalk is increased due to increase in the number of signal leakage paths, in particular, among the primary color signal circuits. In the embodiment of the present invention as shown in FIG. 3, in order to avoid cross-talk via the reference signal line 4 commonly used by the primary color signal circuits, three reference signal generation circuits 4P are independently used to output an exclusive signals for each primary color signal circuit. In the embodiment shown in FIG. 20, suppression of the cross-talk is achieved by suppressing increase in the circuit scale.

In FIG. 20, reference signals are inserted from the reference signal line 4 by using signal switching circuits 32RS, 32GS and 32BS in lieu of the reference signal insertion adding circuits (32R, 32G and 32B in FIG. 3). It will suffice to cause pulse signals for reversing the positions of the switches 32RS, 32GS and 32BS from the illustrated position to flow through the line 32S for controlling the switch circuits 32RS, 32GS and 32BS, at least for timing periods 4B and 4W for cut-off and drive adjustments shown in FIG. 2D.

Control of turning on or off of these switches may be simultaneously or sequentially conducted in each primary color signal circuit.

Possible signal leakage paths can be considered to be only capacitors 1R4C, 1G4C and 1B4C representing parastic capacitance between switch circuit terminals and the signal lines (the switch circuit control line 32S can easily suppress the signal leakage since it is for transmitting logical signals).

It is of course that the present invention can be applied to prior art overscan system which does not require the above mentioned deflection.

Figure 21:
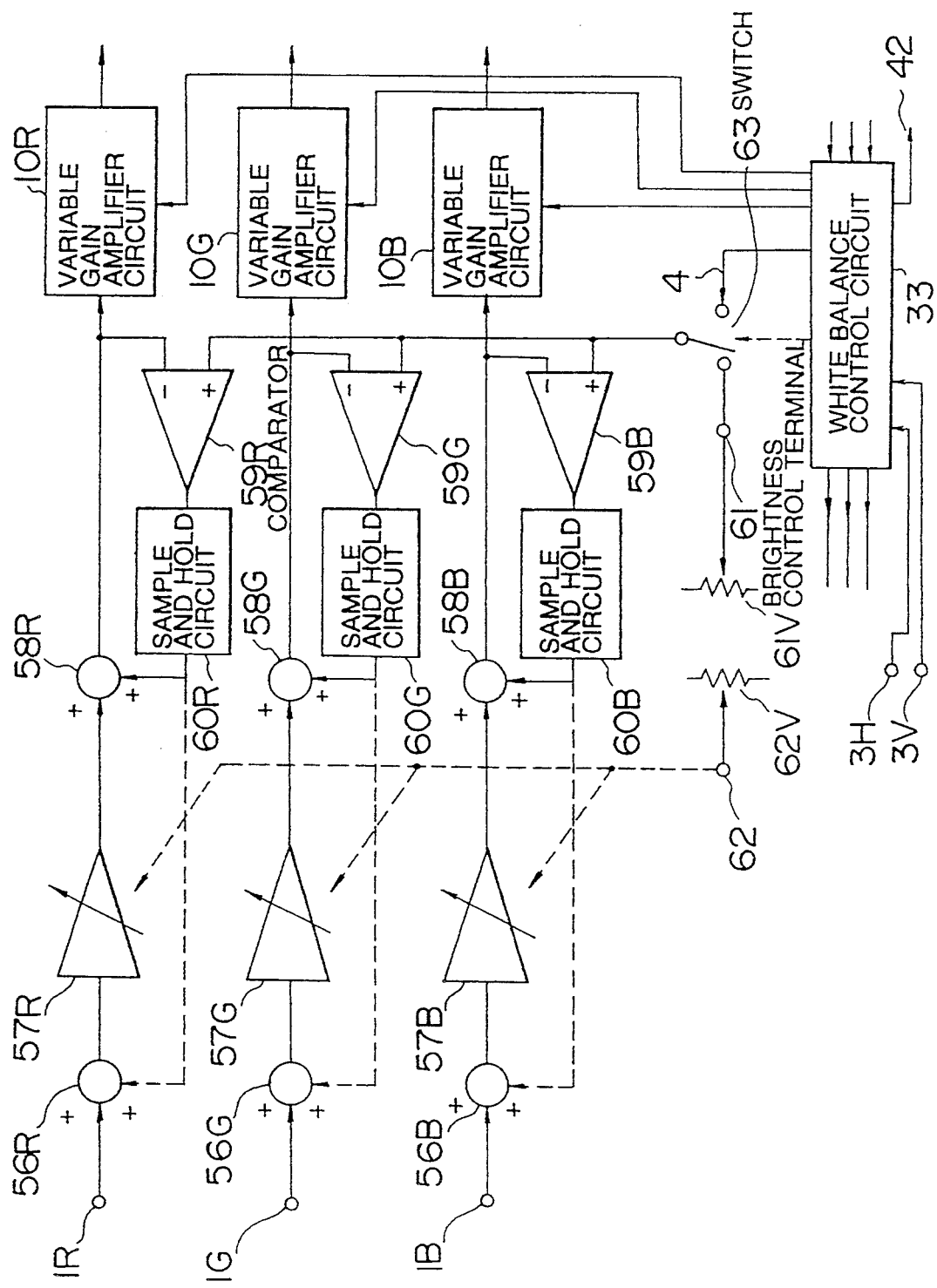
FIG. 21 is a view showing a variation of reference signal insertion circuit.

Another system for inserting reference signals in consideration of cross-talk among the primary color signal circuits is shown in FIG. 21.

In FIG. 21, primary color signal inputted from the terminals 1R, 1G and 1B are subjected to contrast control by amplifiers 57R, 57G and 57B and brightness control by adding circuits 56R, 56G and 56B or 58R, 58G and 58B and thereafter subjected to automatic control of drive adjustment by gain variable amplifier circuits 10R, 10G and 10B. Variable resistors 61V and 62V are provided for brightness and contrast adjustment.

Generation of the cross-talk is sufficiently suppressed since the direct current level added to each primary color signal by the bright control is transmitted through the sample and hold circuit comprising a hold capacitor or a digital memory circuit.

The brightness control is performed by applying a direct current regeneration at timing of clamp pulses generated from synchronization pulses so that each primary color signal is at the same level as the bright control voltage and by maintaining the direct current addition level at this time by the sample and hold circuit for a display period.

Accordingly, if the primary signal color circuits comprise integrated circuits so that they are sufficiently matched with each other, brightness control could be possible even if the d.c. voltage of the brightness control terminal 61 (or d.c. voltage corresponding to this voltage) is added via the sample and hold circuits 60R, 60G and 60B by omitting the comparators 59R, 59G and 59B. Alternatively, the comparator may be connected with only one primary color signal circuit to apply the brightness control signal to the input terminal of the comparator. In the latter case, the output of the sample and hold circuit at the post stage thereof is commonly used in each primary color circuit and is added to each primary color signal.

Also in FIG. 21, the switch 63 is reversed at least at the timing of the pulses 4B and 4W as is similar to embodiment of FIG. 20.

Although a prior art brightness control system has been described with reference to FIG. 21, the reference signals for automatic white balance adjustment are inserted into each primary color signal by using the brightness control circuit in accordance with the present invention.

Accordingly, the reference signal issued as a brightness control voltage by the switch circuit 63 on the automatic white balance adjustment as shown in FIG. 21. Brightness adjustment in the direct coupling type video circuit comprising ICs is stabilized by negative feedback to the output thereof. Therefore, the present embodiment is suitable to perform the automatic white balance adjustment by using a multi-purpose video processing IC. It is of course that the present embodiment is applicable to an overscan type TV receiver which does not require the above mentioned additional scanning.

Figure 22:
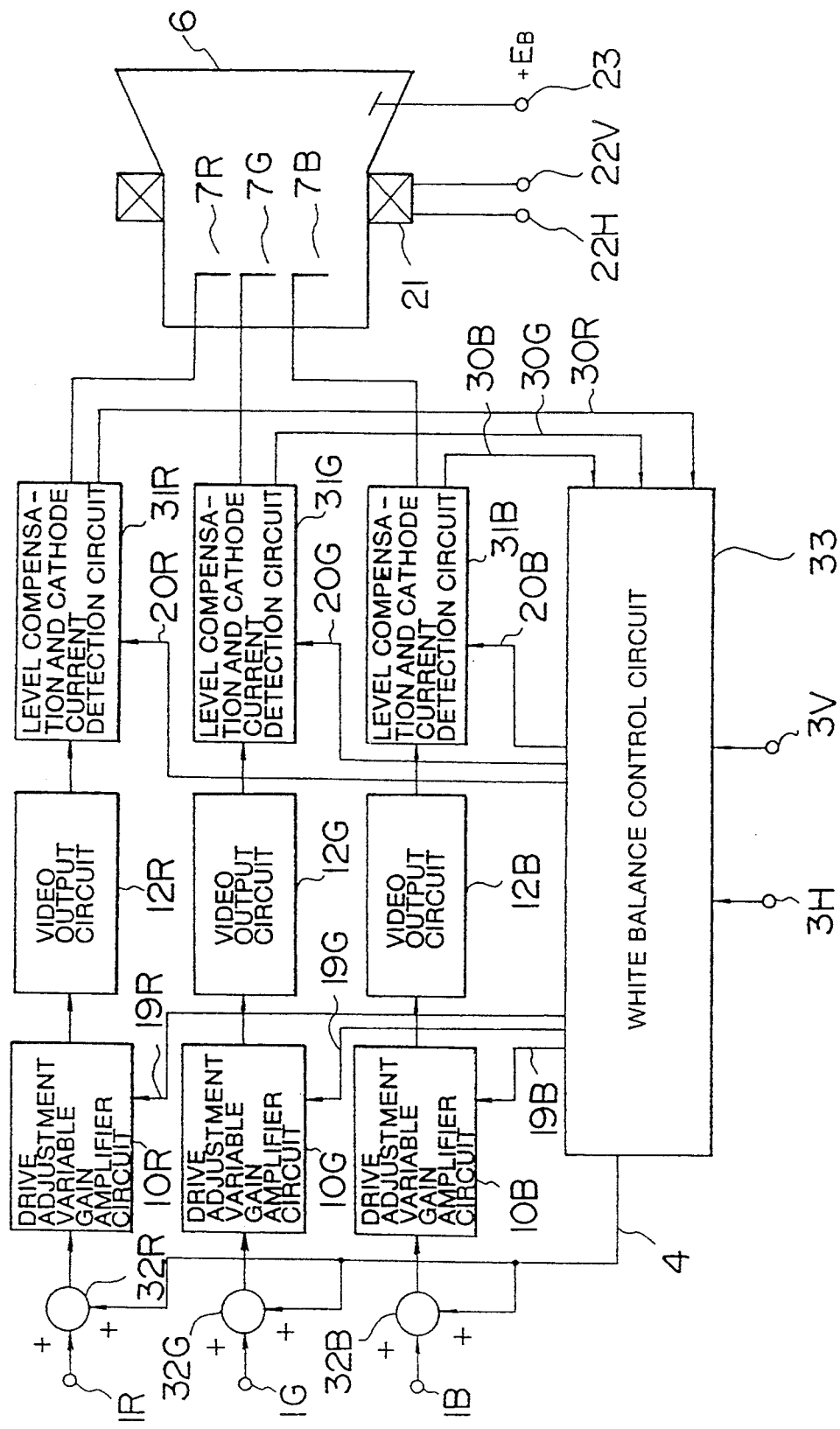
FIG. 22 is a view showing a variation in which a deflection circuit is omitted from the embodiment of FIG. 3.

An embodiment of the present invention which make it possible to automatically adjust while balance of the underscan system TV receiver without using the above mentioned additional deflecting means is shown in FIG. 22. The embodiment of FIG. 22 is different from that of FIG. 3 in that the deflection control circuit 22 is omitted from the latter. The automatic white balance adjustment reference signal is controlled so that it is not prominent to give no uncomfortability to users although it is displayed on the picture tube.

Ways of control are exemplarily listed as follows:

(1) The automatic white balance adjustment is not performed in a vertical deflection period (or horizontal deflection period) as represented by reference signals 4B and 4W having waveforms of FIG. 2D, but in so long period that no uncomfortability is given to users (for example, two signal having a level as low as 4B are inserted in a period until the display period of a video signal). If it is necessary to conduct the automatic white balance adjustment for a so long period that it cannot be stably performed by the white balance control circuit 33 using the hold capacitors shown in FIG. 11, the white balance control circuit 33 using memory circuits shown in FIGS. 14 and 16 should be used.

(2) No uncomfortability is given to users by dispersing the display position of the automatic white balance adjustment reference signals (particularly, white level reference signals for drive adjustment) on the effective screen of the picture tube. For example, the interval of the white level of the reference signal is shortened only in a very short period of the horizontal scanning line or scanning line used for display of the reference signal is periodically changed.

(3) A combination of methods set forth in (1) and (2) are used. It is of course that signal switching circuits or brightness control circuits may be used to insert reference signals as well as using adding circuits 32R, 32G and 32B, respectively.

Figure 23:
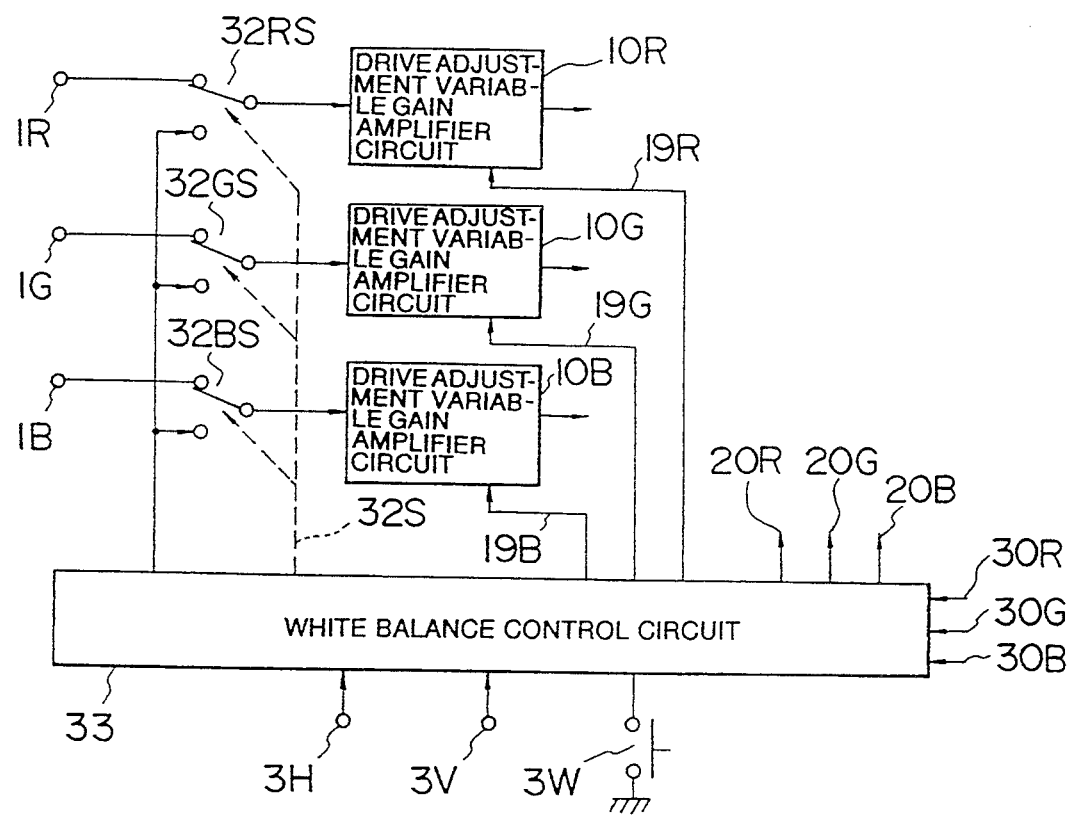
FIGS. 23 and 24 are views showing another embodiment.

An embodiment is shown in FIG. 23 in which users throw an automatic white balance adjustment switch according to needs and allow the adjustment reference signals to be displayed on the effective screen of the picture tube.

In FIG. 23, a white balance control circuit 33 is added with an automatic white balance adjustment switch 3SW. The automatic white balance adjustment is performed only when the switch 3SW is turned on. Thereafter the control signal obtained at this time each control lines 19R, 19G, 19B and 20R, 20G and 20B are maintained.

Accordingly, it is more advantageous to use the memory circuit system as shown in FIGS. 14 and 16 as the white balance control circuit 33. If adjustment patterns for deflection circuit system and convergence circuit system are displayed by using the white balance control circuit 33 which outputs a reference signal responsive to the switch 3SW, various adjustments could be effectively performed to provide a TV receiver having an adjusting signal source therein.

It is of course that adding circuits or brightness control circuits may be used to insert the reference signals as is similar to the embodiments shown in FIGS. 21 and 22.

Figure 24:
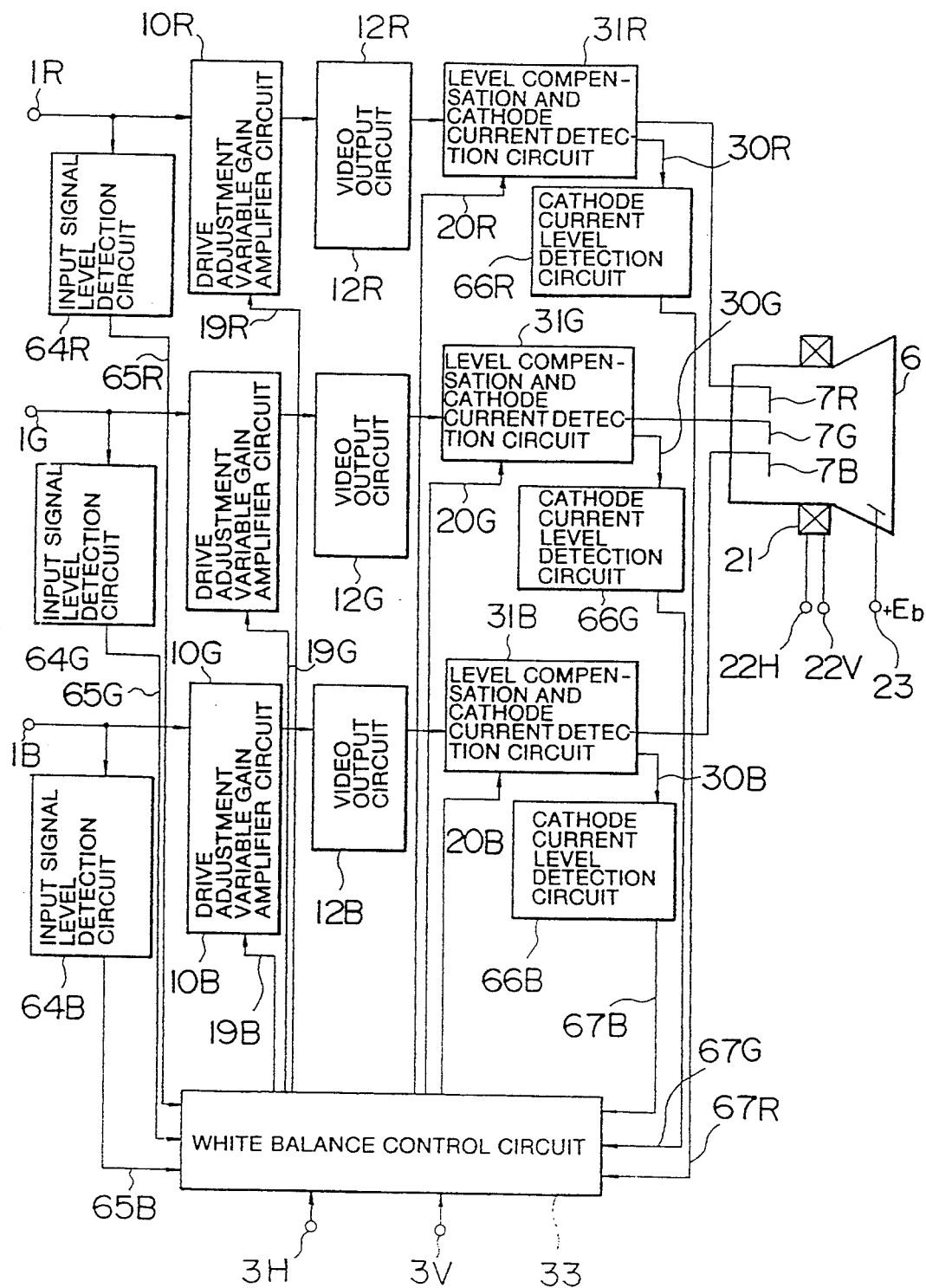

An embodiment of the automatic white balance adjustment circuit in which it is not necessary to generate reference signals for the automatic white adjustment, so that it can be used for both underscan and overscan systems is shown in FIG. 24.

In FIG. 24, the ratios of the input signal levels of primary color signals (including brightness levels) are control to make the detected levels of the cathode currents for primary color signals equal. Alternatively, the input signal levels may be controlled to provide a predetermined relation between the input signal level and the cathode current detection level, rather than the ratio. For example, the input signal levels are controlled so that a value which is obtained by multiplying the input signal levels with $\gamma$ ($\gamma$ is a $\gamma$ compensation constant of a video signal system) is proportional to the cathode current level.

For example, any one of an average value, a peak value, or minimum value of the primary color signal inputted to an input terminal 1R or a momentary value at a constant timing (for example, a front porch of or back porch of a horizontal synchronization pulse at which the video signal is at the black level) is detected by a input signal detection circuit 64R. An average value, a peak value, a minimum value or a momentary value of the cathode current is similarly detected by the cathode current level detection circuit 66R.

A gate circuit which opens only for a display period or a part of front or back porch of the synchronization pulse may be in series connected with the input terminal of each detection circuit 64R, 64G, 64B and 66R, 66G and 66B. The output of the gate circuit on cut-off (low brightness white balance) adjustment and drive adjustment is fed to the white balance control circuit 33 via a dividing output line or two system output line when it is synchronized with the adjustment.

For example, cut-off (low brightness level white balance) adjustment is performed by using a momentary value of the inputted primary color signal and cathode current detection signals at one part of the front or back porch of the synchronization signal or a minimum value for a display period. Cut-off (low brightness level white balance) adjustment should be performed by changing the cathode current detection level depending upon the brightness control or by inserting a reference signal which is not related to the brightness control into a part (immediately before and after of a blanking pulse in which the primary color signal is not subjected to blanking) of a blanking period. The drive adjustment is performed by using a peak value or an average value in the inputted primary color signal and the cathode current detection signal (a peak value or an average value for a display period is possible).

However, a limiter function for a maximum value control in consideration of the signal dynamic range and a minimum value compensation or a noise limiter function in consideration of malfunction due to noises may be added on detection of the peak value or the average value.

Figure 25A:
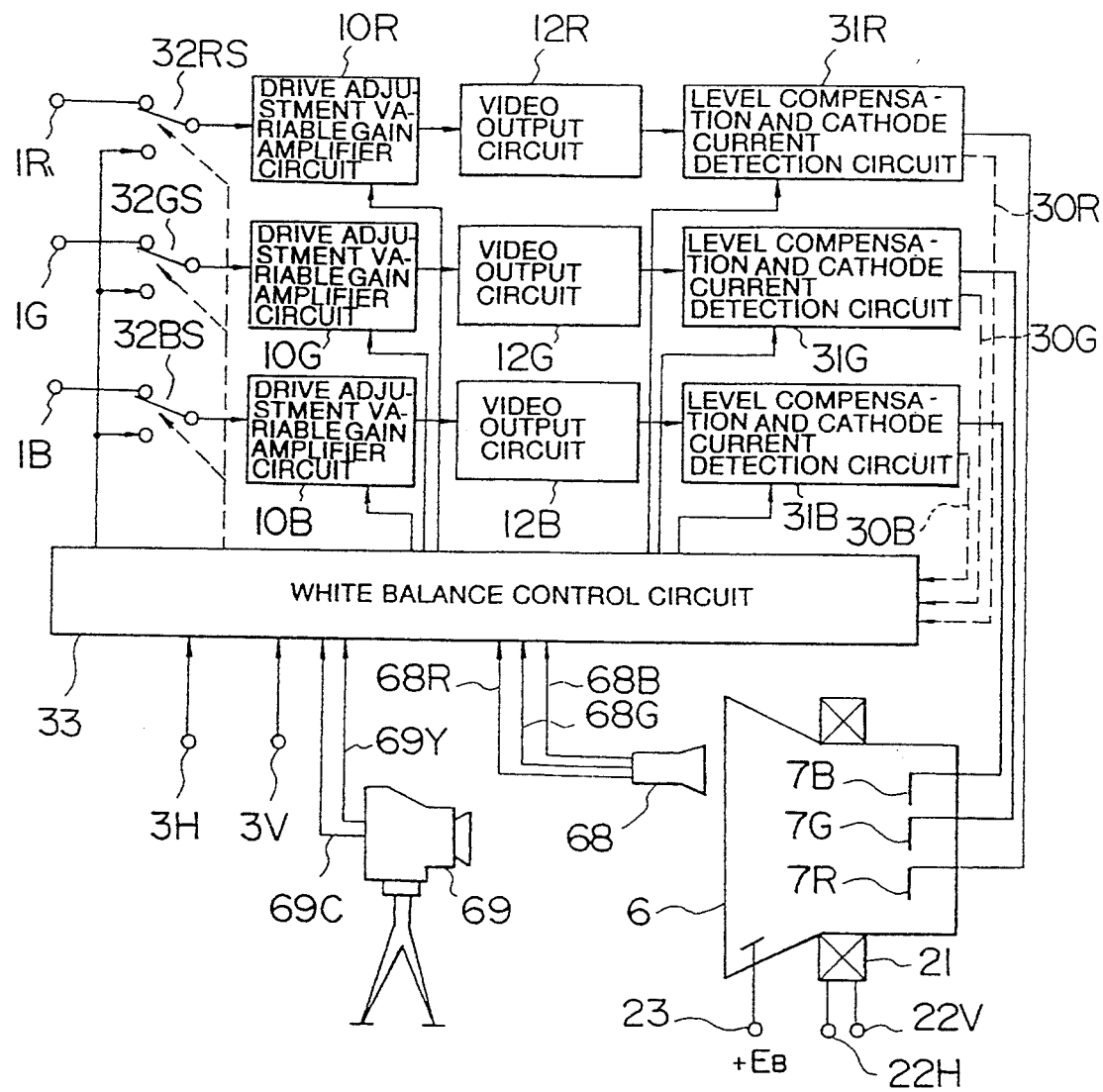
FIGS. 25A, 25B, 25C, 25D and 25E are views showing the structure of a further embodiment in which automatic white balance adjustment is performed by detecting the brightness and chromaticity of a color picture tube.

An embodiment of the present invention which can compensate for irregularity of brightness and chromaticity of the color picture tube and the changes thereof with age is shown in FIG. 25A.

The color picture tube generally has a brightness irregularity due to differences in application condition of a fluorescent material or wall thickness of the front glass, which is difficult to be removed in a manufacturing process. An example of the distribution of brightness irregularity is illustrated by solid lines in FIG. 26. The brightness irregularity may be promoted in a TV receiver using a deflection and high voltage integrated circuit since parabola modulation applied to the horizontal deflection current for compensation for pincushion distortion cannot be removed from a horizontal flyback pulse.

Figure 26:
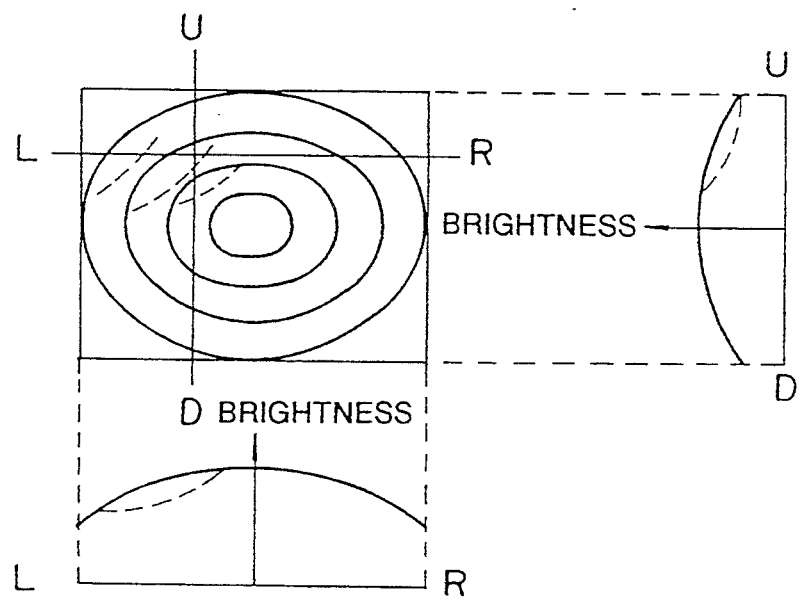
FIG. 26 is a view showing the distribution of the brightness irregularity.

Since the usage frequency is higher at the upper and left area of the effective screen of the picture tube such as character display, the brightness irregularity distribution changes with age as represented by a dotted line in FIG. 26.

The change with age is different among the primary color fluorescent materials. Chromaticity irregularity will occur. The irregularities of brightness and chromaticity and changes thereof with time can also be eliminated in accordance with the embodiment of the present invention.

In FIG. 25A, it is possible to omit cathode current detection signal lines 30R, 30G and 30B to detect no cathode current. Instead of this, it is necessary to connect an optical sensor 68 or a video camera 69 and the like with a white balance control circuit 33 for directly detecting the luminance brightness of the fluorescent material.

Figure 25B:
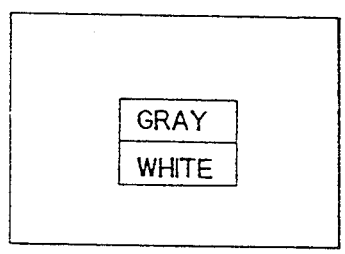
Figure 25C:
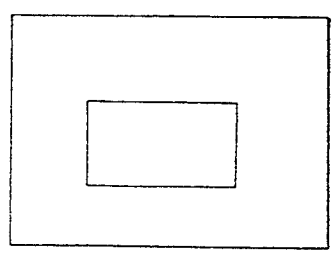

The automatic white balance adjustment is conducted as follows:

A small window pattern comprising upper and lower divided areas of brown and white are displayed in the center or peripheral area (not shown) of the effective screen as shown in FIG. 25B. Cut-off adjustment of dark brightness is performed based on the dark area in the pattern and then drive adjustment of light brightness is performed based on the white area. Alternatively, adjustment may be conducted by alternately displaying brown and white pattern in one window.

Alternatively, a test pattern which is also used for deflection system pattern is displayed. Brightness and chromaticity at various areas are detected by the optical sensor 68 or the video camera 69 which is disposed on the rear side of the screen if the receiver is of projector type TV receiver type so that users cannot notice the presence of the sensor or the camera to perform the automatic white balance adjustment for eliminating the irregularity.

Figure 25D:
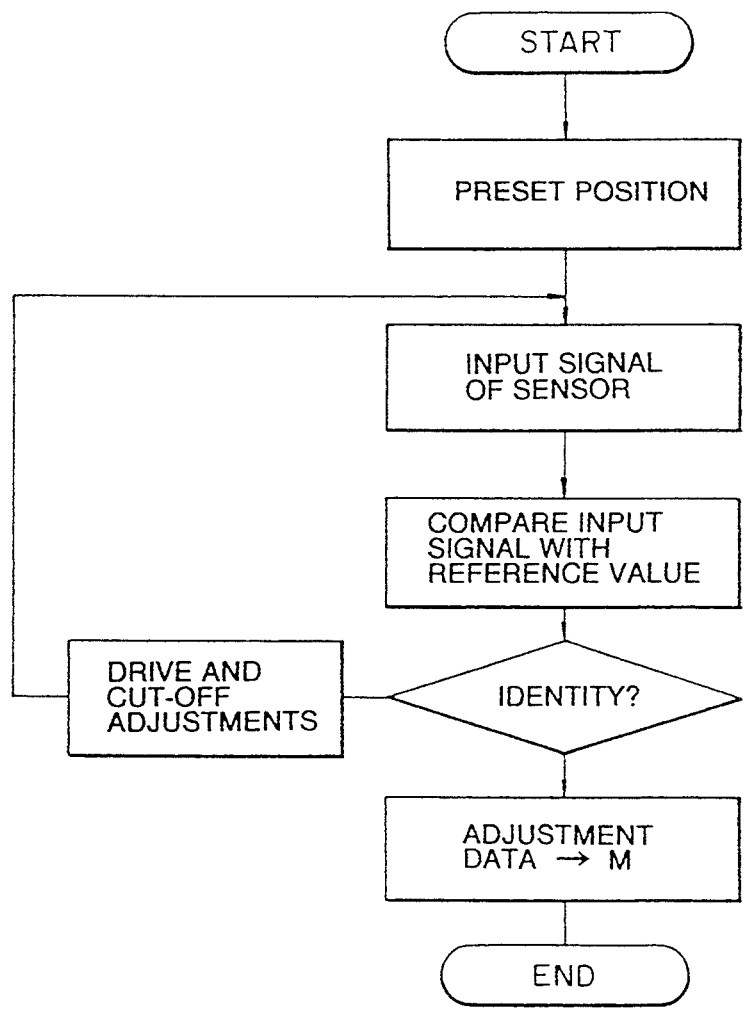
Figure 25E:
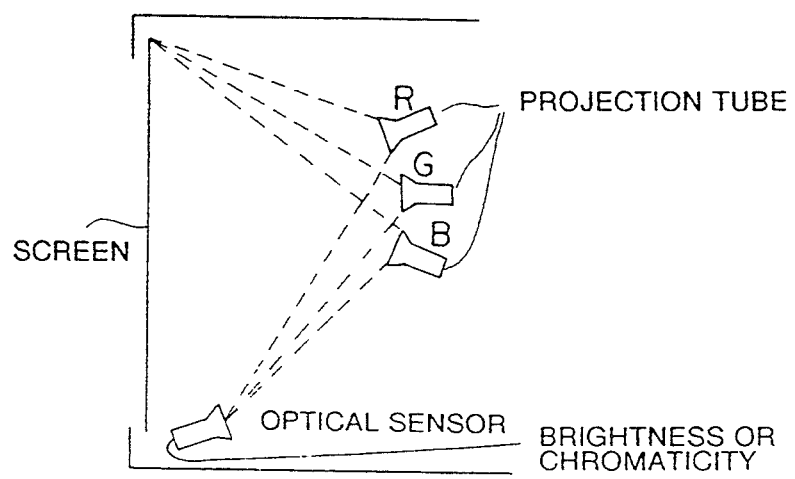

For example, adjustment is performed by a method shown in flow chart of FIG. 25D. The automatic white balance adjustment can be performed by controlling the total luminance characteristics of the entire of the TV receiver including the luminance characteristics of the fluorescent material of the picture tube by using the structure shown in FIG. 25A. A great advantage of using the structure shown in FIG. 25A resides in that luminance or brightness irregularity (possible for black and white or mono-color display picture tube such as projector tube) or chromaticity irregularity can be compensated for. Specifically, as is shown by a flow chart of a process flow of FIG. 25D, balance adjustment positioning is carried out on every spot on the screen and the signal value detected by a sensor in this position is inputted. Test standard values which will be reference values are preliminarily preset in the above mentioned store means provided in the white balance control circuit 33. The detected signal of the sensor is compared with one of the reference values. If they do not agree, drive adjustment and cut-off adjustment of a given amount are conducted and the detected signal is compared with a reference value again. As a result if the detected value agree with the reference value, an adjustment value at this time is stored as an adjustment data and the adjustment at this adjustment point is completed. The above mentioned operation is sequentially repeated at every adjustment point to conduct white balance adjustment.

Specifically, the light from the screen on which brightness and chromaticity is irregular in different positions is detected by the optical sensor 68 or the video camera 69. The gain adjustment of the gain variable amplifier circuits 10R, 10G and 10B and the level compensation of the level compensation circuits 31R, 31G and 31B is carried out by the white balance control circuit 33 so that the detected light amount is constant irrespective of the position on the screen. Irregularity of brightness or chromaticity on the screen can thus be eliminated. The summary of this operation is shown in FIG. 25D.

On the other hand, white balance control data are consecutively read out from the white balance control circuit 33 according to scanning on normal video display. If the optical sensor 68 is incorporated in the screen or the white balance detection is always possible by the use of the video camera 69 at this time, necessity of detection of the cathode current is eliminated.

If the optical sensor or the video camera and the like cannot always be used for detecting the white balance, the cathode current after detection and adjustment of brightness and chromaticity is detected and control is usually achieved based on the detected cathode current.

Use of video camera 69 and the like makes it possible to perform a full automatic adjustment since taking a picture of the entire screen of the picture tube makes it possible to detect the display position. Furthermore, the signal lines are reduced to two lines for brightness and chrominance signals and the primary color signal may be reproduced thereafter. There is provided a memory circuit 52 shown in FIGS. 14 and 16 in the white balance control circuit 33, in which a control map storing the display positions and the white balance control signals are stored is formed. The white balance control data are consecutively read out from the circuit 52 depending upon the timing of the blanking pulse etc. or the amount of the deflection current to eliminate the brightness and chromaticity irregularity.

Figure 15:
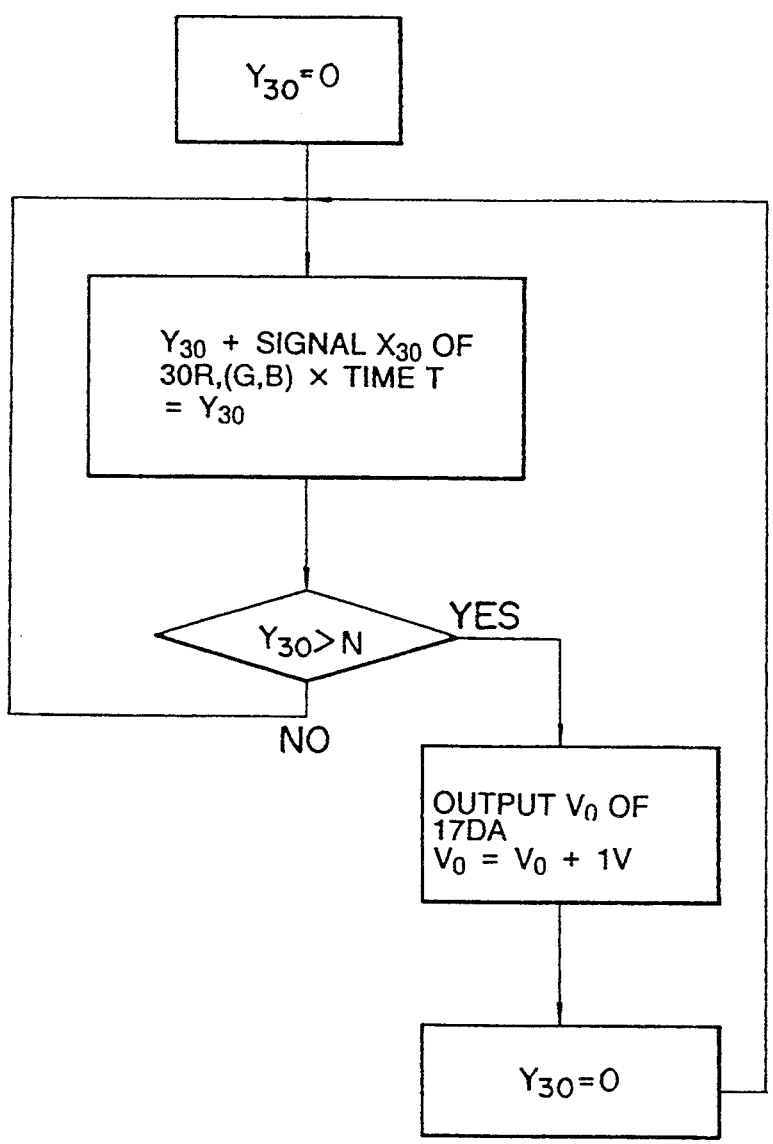

If white balance detection is always possible by the optical sensor 68 and the video camera 69, or the white balance adjustment is performed by detecting the cathode current, brightness and chromaticity irregularity of the color picture tube and change of the TV receiver with age can be eliminated by preliminarily storing brightness and chromaticity irregularity compensation data or compensation data for change with age based on the cathode current are stored in the white balance control circuit 33 (change with time can be detected by counting the clocks or vertical synchronization pulses, or by using an integrated value of the cathode current of the picture tube as shown in FIG. 15).

In addition to the above description, compensation data showing how much cathode current can eliminate brightness and chromaticity irregularity on the screen and compensation data on change with time (compensation data showing how much the cathode current should be changed to compensate for brightness or chromaticity irregularity to eliminate it since how much brightness and chromaticity irregularity is predicted after passage of predetermined ages) can be preliminarily determined by manufacturer's tests and experiments. Accordingly, brightness and chromaticity irregularity on the screen can be eliminated without using the optical sensor 68 or the video camera 69 if these data are stored in a memory circuit.

Another great advantage of detecting the brightness and the chromaticity on the tube screen by the optical sensor 68 or the video camera 69 as shown in FIG. 25A resides in that variations of total luminance characteristics and change with time of products including fluorescent material of picture tubes can also be compensated for. Further, since reduction in circuit scale can be achieved by omitting the beam current detection function from the above mentioned picture tube driving circuit, a high power and wide band video circuit can be provided by reducing the additional capacitance to the video signal path in the circuit. Further, it is of course that an adding circuit and brightness control circuit may be used for insertion 0f the reference signal as is similar to FIGS. 21 and 22.

An embodiment of the present invention which is devised to prevent the primary signal circuit from deteriorating its frequency band range characteristics will be described.

Since the above mentioned automatic white balance adjustment circuit is added with the cathode current detection circuit as shown in FIGS. 18A and 19A, the output capacity is increased so that the frequency band range of the video output circuit is narrowed.

In order to solve the problem, the cathode current detection circuit is omitted and the beam current for each primary color is detected from the anode current of the picture tube in the present embodiment.

Figure 27:
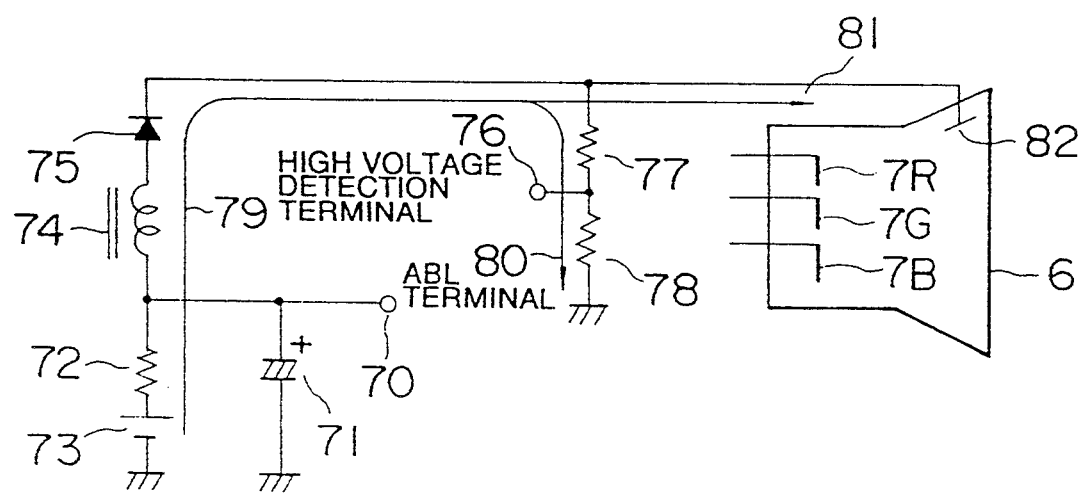
FIG. 27 is a view showing a prior art anode current detection circuit.

Prior art detection of picture tube anode current is carried out by a part of an automatic brightness limitation (ABL) circuit as shown in FIG. 27.

In FIG. 27, a reference numeral 74 denotes a flyback transformer; 76 a high voltage detection terminal; 70 an ABL terminal.

However, a detected current 79 includes a current 80 flowing through a high voltage detection breeder resistors 77 and 78 as well as an anode current 81. A time constant of an anode current detection resistor 72 and a stabilization capacitor 71 is very high to stabilize the action of the automatic brightness limitation circuit so that a peak value of the current cannot be detected.

Figure 28:
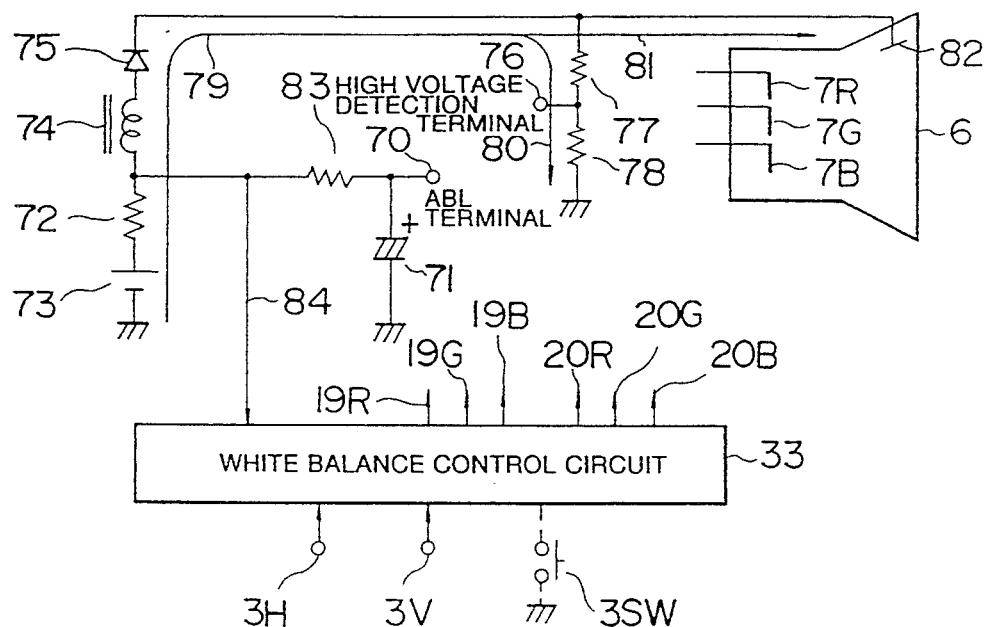
FIG. 28 is a view showing a variation of an anode current detection circuit.

Hence, in accordance with the present invention, the peak value of the current 79 is detected by inserting a stabilization resistor 83 which can be considered as a sufficiently high resistor in comparison with the anode current detection resistor 72 as shown in FIG. 28 illustrating a main part of a further embodiment of the present invention. Since the current 80 can be considered to be substantially constant, the anode current 81 is detected from the change in the current 71 caused when a signal voltage is applied to the cathode of the picture tube 69.

In practice, the anode current 81 is detected by inserting reference signals to each primary color signal circuit. Although the anode current 81 includes a current component flowing through the other electrode such as a second grid and a distortion current component such as high order distortion current of the deflection period flowing across the ground and each wiring of a flyback transformer and flowing through a parasitic capacitance between ABL terminal wirings, the currents other than the beam current can be considered to be substantially constant in amplitude. Accordingly, the beam current for each color can be detected by detecting the changes in the peak value, the average value of the current 79 and the momentary value on sampling the present invention is not only applicable to the underscan system, but also applicable to the underscan system.

Figure 29:
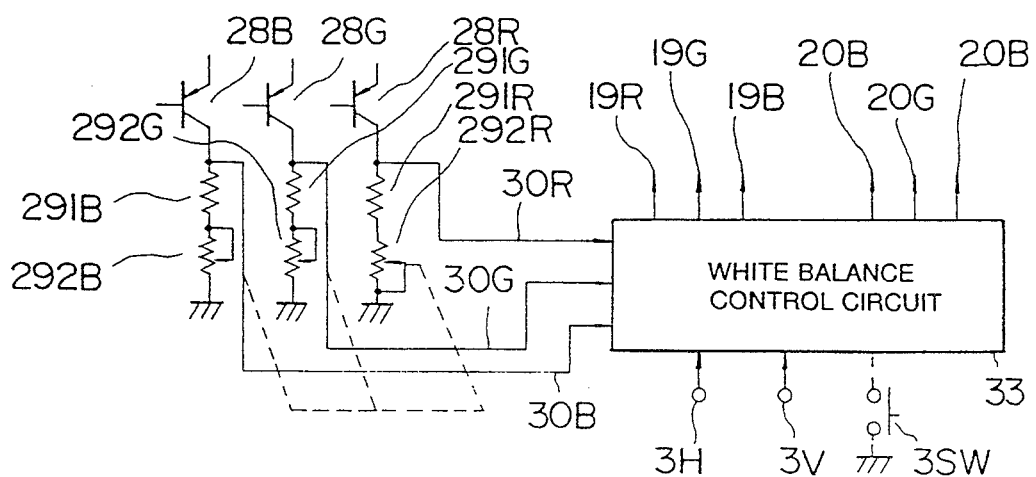
FIG. 29 is a structural view showing a further embodiment.

A main part of the embodiment of the present invention in which color temperature adjustment for a reference white color can be easily performed by white balance adjustment is shown in FIG. 29 and will now be described.

Figure 30:
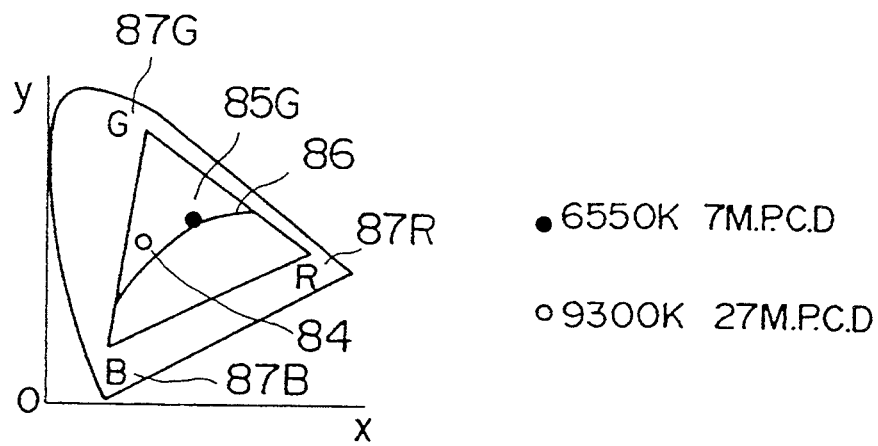
FIG. 30 is a view showing an approximate color temperature of a reference white color in a color television receiver.

A summary CIE chromaticity diagram of white color is shown in FIG. 30. Reference numerals 87R, 87G and 87B denote luminance chromaticity coordinates of each primary color fluorescent material of a picture tube in FIG. 30. Points 84 and 85 denote chromaticity coordinates of (9300K+27 M.P.C.D) and (6550K+7 M.P.C.D) used for reference white color, respectively. Since the chromaticity tracing when the color temperature of a reference white color is changed passes through points 84 and 85 and changes along a black body tracing 86, it can be considered to be substantially rectilinear.

Figure 31A:
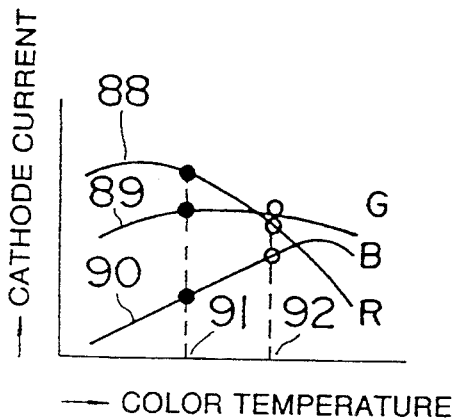
FIGS. 31A and 31B are views showing each primary color cathode current characteristics and normalized cathode current characteristics.

For example, the relation between the reference white color temperature and the cathode current of each primary color under a constant brightness in a picture tube is shown in FIG. 31A.

The color temperatures represented at 91 and 92 show 6500K and 9300K, respectively.

Since cathode current characteristics of each primary color 88, 89 and 90 shown in FIG. 31A can be deemed to be substantially rectilinear in an applicable range, the user can adjust the color temperature of white color by replacing a variable resistor type circuit of FIG. 29 with an automatic white balance adjustment circuit used for a cathode current detection circuit.

In FIG. 29, variable resistors 292R, 292G and 292B comprise a rotary angle triple serially controlled type element. The relation between the color temperature of reference white color and the normalized cathode current for each primary color while one of primary color cathode currents is constant is shown in FIG. 31B.

Although at least two elements are enough to form the above mentioned variable resistor, reliability of the variable resistor can be enhanced by selecting one primary color which makes the cathode current detection resistor constant. This is due to a fact that if the current is allowed to flow from a slider of the variable resistor for a long period of time, carbon resistor material around slider contacts would be removed by a galvanic corrosion phenomenon so that inferior contact and discontinuities occur in a resistance variable range.

Therefore, occurrence of the galvanic corrosion can be avoided by selecting one primary color which makes the cathode detection resistor constant and by changing the resistances of the variable resistors of the other two primary color in the same direction.

Figure 31B:
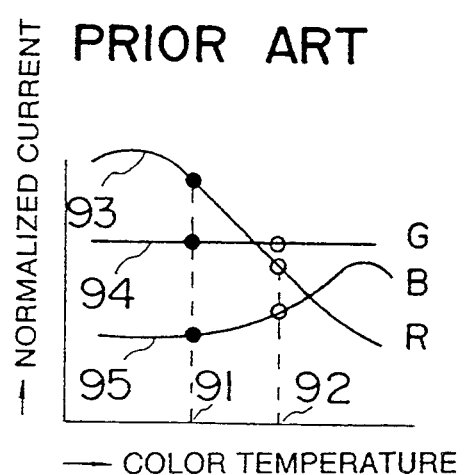

To a picture tube having a characteristics as specifiedly shown in FIGS. 31A and 31B, the resistance of an R or B primary color cathode current detection resistor is made constant and the other two primary color cathode current detection resistors are formed by connecting variable resistors 292G and 292B as shown in FIG. 29.

Similarly, the color temperature may also be made variable by making one of drive control or cut-off control variable and by tracking the other control by the automatic white balance adjustment.

If it is necessary to perform cut-off and drive adjustment under a constant picture tube brightness when the color temperature is changed, these adjustments may be performed by a method as follows: The brightness on respective adjustments can be made constant by changing a reference signal or comparison reference voltage generated from the white balance control circuit (for example, a reference signal outputted to the reference signal line 4 and a reference voltage outputted from a D-A converter circuit 17D to a non-inverting terminal of the comparator 16R).

Alternatively, it is possible to store various data of the beam currents or luminance brightness ratios of each primary color in the white balance control circuit 33 incorporated in the memory circuit 52 shown in FIGS. 14 and 16, and to use them by user's selection.

At this time, it is possible to perform the automatic white balance adjustment to provide a reference white color of desired color temperature by operation such as linear approximation from stored plural data. It is .of course possible to perform the compensation for the scanning position and change with age on presetting the temperature color.

The present invention can be applied as variations as follows: The cathode current detection resistors of picture tubes of various color TV receivers are replaced with electronically controlled resistors and the optical sensor or a combination of the optical sensor and the automatic white balance adjustment apparatus are commonly used for various TV receivers to perform adjustments. Alternatively, reference data for white balance adjustment stored in various color TV receivers and systems are made controllable from outside and the optical sensor or a combination of the optical sensor and the automatic white balance adjustment apparatus are commonly used for various TV receivers to perform adjustments. Comparison of performance of various receiver or color design simulation can be performed by using cathode current detection resistor values relevant to each TV receiver or using reference data for white balance adjustment controlled from outside.

Figure 32:
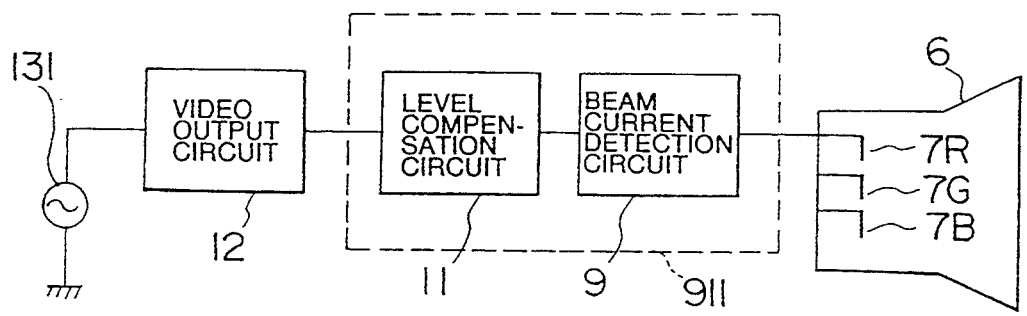
FIGS. 32 through 34 are structural views showing a further embodiment in which the picture tube drive circuit comprising a level compensation circuit and a beam current detection circuit.

Now, an embodiment, the block diagram of which is shown in FIG. 32 in which a picture tube drive circuit 911 provided between the video circuit 12 and the picture tube 6 comprises a level compensation circuit 11 and the beam current detection circuit 9 will be described with reference to circuit diagrams of FIGS. 33A, 33B and 34. Although only a processing circuit of R signal component will be described and illustrated hereafter, it is of course that same processing of G and B signals are performed in the other circuits. Description and illustration of components of circuits other than the video output circuit 12, picture tube drive circuit 911 and the picture tube 6 are omitted, since they are identical with those of the embodiment shown in FIG. 3.

In FIG. 32, a reference numeral 131 denotes an input signal source, 12 a video output circuit, 11 a level compensation circuit, 9 a beam current detection circuit, 6 a picture tube. In FIG. 32, the picture tube drive circuit 911 comprising the level compensation circuit 11 and the beam current detection circuit 9 disposed at the poststage thereof is disposed at the poststage of the video output circuit 12. Power consumption of the video output circuit 12 can be reduced by using a structure shown in FIG. 32. Detailed circuit structure of the embodiment of the present invention, the block diagram of which is shown in FIG. 32 is shown in FIG. 33A. In FIG. 33A, reduction in power consumption of the video output circuit is achieved by inserting a level compensation circuit 110 which is controlled by a signal transmitted from a control line 20R between the video output circuit 12 and the picture tube 6. The band range of the video output circuit 12 is widened by a cascade connection of the transistors 24 and 241, an emitter peaking of a capacitor 252 and a parallel peaking of a coil 261. A resistor 25 presets the gain of an emitter grounded amplifier circuit comprising the transistor 24, and a resistor 251 presets the characteristics of the emitter peaking. A reference numeral 27 denotes a voltage source terminal of the video output circuit. A terminal 242 is for applying a bias voltage to the base of the transistor 241 forming the base grounded amplifier circuit. The level shift amount of the level compensation circuit 110 is controlled by the signal transmitted from the control line 20R. The beam current detection circuit leads the cathode current flowing through the emitter of the transistor 28 to convert the current into a voltage signal by a detection resistor 29 to output it to a signal line 30R. At this time, the cathode current includes a leak current from the other electrodes in the picture tube in addition to the beam current. Therefore, in order to detect the beam current, the detected beam current is made sufficiently higher than the leak current or the leak current is cancelled by means which will be described hereafter.

A diode 282 and a resistor 284 are adapted to protect the transistor 28 when a discharge occurs in the picture tube. γ-compensation can be achieved by adjusting the value of the resistor 284.

Deterioration of frequency characteristics of the drive circuit is caused by a stray capacitance 71R of the picture tube, a stray capacitance 293 of a signal line 30R connected with a parasitic capacitance 281 of the transistor 28 and a parasitic capacitance of a diode 292 when a resistor 291 is zero ohm.

Figure 33A:
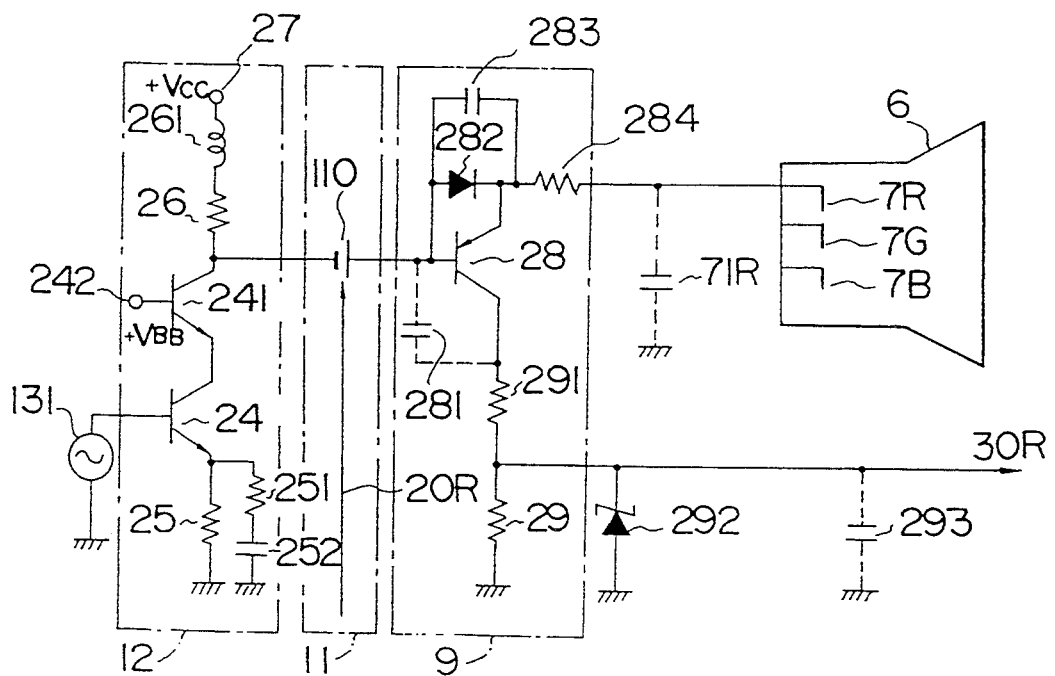

Hence, in the present embodiment, the value of the resistor 291 shown in FIG. 33A is preset sufficiently higher than the value of a resistor 26, or a parallel impedance of the stray capacitance 293 and the parasitic capacitance of the diode 292 at a frequency at which the above mentioned deterioration of the characteristics becomes a problem. This can eliminate an adverse effect of the stray capacitance caused via the parasitic capacitance 281 of the transistor 28. The capacitor 283 serves to bypass a video signal for compensating for the insufficient picture tube drive ability of the transistor 28 at high frequencies. This bypass action eliminates a mirror effect due to amplifying action of the transistor 28. The diode or Zener diode 292 has functions to protect a control circuit connected via the signal line 30R, to enhance the beam current detection sensitivity by the increase in the value of the resistor 29 and to suppress the saturation of the transistor 28 due to increase in collector voltage. It is of course that the transistor 28 may be connected with other active elements such as FETs, vacuum tubes and the circuit including passive elements shown in FIG. 33A. In this case, it is of course that impedances 291A, 291B which function similarly with the resistor 291 in FIG. 33A are necessary.

Figure 33B:
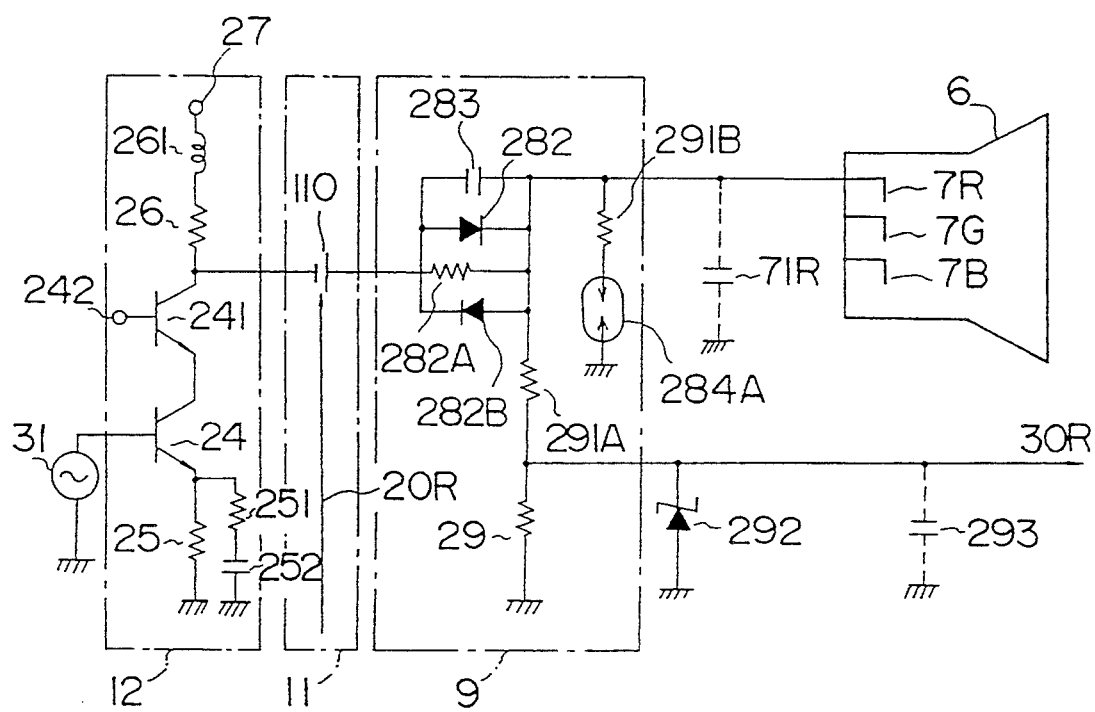

A modification of the embodiment of FIG. 33A is shown in FIG. 33B. This modification is substantially identical with the embodiment of FIG. 33A except for the structure of the beam current detection circuit 9 in FIG. 33A. The beam current detection circuit 9 shown in FIG. 33B includes a video signal bypass capacitor 283 which is in parallel connected with video signal transmission diodes 282 and 282B, a video signal transmission resistor 282A having a high resistance value to restrict the detection leakage of the cathode current. The video signal output line connected with the picture tube 6 is grounded via a frequency characteristic compensation impedance 291B and a spark gap element 284 for protecting the circuit against discharge in the picture tube. A signal on the video signal output line to the picture tube 6 is voltage-divided by a frequency characteristics compensation impedance 291A and a resistor 29 to be outputted to the signal line 30R.

Figure 34:
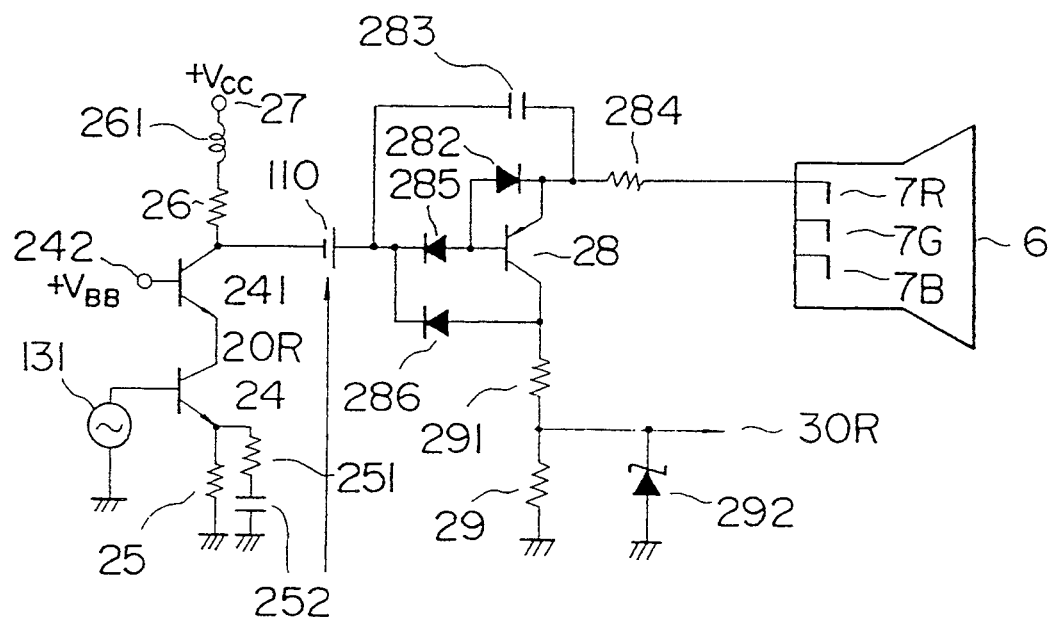

An embodiment which is effective to increase the amplitude of the drive voltage and the beam current or drive in association with big and high brightness picture tube is shown in FIG. 34. When the drive voltage and current on drive is increased, the transistor 28 is saturated by a fact that the voltage across the emitter and the collector is decreased so that there is the possibility that the drive action of the picture tube and the detection of the beam current will be discontinued. In FIG. 34, the voltage across the base and collector of the transistor 28 is prevented from being forwardly and largely biased by a clamp action of the transistors 285 and 286. The type of the transistors 285 and 286 may be desiredly selected provided that they meet the absolute rating requirements such as resistive reverse voltage. The diodes may be Schottky barrier diodes in view of fast response or both diodes may be different in type. For example, enhancement of saturation prevention effect is made possible by a Baker clamp type using by forming the diodes 285 and 286 of silicon and germanium diodes, respectively.

Figure 35:
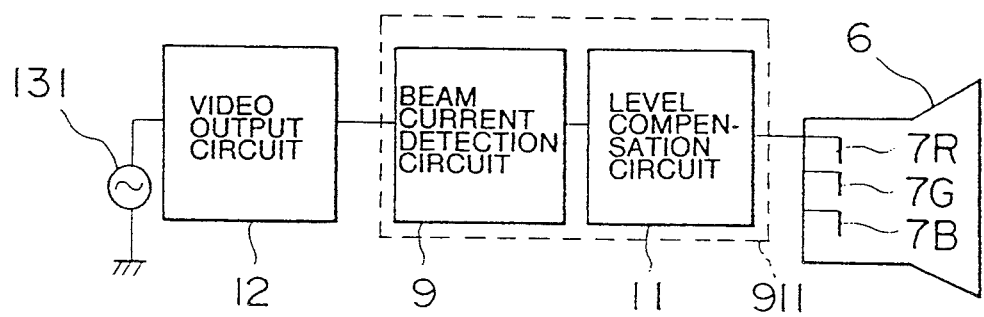
FIGS. 35 through 39 are structural views showing an embodiment in which the picture tube drive circuit comprises a beam current detection circuit and a level compensation circuit which are disposed in order.

An embodiment in which a picture tube drive circuit is provided at the poststage of the video output circuit and the picture tube drive circuit comprises a video detection circuit and a level compensation circuit which are provided at the prestage and the poststage, respectively is shown in a block diagram of FIG. 35. Power consumption of the video output circuit 12 may be suppressed and the band range of the beam current detection circuit 9 may be widened by using a structure shown in FIG. 35. Detailed circuits in the block diagram of one embodiment of the present invention shown in FIG. 35 is shown in FIG. 36.

Figure 36:
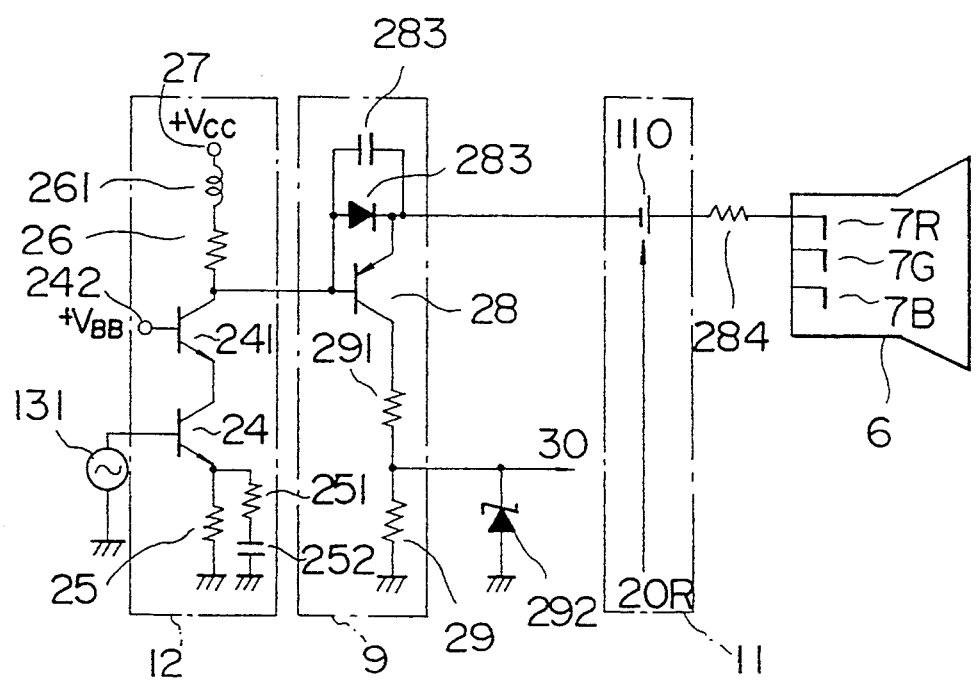

A high performance element having a low resistive reverse voltage can be selected as the transistor 28 used in the beam current detection circuit by forming the circuit as shown in FIG. 36. For example, an element having not higher than 70 V may be used although the element having not less than 160 V should be used in the embodiment of FIG. 4. Generally, the amplification ability and excellence in high frequency characteristics and low parasitic capacitance of the active element is consistent with the resistive reverse voltage. For example, the detection precision of the beam current can be enhanced and the minimum detection current can be reduced by selecting an element having a high amplification as the transistor 28. That is, $I_{cbo}$ can be reduced. The frequency band range of the drive circuit can be widened by improving the high frequency characteristics of the transistor 28 or by reducing the parasitic capacitance. If the reliability of the level compensation circuit 110 can be assured, the protection resistor 284 shown in FIG. 36 could be moved to a position between the beam current detection circuit and the level compensation circuit or could be omitted. It is preferable to dispose the protection resistor 48 immediately before the picture tube as shown in FIG. 36 in consideration of protection of the level compensation circuit 110 and the deterioration of the frequency characteristics by the parasitic capacitance of the protection circuit.

Figure 37:
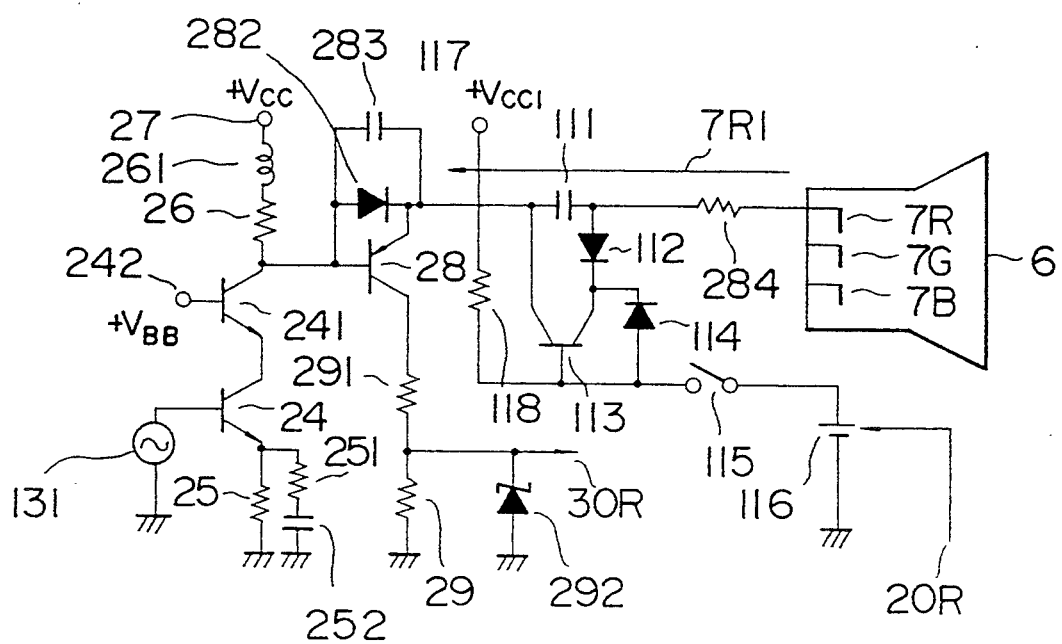

An embodiment in which the level compensation circuit 110 of FIG. 36 includes a clamp circuit is shown in FIG. 37. In the circuit shown in FIG. 37, a level controlled clamping voltage source 116 is connected with the base of a clamp transistor 113 via a clamp switch 115 to clamp a coupling capacitor 111 on the side of the picture tube. Change in clamp level (black fall) due to leakage of a discharge current to peripheral circuit is eliminated by making a discharge current flowing through the coupling capacitor 111 a circulating current across the emitter and collector of the transistor 113. In case of FIG. 37, the black fall caused by addition of a sum of the forward voltage due to conduction of the diode 282 and the forward voltage across the base and the emitter of the transistor 28 to fall of voltage across the resistor 26. A resistor 118 serves to increase the base voltage of the transistor 113 to a power source voltage connected with the terminal 117 in a non-clamping period in which the switch 115 is opened. Accordingly, a reverse voltage is applied to a diode 112 in a non-clamping period so that the emitter of the transistor 113 is released from the coupling capacitor 111. A diode 114 is a protection diode for assuring a reverse voltage condition across the base and emitter of the transistor 113 in a non-clamping period and on discharge of the picture tube. The clamp circuit shown in FIG. 37 synchronous with the turning on or off of the clamp switch to suppress the power consumption of the circuit for controlling the clamp. The clamp switch is usually turned on once for a blanking period.

However, in order to omit the switch 115 and the resistor 118 by short-circuiting and opening them, respectively, it will suffice to control the signal of the signal line 20R for switching the voltage of the voltage source 116. The clamp circuit functions as an asynchronous peak clamp circuit in which the diode 112 and the transistor 113 is automatically rendered conductive by increase in the video signal level on the anode side of the diode 112 even if the voltage of the voltage source 116 is not switched to be constant. Even if the voltage source 116 is preset at a constant voltage, a high frequency component of the video signal leaked via the diode 112 by the influence of an absolute value of an inner impedance left in the voltage source 116 and a time constant may be detected by a diode 114 to cause a change in clamp level. In this case, a minimum necessary capacitance to cancel the detection action of the diode 114, for example a capacitor which is in the order of several tens pF giving no adverse effect to the frequency band range of the drive circuit is added to the diode 114 in parallel therewith, or a Zener diode having a high parallel parasitic capacitance and the like may be used as the diode 114.

It is apparent that the coupling capacitor 111 which is charged with the detected beam current 7R1 will not cause a problem such as sag in FIG. 37 if it has a capacitance used for usual clamp circuits.

Figure 38:
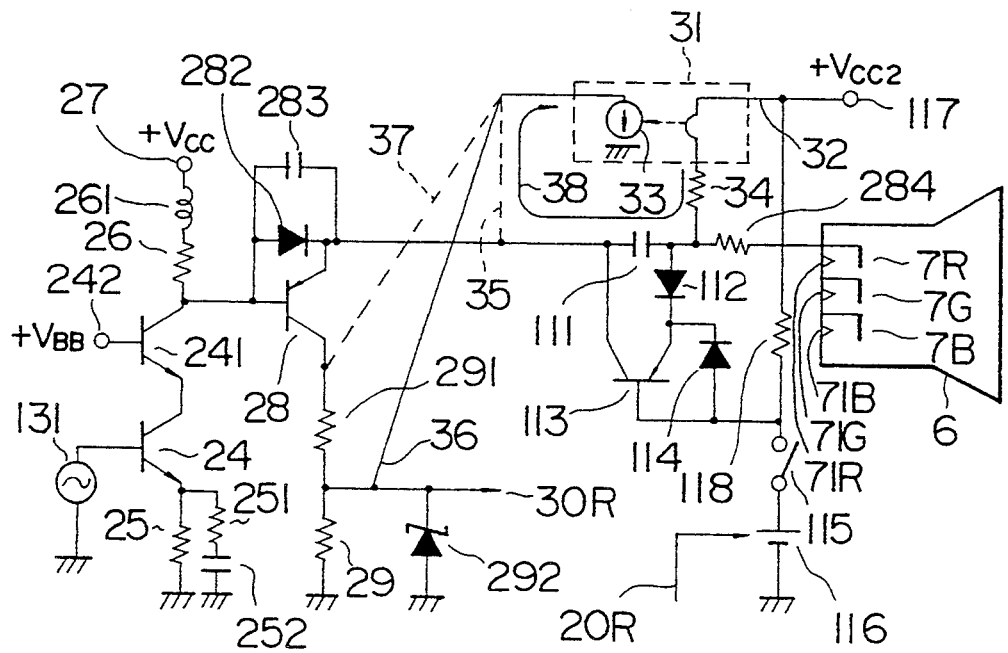

An embodiment in which the cathode current may be detected at the prestage of the compensation circuit if a bypass current other than the beam current, or a leak current across the picture tube electrodes flow through the picture tube drive signal line is shown in FIG. 38. In order to achieve a fast rise-up of the clamp operation after turning on of the power source, a charging bias current may be caused to flow through the coupling capacitor 111 via a resistor 34 or a series connection of the resistor 34 and the diode. However only beam current cannot be detected since the bias current is added without changing the prior art system. Accordingly, the bias current is cancelled by using a current controlled current source 31 as shown in FIG. 38 so that it will not flow through a detection resistor 29. The current controlled current source 31 serves to detect the bias current 38 flowing through the input terminal 32 thereof for supplying a current same as the detected bias current 38 from an output current source 33. The current cancellation is made possible by causing the output current to flow to the prestage of the detection resistor 29 in the beam current path, for example, an output point via at least one of output lines 25, 26 and 37 in the drawing. The cathode current includes a leak current component from other electrodes such as a heater 71R, a first grid, a second grid in addition to the beam current component in the picture tube. However, the leak current component from the electrode separated among the primary colors R, G and B can be cancelled by connecting these electrodes with the prestige of the detection resistor 29 in the beam current path via resistors or active elements. It is needless to say that the above mentioned operation does not depend upon the type of picture tube drive electrode, such as cathode, each grid and anode.

Figure 39:
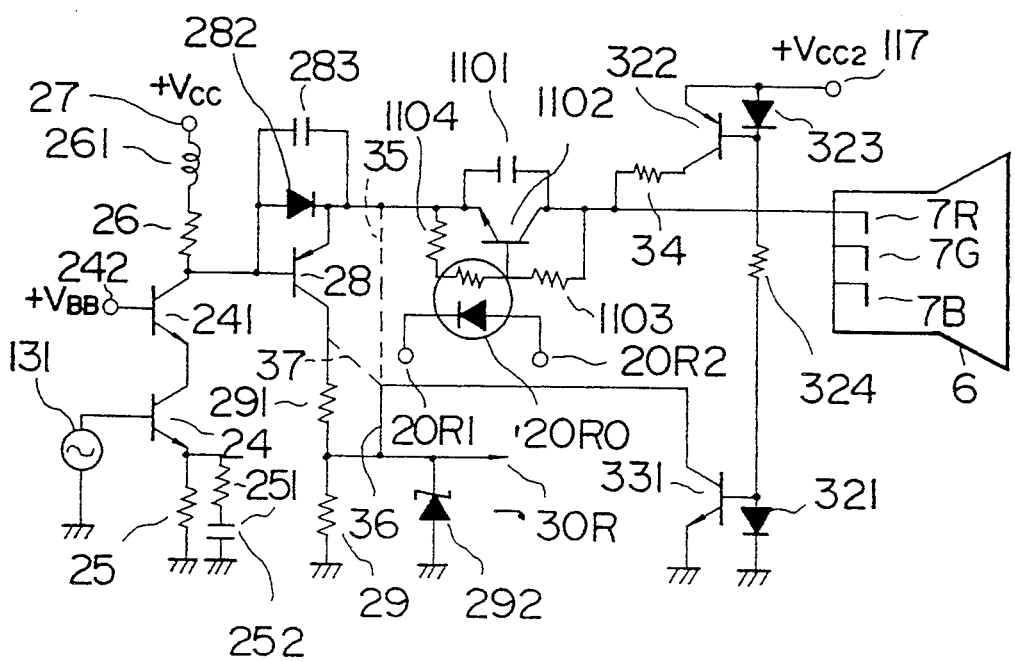

A further embodiment for supplying a bias current to the level compensation circuit is shown in FIG. 39. In FIG. 39, the level compensation circuit comprises a current controlled voltage source circuit using a transistor 1102. The voltage of the voltage source circuit is controlled by a current flowing across input terminals 20R1 and 20R2 of a photo coupler 20R0. A current controlled by a voltage of a control signal line 20R of FIG. 38 flows across both terminals 20R1 and R2.

Although the inner impedance of the voltage source circuit will become lower than that of a bypass capacitor 1101 for a high frequency signal, it depends the bias current, that is, it is substantially proportional to the amount of the bias current of the transistor 1102 and becomes a value which is not an infinetly zero. It is necessary to make the control bias current constant or the sufficiently increase it in comparison with the beam current in order to suppress an adverse effect of the inner impedance on the voltage of the voltage source circuit. Therefore, a constant control bias current is caused to flow to the voltage source circuit to drain a current equal to this bias current from the prestage of a detection resistor 29 in the beam current path for making it possible to detect the beam current. The control bias current is determined by a temperature compensation diodes 323 and 321 and a current flowing through the resistor 324 and flows from the transistor to a transistor 331 via the regulated voltage circuit. In this case, a resistor 34 which is connected with the collector of the transistor 322 serves to isolate a parastic capacitance on the side of the collector of the transistor 322 from a drive signal source for suppressing the deterioration of the frequency characteristics of the drive circuit. The collector of the transistor 331 is connected with at least one of output lines 35, 36 and 37. A series resistor can be connected with respective collectors of the transistors 322 and 331 and respective transistors 321 and 322 to increase presetting precision of the control bias. It is also possible to thermally couple the transistors 322 and 321 with the transistors 331 and 321, respectively or to form them on the same semiconductor chip, for example, an IC to enhance the thermal stability of the control bias current.

Figure 40:
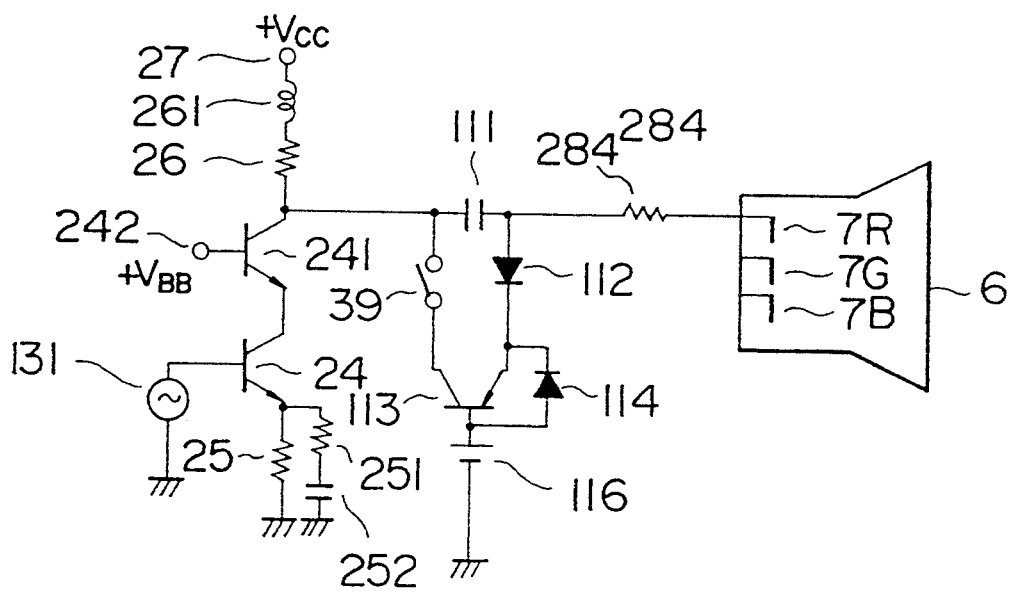
FIGS. 40 through 43 are structural views showing an embodiment of a clamp circuit suitable for widening the band range of the picture tube drive circuit.

An embodiment in which a clamp circuit which is used as the level compensation circuit in the above embodiment is made applicable to a wider band range picture tube drive circuit is shown in FIG. 40. In the embodiment of FIG. 40, the collector of a clamp transistor 113 is connected with a drive signal source via a switch circuit 39 which is short-circuited only on clamping operation. Since a collector and base capacitance and a stray capacitance of the collector of the transistor 113 will not be added to the drive signal source by providing the switch circuit 39 for a display period during which a wide band range drive signal is applied to a picture tube 6, further widening of the band range of the drive circuit would be possible. The voltage of a voltage source 116 may be switching-controlled for a synchronous clamp circuit or alternatively may be constant for an asynchronous clamp circuit as is similar to the case of FIG. 37. However, a diode is always connected with the drive signal source by provision of the clamp circuit so that a capacitance is added thereto. If it is necessary to reduce the capacitance which is added via the diode 112, application of a reverse voltage upon the diode 112 for the display period makes it possible to in series connect another diode 1121 in the same polarity with the diode 112.

Figure 41:
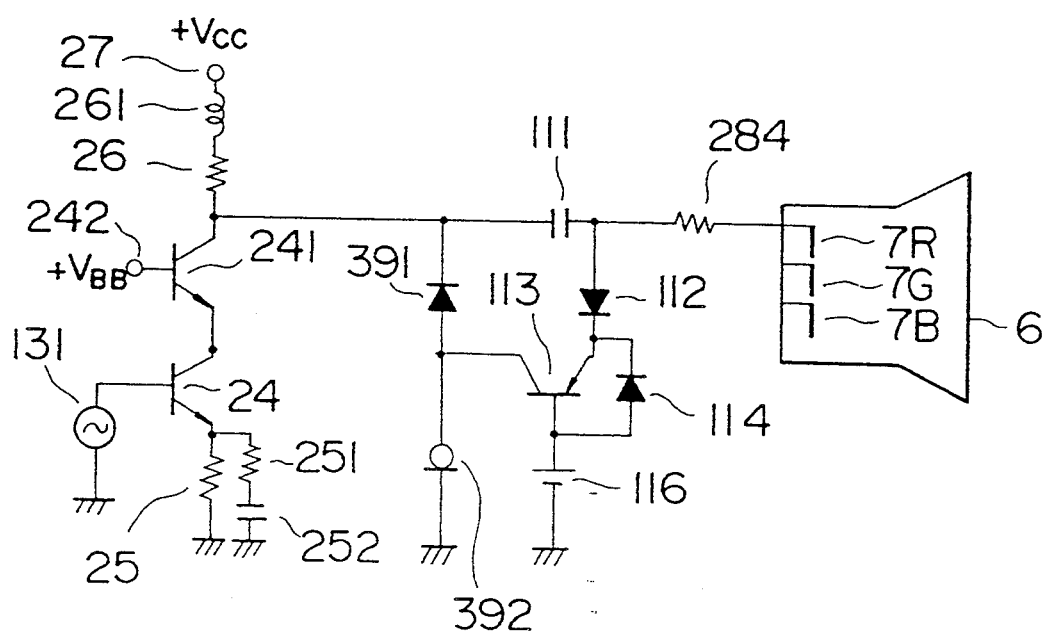
Figure 42:
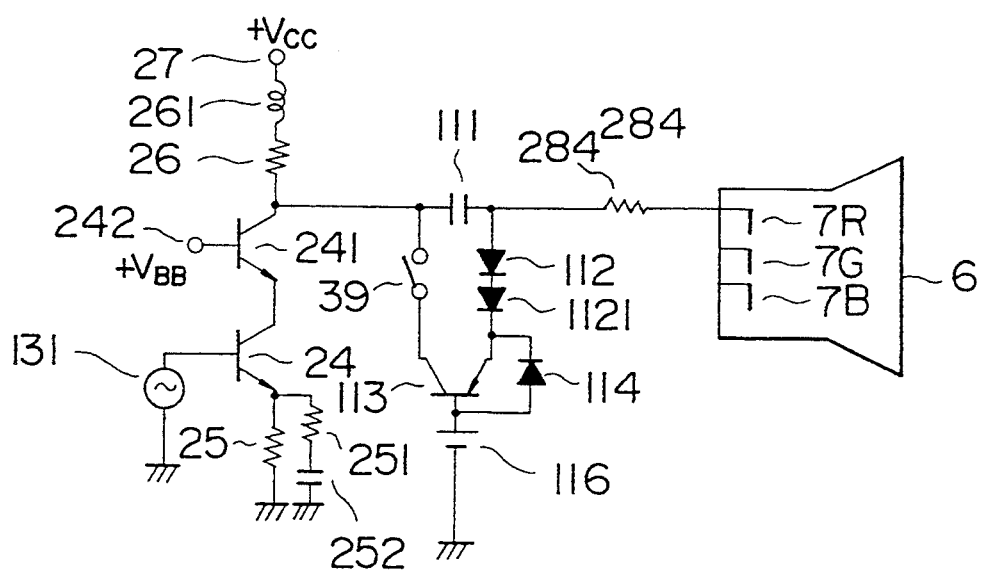

A further embodiment of the switch circuit 39 shown in FIG. 40 is shown in FIG. 41. Since the collector current of the transistor 113 can be considered as zero, the anode voltage of a constant current diode 392 will also become zero and a reverse voltage is applied to a diode 391 so that the collector of the transistor 113 is isolated from the drive signal source. However, the connection via the coupling capacitance of the diode 391 remains. Due to a fact that the collector current of the transistor 113 becomes sufficiently larger than the current value of the constant current diode 392 on clamping operation, the anode voltage of the constant current diode 392 will increase to render the diode 391 conductive. Accordingly, most of the collector current will flow to a coupling capacitor 111 so that a stable clamping operation will become possible. Therefore, the diode 391 serves as an automatic switch. Noting a fact that the diode 391 is rendered conductive on clamping operation when the collector current of the transistor 113 increases, the constant current diode 392 may be replaced with a resistor. The constant current diode 392 may also be replaced with a constant current circuit using active elements such as FETs. It is deemed that the switching speed of the diode 391 is inversely proportional to the parastic capacitance of the collector circuit of the transistor 113 and is governed by the through rate of the collector voltage proportional to the collector current of the transistor 113 on clamping operation. Therefore, it is possible to connect with the cathode of the constant current diode 392 an offset voltage source having a voltage which can be maintained in such a range that the diode 391 is normally cut off on non-clamping operation and that the coupling capacitance of the diode 391 will not cause a problem. For example, the cathode of the constant current diode 392 is connected with a base bias voltage source terminal 242 of a base grounded transistor 241 in a parallel relationship therewith.

Figure 43:
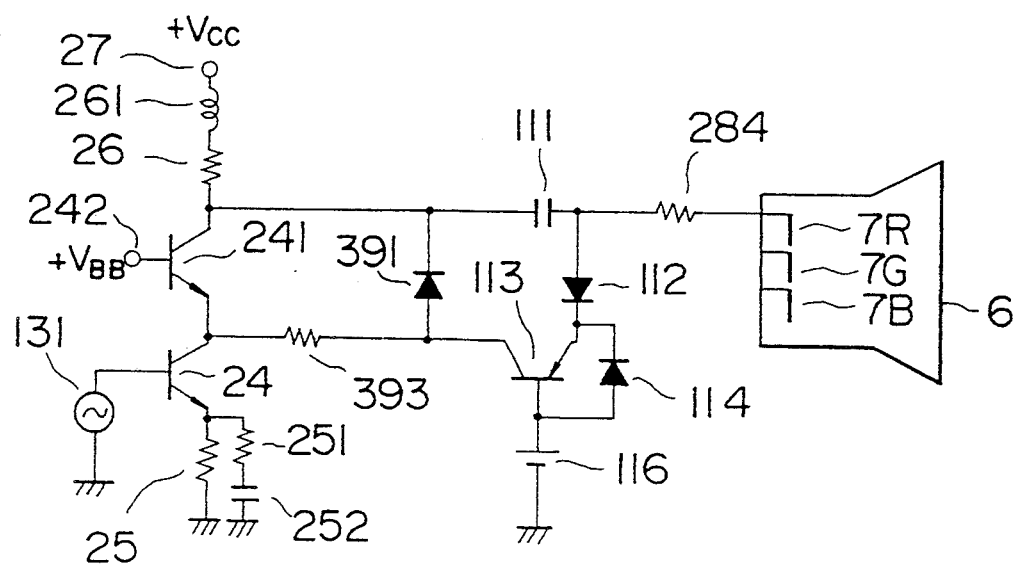

An embodiment in which deterioration of the clamp accuracy is suppressed as much as possible is shown in FIG. 43.

By connecting a resistor 393 between the emitter of the transistor 241 and the collector of the transistor 113, a current component flowing through a resistor 393 for switching a diode 391 can be returned to a coupling capacitor 111 again without flowing to the resistor 26 so that the claim accuracy is enhanced. That is, the emitter current (collector current) of the transistor 241 is decreased by an amount equal to that of the current flowing to the resistor 393 and a current equal to the decreased amount will flow to the coupling capacitor 111 from the collector of the transistor 241. The resistor 391 can be designed so that a resistance value in which a time constant of the collector circuit of the transistor 113 satisfies a necessary switching speed is a maximum value and a resistance value for enabling a current having such an amount that the transistor 241 is not cut-off to flow is a minimum value. The resistor 393 may be replaced with a constant current diode, the anode of which is connected with the collector of the transistor 113 as shown in FIG. 41. In this case, it is better to insert in series a resistor or an inductor for suppressing a high frequency signal leaked via the constant current diode and a parallel parasitic capaciatance. It is needless to say that same effect can be achieved even by connecting the resistor 393 between the emitter of the transistor 24 and the collector of the transistor 113.

Figure 44:
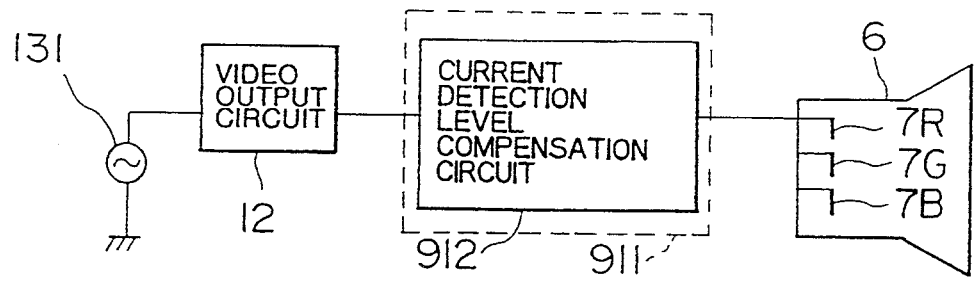
FIGS. 44 through 48 are structural views showing further embodiment in which the picture tube drive circuit comprises a current detection level compensation detector.
Figure 45:
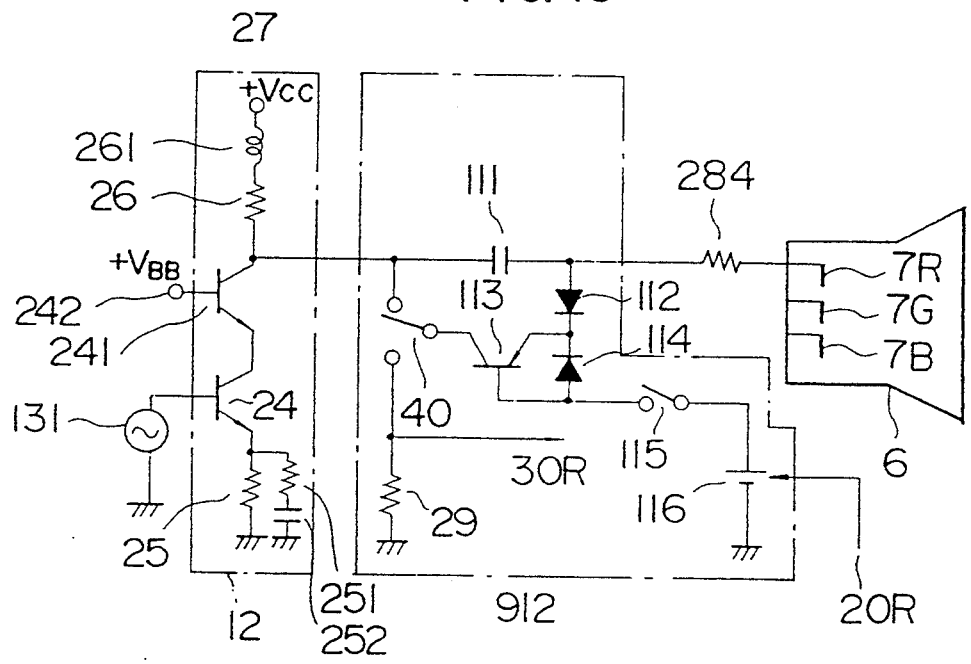

A block diagram of a picture tube drive circuit 911 comprising a cathode current detection and level compensation circuit 912 having both of a level compensation capability and a beam current capability is shown in FIG. 44. The structure of FIG. 44 makes it possible to provide a high performance such as reduction of circuit scale and enhancement of reliability. The detailed structure of FIG. 44 is shown in FIG. 45. It is possible to provide the level compensation circuit with a beam current detection capability by commonly using a transistor in the clamping circuit to detect the beam current in the circuit in FIG. 45.

The switch circuit 115 is continued to be short-circuited for a beam current detection period and is opened or closed for a clamp period of the other period for controlling a synchronous clamp operation. The switch circuit 40 is tilted to the side of the drive signal line only for the clamp period for enabling a stable clamp operation.

A feature of the circuit shown in FIG. 45 resides in that a correct level compensation becomes possible without being influenced by the video signals since the voltage of the voltage source 116, the level of which is controlled on beam current detection is transmitted to a cathode 7R via a switch circuit 115 and the transistor 113 and the d.c. output of the video output circuit is cut off by a coupling capacitor 111. Since the transistor 113 can be commonly used for clamping and beam current detection, the circuit scale is reduced and the number of portions which may be damaged by discharge in the picture tube and the like is reduced, resulting in an enhancement of the reliability.

Figure 46:
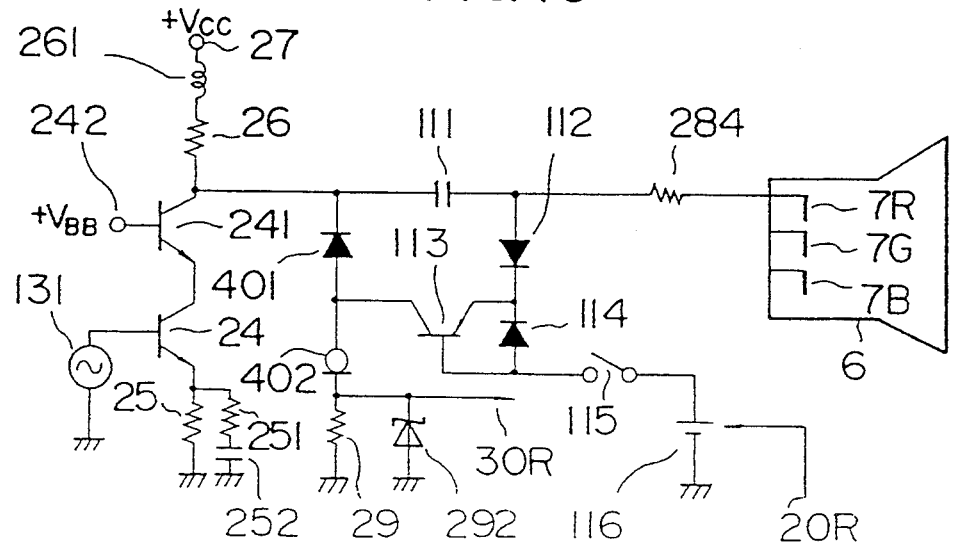

Since use of the switch circuit 40 can eliminate the addition of a capacitance to the drive signal source for a display period, further widening of the band range of the drive circuit becomes possible as is similar with the embodiment shown in FIG. 40. Also in the embodiment shown in FIG. 46, a constant current diode 402 is used to automatically render a diode 401 conductive only for a clamping period when the collector of the transistor 113 increases as is similar to the embodiment shown in FIG. 41. The clamping current will now be compared with the detection beam current flowing through the collector of the transistor 113. The electric Charge which has been stored in a coupling capacitor 111 with a beam current flowing for a non-clamping period is abruptly discharged for a clamping period. Since the non-clamping period is longer than ten times as the clamping period, it is deemed that the amount of the clamping current is not less than 10 times as much as that of the detection current. Therefore, design of the constant current diode 402 is easy, and the constant current diode 402 may be replaced with a resistor in some cases.

Figure 47:
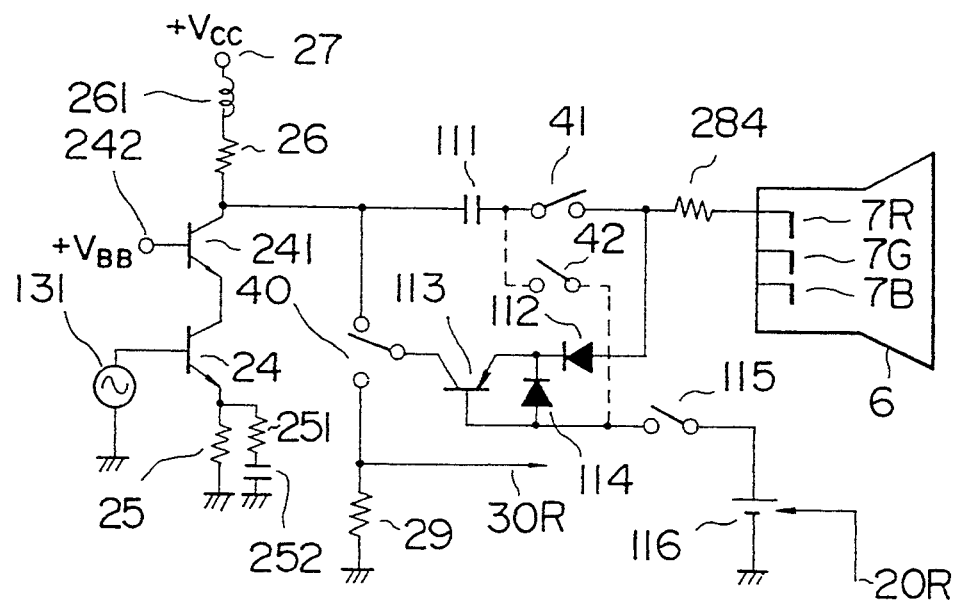

An embodiment in which the precision of the beam current detection can be enhanced is shown in FIG. 47. The output of the video output circuit from the d.c. component to the a.c. component is completely cut-off from a cathode 7R by opening a switch circuit 41 only on detection of the beam current in the embodiment of FIG. 47. Although a settling time proportional to a time constant substantially determined by a product of a coupling capacitor 111 and an output resistor 26 of the output circuit is required in order to detect the beam current when the switch circuit 41 is normally short-circuited, the setting time can be neglected by opening the switch circuit 41.

The beam current can be detected while the output voltage of the video output circuit is applied to the cathode 7R by inserting a switch circuit 42 in a path represented by a dot and chain line in FIG. 47, by short-circuiting the switch circuit 42 only on detection of the beam current and opening the switch circuit 41. Accordingly, it can be appropriately selected whether the voltage to be applied to the picture tube on detection of the beam current is supplied by a level controlled voltage source 116 by opening a switch 42 to short-circuit a switch circuit 115 or is supplied from the video output circuit by short-circuiting the switch circuit 42 to open the switch circuit 115.

Figure 48:
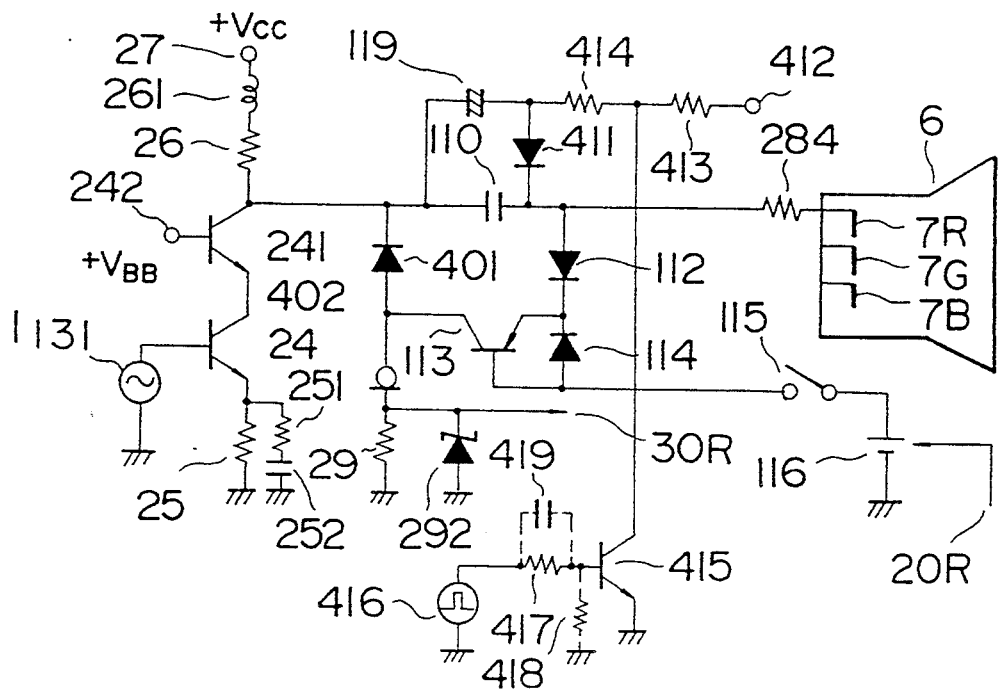

A further embodiment of the switch 41 shown in FIG. 47 is shown in FIG. 48. In FIG. 48, a coupling capacitor comprises a capacitor for high frequency signal and a capacitor for the other signals and the latter capacitor may be cut-off from a drive signal source by a diode 411. Although the capacitor 119 in the drawing is an electrolytic capacitor, it may be any type of capacitor. The coupling capacitor 110 for high frequency signal is made as low as possible in capacity so that the settling time is negligible.

On turning on of power, a bias current will flow through capacitors 110 and 119 via a bias resistor 413 from a power terminal 412 to commence a normal clamping operation. It is appropriate that the high frequency impedance of a diode 411 be inherently zero if it can be sufficiently reduced. On detection of the beam current, a transistor is rendered conductive responsive to a signal from a detection signal source 416 to lower the collector voltage of the transistor so that the diode is cut-off. A resistor 417 is adapted to preset the base current of the transistor 415. In order to carry out a fast control while saturating the transistor, a speed-up capacitor 419 and a base current drawing resistor 418 are added. A resistor 414 is inserted as shown in FIG. 48 in order to prevent the base and collector capacitance of the transistor 415 and the stray capacitance of a collector circuit from being added to the drive line for a period when the beam current is not detected. Therefore, the resistor 414 functions as is similar to the resistor 291 shown in FIG. 33.

Figure 49:
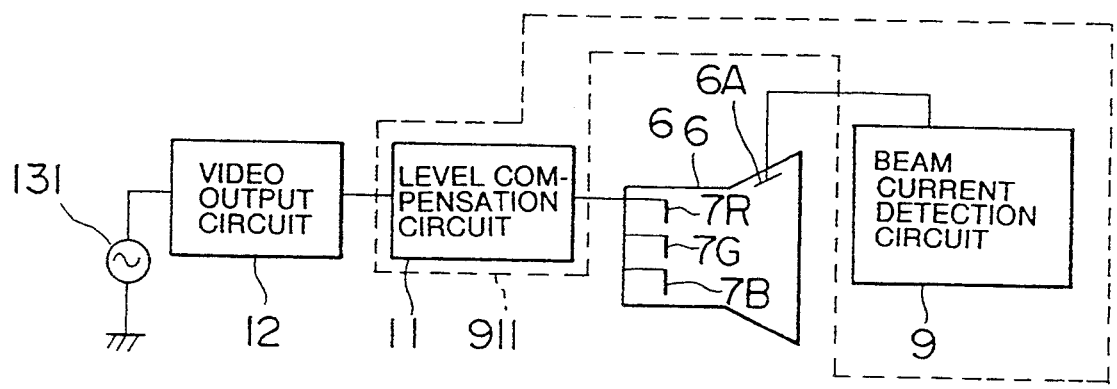
FIGS. 49 and 50 are views showing the structure of other picture tube drive circuits.

A further embodiment which makes it possible to perform the beam current detection from a current of an electrode other than cathode electrode of a picture tube is shown in FIG. 49. The outputs of a video output circuit 12 are applied to cathodes 7R, 7G and 7B of a picture tube 6 via a level compensation circuit 11 in FIG. 29. Drive electrodes of the picture tube 29 may be first grids if they are independent of with each other for three primary colors R, G and B. In FIG. 49, a beam current detection circuit 9 is connected with an anode 6A to detect the beam current which is a part of the anode current.

Figure 50:
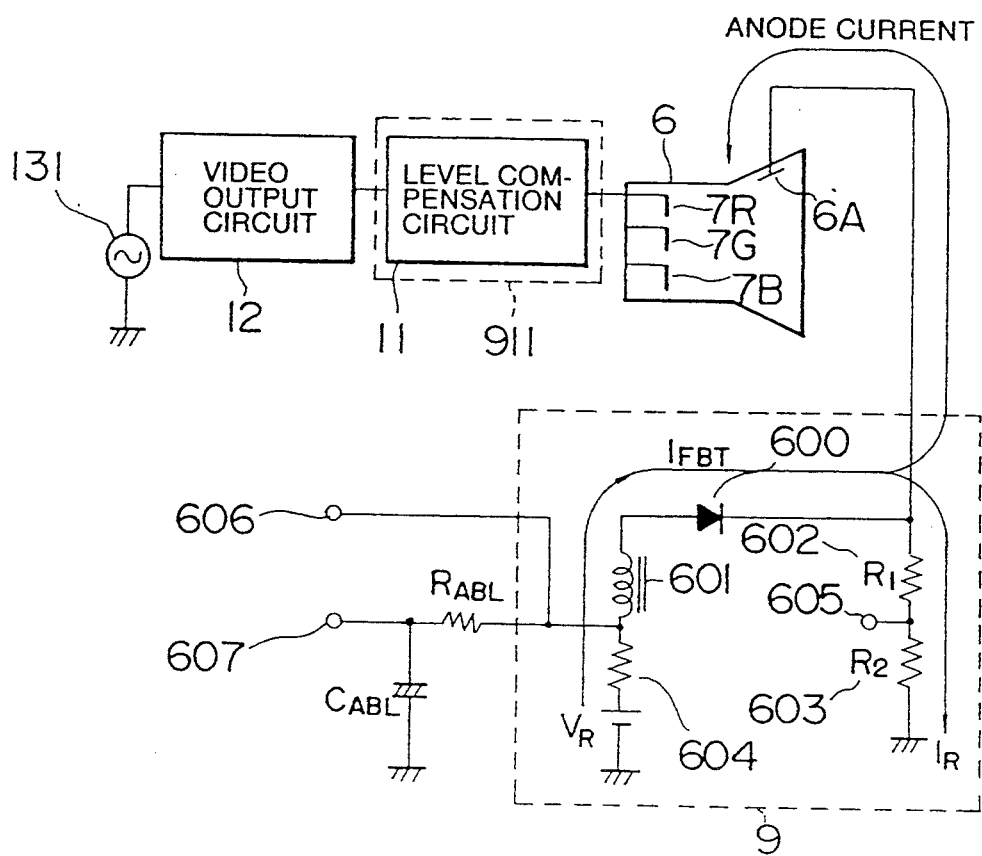

However, the beam detection circuit 9 may be connected with any electrode such as second and third grid, to which a current having a correlation with the beam current flows. If the beam current of a multi-color picture tube excepting a monochrome picture tube is detected from an electrode which is commonly used for a plurality of colors, the beam current for each color should be separated by causing the beam current for each color to flow at different timing. An embodiment of the detailed circuit which is formed as mentioned above is shown in FIG. 50. In FIG. 50, the beam current detection circuit 9 comprises a rectifier diode 600, a flyback transformer FBT601, voltage dividing resistors R1602 and R2603 for stabilization of a high voltage by detecting the high voltage at a terminal 605, a resistor Rb604 for converting the beam current into a voltage and a voltage source $F_R$ for giving a d.c. shift to a beam current detection voltage. The beam current detection voltage is outputted to outside from a detection terminal 606. The detection voltage can be used as a beam current average value ABL control voltage (automatic brightness limitation circuit controlling voltage) by outputting the detection voltage from the ABL terminal 607 via an integration circuit comprising a resistor $R_{ABL}$ and a capacitor $C_{ABL}$.

A current $I_{FBT}$ Of the flyback transformer which is to be detected includes an anode current $I_A$ which is the beam current added with a current component leaked to each terminal of a picture tube 6, a current $I_R$ flowing through the voltage dividing resistors R1 602 and R2 603, distortion current components such as high order distortion current for a horizontal deflection period flowing across the ground and each winding of the flyback transformer. However, the beam current can be separated and detected by detecting a change in a peak value, an average value of the current $I_{FBT}$ since the currents other than the beam current have substantially constant amplitudes. Even if the amplitudes of the current components other than the beam current are not sufficiently low in comparison with the beam current, the average values can be deemed to be constant. Therefore, the beam current can easily detected by using the above mentioned method.

Figure 51:
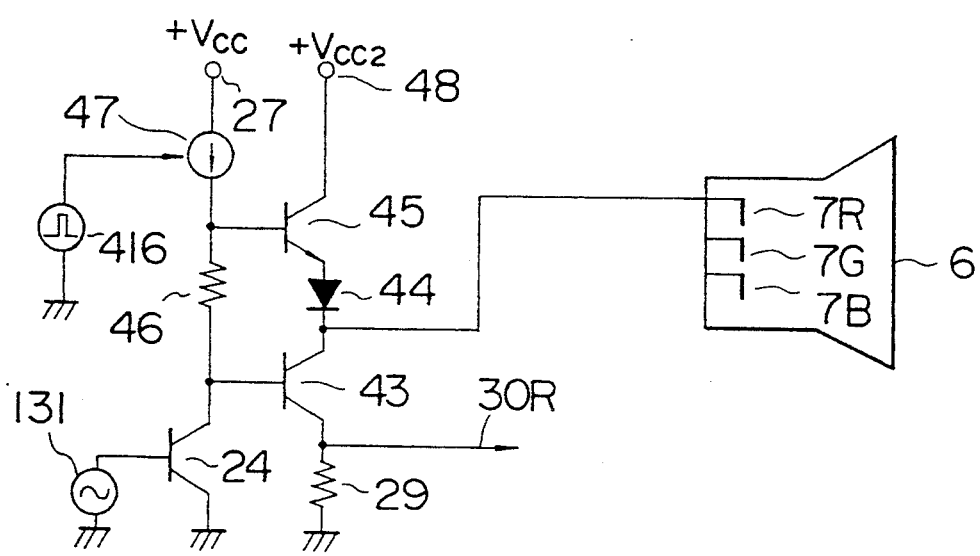
FIGS. 51, 52 and 53 are structural view showing embodiments of a beam current detection circuit.

An embodiment in which the present invention is applied to a dynamic load type video output circuit is shown in FIG. 51. In FIG. 51, the video output circuit uses a constant current source circuit and current as a load of a video output transistor 24 to achieve reduction of power consumption. The video output circuit is added with an SEPP circuit comprising transistors 43 and 45 as an output buffer for driving the picture tube 6. Although the dynamic load circuit can achieve a reduction of power consumption by suppressing the power source current to a constant and low current irrespective of a high output voltage, it cannot supply an output current necessary to drive capacitive loads such as a cathode 7R of a picture tube 6 with voltages of high amplitude and broad band signals. Also in the output buffer SEPP circuit required for such a drive, drive of the picture tube 6 is made possible by operating the transistors in AB class in which an idling current which is high to some extent flows across used transistor 43 and 45 for suppressing the cut-off level of the transistors at a low level. If the beam current is detected by the dynamic load type video output circuit is used, the above mentioned type detection circuit is disposed at the poststage of the video output circuit. Accordingly, an advantage of a low power consumption will be lost since the load capacity of the video output circuit is increased.

A feature of the present invention resides in that the beam current detection is achieved by a transistor 43 of the SEPP circuit as shown in FIG. 51. A terminal 48 is a power source terminal for biasing the SEPP. However, it is necessary to cut-off the idling current when the current is detected. Accordingly, in accordance with the present invention, the current of the constant current source or circuit 47 is controlled to reduce the current when the beam current is detected so that the bias voltage of the SEPP circuit generated by the drop of the voltage across a biasing impedance 46 is controlled as shown in FIG. 51. By doing so, only the transistor 45 is cut-off when the beam current is detected. In this case, a diode 44 shown in FIG. 51 serves to stably cut-off the transistor 45 also when the beam current to be detected is very low. This diode may be omitted (short-circuited) when the detection current is high to some extent, for example, less than 10 μA.

Figure 52:
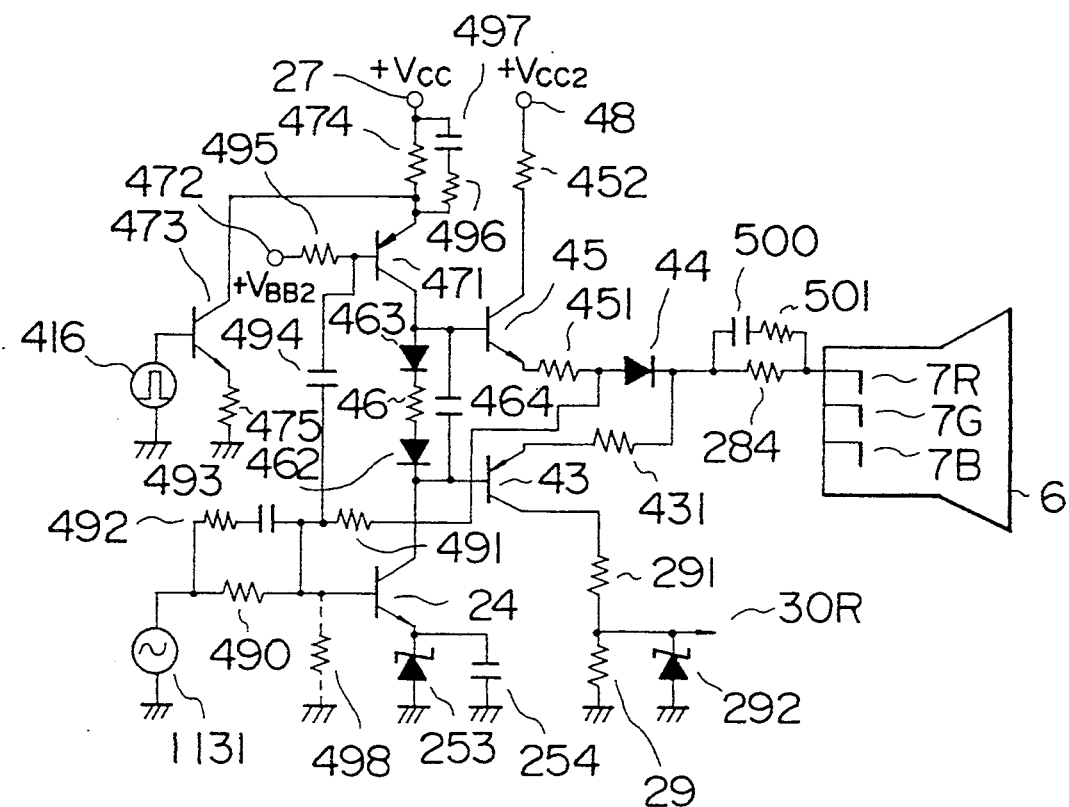

An embodiment which makes it possible to detect the beam current even if the dynamic load type video output circuit is used is shown in FIG. 52. In FIG. 52, a diode 44 is switch to brought into conductive and inconductive conditions by controlling the current of a constant current circuit comprising a transistor 471 for detecting the beam current. Diodes 462 and 463 which provide a biasing impedance perform a temperature drift compensation for an idling current. Accordingly, it is possible to form transistors 43 and 45 on the same semiconductor device or to thermally couple them with each other. A bypass capacitor 464 eliminates the directional property of the drive impedance of an SEPP circuit. Resistors 431 and 451 are used for presetting the idling current and for protection of the transistors 43 and 65, respectively. A resistor 452 is also used for protecting the transistor 45 from an over current flowing on accidental contact. A capacitor 500 and a resistor 501 form a bypass circuit for compensating the deterioration of the frequency characteristics of the drive circuit due to the protection resistor 284 and exhibits a high impedance for a discharge energy in the picture tube 6. A transistor 471 which forms a constant current circuit connects with a terminal 472 the a.c. component of the collector current of the transistor 473 which is controlled by a current detection signal source 416 and the collector current is received by a base grounded system biased by a resistor 474 and is supplied to an impedance for biasing the SEPP circuit. The collector current of the transistor 473 is adjusted by a resistor 475. Fast control is made possible since the transistors 473 and 471 are non-saturable. Although a parallel feedback is applied to an output transistor 24 by an input resistor 490 and a feedback resistor 491, this feedback is maintained by cut-off of only the diode 44 also for a current detection period so that the output voltage of the transistor 43 is stably supplied to the picture tube 6. Since the base voltage of the transistor 471 is made constant also on switching of the current detection, the leakage of the detection signal from a signal source 416 to the transistor 45 via a detection signal capacitor 494 is suppressed. A negative feedback is also applied to the transistor 471 by a resistor 495 and a capacitor 494. Each pair of a resistor 496 and a capacitor 497, and a resistor 492 and a capacitor 493 is used for peaking. A Zener diode 253 is used for suppressing a fall of the operating point of the input signal source 31 caused by a d.c. bias of an input resistor 490 and a feedback resistor 491. A by-pass capacitor 254 reduces the impedance of the Zener diode 253 and compensates for noise. The fall of the operating point is also compensated for by using a resistor 498. High output and wide band range characteristics of the drive circuit can be maintained since there is no output capacity which is added for detecting the current in the present embodiment.

Figure 53:
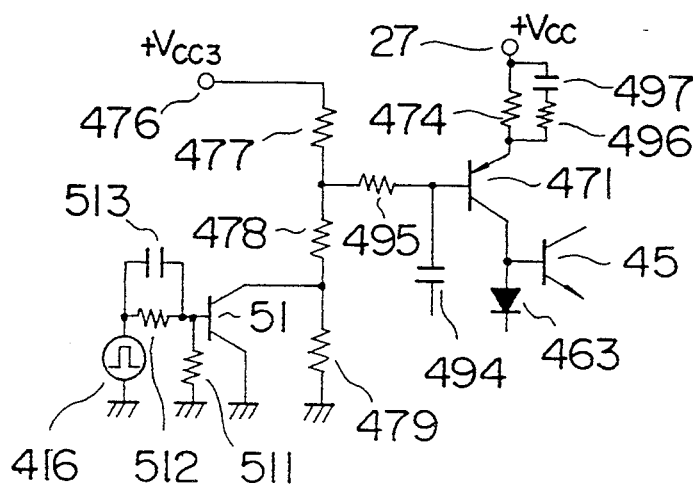

A further embodiment which makes it possible to control the current of the constant current source or circuit is shown in FIG. 53. Current control is performed by controlling the base bias voltage of a transistor 471 which forms a constant current circuit in FIG. 5. Portions which are not illustrated are identical with those of the embodiment of FIG. 52. The current control is conducted by switching a transistor 51 to short-circuit a resistor 479. The base bias voltage when the resistor 479 is short-circuited is preset by a voltage across a terminal 476 and resistors 477 and 478. A resistor 512 is a base resistor for presetting a base current of a transistor 51. If the switching speed is enhanced, the value of the base resistor 512 is appropriately adjusted, or a speed-up capacitor 513 and a base current drain resistor 511 are used. The resistive voltage of the transistor 51 can be made lower than that of the transistor 473 shown in FIG. 22.

It is needless to say that the picture tube may include plasma display tube and the like as well as cathode ray tube, and accordingly the drive electrode includes other electrodes other than cathode and grid. The semiconductors to be used may include a variety of active elements such as GaAs FETs as well as bipolar transistors or diodes. The polarity of the elements may be reversed by reversing the polarity of potential.

We claim:

1. A drive apparatus for a color picture tube, comprising:
    a video output circuit which receives video signals, amplifies said video signals and outputs the amplified video signals;
    a picture tube drive circuit which receives the amplified video signals from said video output circuit for driving the color picture tube based on said video signals, said picture tube drive circuit having means for detecting a beam current corresponding to the brightness of each color flowing through said picture tube;
    a picture tube connected with said picture tube drive circuit for displaying the video signals;
    a white balance control circuit into which a detection value of a beam current detected by said picture tube drive circuit is inputted and for outputting level compensation video signals, for adjusting the white balance of the video image displayed on said picture tube, to said picture tube drive circuit; and
    wherein a brightness adjustment circuit which compares an inputted video signal with a brightness control voltage in a comparator and adds an error output of said comparator in an adder of said inputted video signal to output it for performing brightness adjustment is provided at the post-stage of said video output circuit and a white balance adjustment reference signal is inputted to said picture tube drive circuit via said brightness adjustment circuit by inputting the reference signal for white balance adjustment to said comparator in lieu of said brightness control voltage on white balance adjustment.

2. A drive apparatus for a color picture tube, comprising:
    a video output circuit which receives video signals, amplifies said video signals and outputs the amplified video signals;
    a picture tube drive circuit which receives the amplified video signals from said video output circuit for driving the color picture tube based on said video signals, said picture tube drive circuit having means for detecting a beam current corresponding to the brightness of each color flowing through said picture tube;
    a picture tube connected with said picture tube drive circuit for displaying the video signals;
    a white balance control circuit into which a detection value of a beam current detected by said picture tube drive circuit is inputted and for outputting level compensation video signals, for adjusting the white balance of the video image displayed on said picture tube, to said picture tube drive circuit; and
    a brightness adjustment circuit including an adding circuit, a comparator, a switch, and a brightness control source, said adding circuit being provided in a line delivering said video signal, said video signal being inputted to one input of said adding circuit, an output of said adding circuit being inputted to an input of said picture tube drive circuit, an output of said comparator being connected to another input of said adding circuit, one input of said comparator being connected to the output of said adding circuit, said brightness control signal source and said white balance control circuit being connected to another input of said comparator via said switch, and said switch when switched to said white balance control circuit side inputting a white balance adjustment reference signal to said picture tube drive circuit during white balance adjustment.

* * * * *

UNITED STATES PATENT AND TRADEMARK OFFICE
CERTIFICATE OF CORRECTION

PATENT NO. : 5,400,086
DATED : March 21, 1995
INVENTOR(S) : SANO, et al

It is certified that error appears in the above-indentified patent and that said Letters Patent is hereby corrected as shown below:

On the title page, item [21], change "124,089" to --124,069--.

On the title page, insert the following information:
[30] Foreign Application Priority Data
    Nov. 13, 1989 [JP] Japan.....01-292280
    Oct. 19, 1990 [JP] Japan.....02-278985

[63] Continuation of Serial No. 611,963, filed Nov. 13, 1990, now U.S. Patent No. 5,258,828, Nov. 2, 1993.

Signed and Sealed this

Fifth Day of September, 1995

Attest:

BRUCE LEHMAN

*Attesting Officer*     *Commissioner of Patents and Trademarks*